United States Patent [19]
Mine et al.

[11] Patent Number: 5,724,976
[45] Date of Patent: Mar. 10, 1998

[54] ULTRASOUND IMAGING PREFERABLE TO ULTRASOUND CONTRAST ECHOGRAPHY

[75] Inventors: Yoshitaka Mine, Nishinasuno-Machi; Makoto Hirama; Hiroyuki Tsujino, both of Otawara; Shiroh Saitoh, Kawasaki, all of Japan

[73] Assignee: Kabushiki Kaisha Toshiba, Kawasaki, Japan

[21] Appl. No.: 578,977

[22] Filed: Dec. 27, 1995

[30] Foreign Application Priority Data

Dec. 28, 1994 [JP] Japan .................. 6-327934
Jan. 9, 1995 [JP] Japan .................. 7-001447

[51] Int. Cl.$^6$ .................................. A61B 8/00
[52] U.S. Cl. .................................. 178/662.03
[58] Field of Search .............. 128/660.05, 660.07, 128/660.08, 661.01, 661.04, 661.08, 661.09, 662.02, 662.03; 73/625, 626; 310/365, 366

[56] References Cited

U.S. PATENT DOCUMENTS

| | | | |
|---|---|---|---|
| 4,276,491 | 6/1981 | Daniel | 128/662.03 |
| 5,410,516 | 4/1995 | Uhlendorf et al. | |
| 5,465,725 | 11/1995 | Soyed-Bolorforosh | 128/662.03 |

FOREIGN PATENT DOCUMENTS

| | | |
|---|---|---|
| 0 357 164 | 3/1990 | European Pat. Off. |
| 38 29 999 | 3/1990 | Germany . |
| 4-501518 | 3/1992 | Japan . |
| 5-84246 | 4/1993 | Japan . |
| 6-114059 | 4/1994 | Japan . |

OTHER PUBLICATIONS

Ultrasonic Imaging, vol. 14, pp. 134–158, 1992, B. Schrope, et al., "Simulated Capillary Blood Flow Measurement Using A Nonlinear Ultrasonic Contrast Agent".

Radiology 182(P), vol. 141, P.N. Burns, et al., "Harmonic Imaging: New Imaging and Doppler Method For Contrast-Enhanced Ultrasound".

J. Acoust. Soc. Am., vol. 91, No. 4, Pt. 2, Apr. 1992, p. 2324, George S. K. Wong, et al., "Engineering Acoustics: Transducers, Arrays, and Techniques".

*Primary Examiner*—George Manuel
*Attorney, Agent, or Firm*—Oblon, Spivak, McClelland, Maier & Neustadt, P.C.

[57] ABSTRACT

Provided is a diagnostic ultrasound system producing an image whose brightness is enhanced by a contrast medium by implementing contrast echography based on intravenous injection. A diagnostic ultrasound system comprises a probe for converting an electrical driving signal into a corresponding transmission ultrasound wave and converting an echoed ultrasound wave into a corresponding electrical echo signal. The system still comprises a unit for transmitting the transmission ultrasonic wave to a subject by providing the probe the electrical driving signal substantially consisting of a fundamental component of a given driving frequency. The non-fundamental component is typically a second harmonic. A non-fundamental component of the driving frequency is intentionally lowered in power relative to the fundamental component by a suppressing element in the transmitting unit. The system comprises a unit for receiving the echo signal from the probe and processing the echo signal into a display image data reflecting both the fundamental and non-fundamental components and a unit for displaying the display image data.

78 Claims, 45 Drawing Sheets

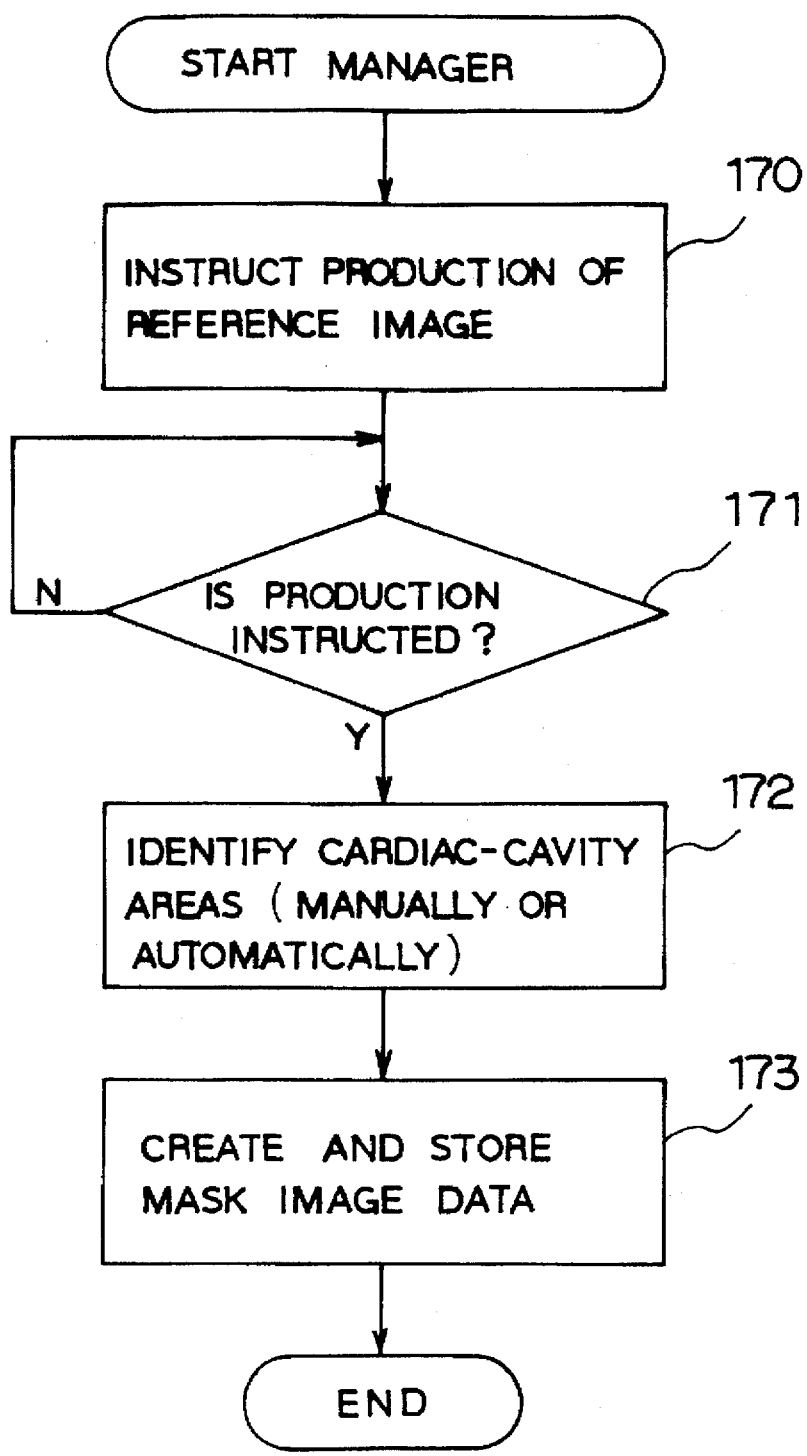
F I G. 32

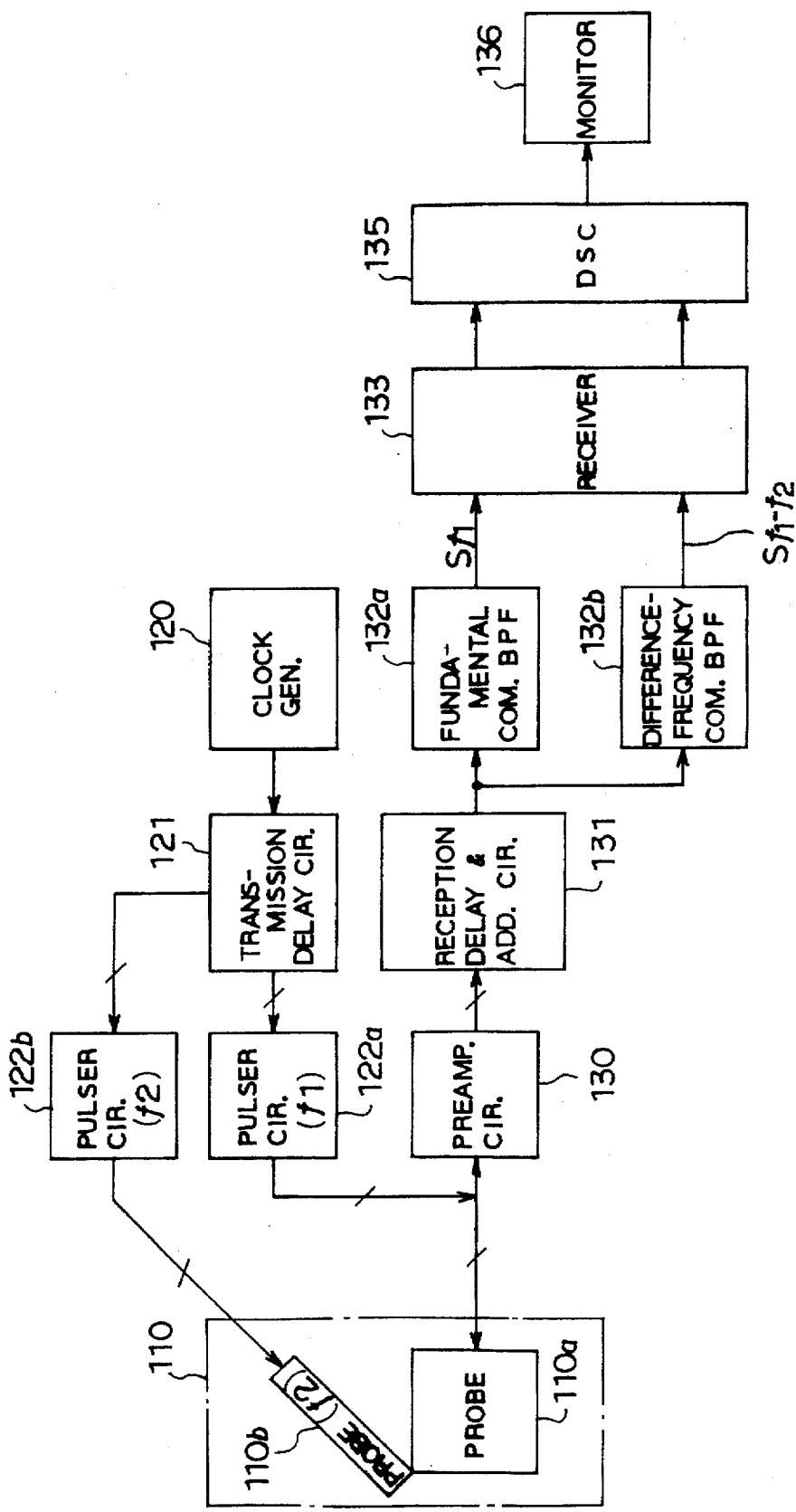
F I G. 38

ULTRASOUND IMAGING PREFERABLE TO ULTRASOUND CONTRAST ECHOGRAPHY

BACKGROUND OF THE INVENTION

1. Field of the Invention

The present invention relates to a diagnostic ultrasound system for producing a contrast image using an ultrasound contrast medium, which is injected to a subject's body, on the basis of the nature of an echo that an echo is intensified due to the strong scattering characteristic of an ultrasonic wave relative to the contrast medium.

2. Description of the Related Art

In recent years, contrast echography using an ultrasound contrast medium has attracted people's attention in the field of analysis of a myocardial image.

Myocardial contrast echography based on intra-arterial injection in which an ultrasound contrast medium is injected intra-arterially has been studied as one kind of contrast echography, and utilized for assessment of a blood-perfusing region in the myocardium resulting from myocardial perfusion. In the myocardial contrast echography, an ultrasound contrast medium (for example, 5%-diluted human albumin containing foams produced manually or by a sonic applicator) is injected through a catheter indwelled in the aorta. Owing to the contrast medium, a blood-perfusing region in the myocardium is displayed as a brightness-enhanced area in a B-mode image. Contrast echography based on intra-arterial injection has been studied on application to an abdominal region for assessment of a blood-perfusing region or a tumor-dominated vessel. A diagnostic ultrasound system for general studies is used, if necessary, in combination with a workstation as a diagnostic system for implementing these kinds of the contrast echography. Using the diagnostic system, brightness enhancement in a B-mode image can be evaluated, or a change in brightness level can be evaluated quantitatively by processing image data stored in a memory at the workstation.

In recent years, an ultrasound contrast medium to be injected intravenously for assessment of the left heart has been developed, and contrast echography using the contrast medium has been put to trail.

The ultrasound contrast medium includes "air globules having an average particulate diameter of 4 micrometers and being made by sealing air in albumin membranes produced during ultrasonic processing of 5%-diluted human serum albumin" imported and sold by Shionogi & Co., Ltd. (product name: Albunex 5 ml).

The contrast echography based on intravenous injection is currently in the stage of tests and studies, and expected to prove helpful for diagnosis of the head, cardiac cavities, and abdomen.

Among the aforesaid known techniques of contrast echography, the contrast echography based on intra-arterial injection makes it necessary to indwell a catheter in the aorta. The contrast echography is therefore limited to a hospital having a relatively spacious facility (operation room) in which indwelling of a catheter can be conducted. Moreover, since the diagnostic procedure is invasive, a patient load is large. For these reasons, the contrast echography based on intra-arterial injection is not thought to make the general clinical scene in the future.

In the contrast echography based on intravenous injection, invasiveness is markedly low and a patient load is small. However, since a contrast medium is injected to the myocardium or any other intended region via the lung, the concentration of the contrast medium is much lower than that in the contrast echography based on intra-arterial injection. The degree of brightness enhancement is therefore lower. This makes it quite difficult to observe brightness enhancement due to a contrast medium in imaging of the myocardium, a peripheral region in the abdomen, or any other region whose imaging is prone to the influence of echoes emanating from surrounding tissues. The contrast echography based on intravenous injection cannot therefore be adapted for assessment of a blood-perfusing region in the myocardium resulting from myocardial perfusion.

SUMMARY OF THE INVENTION

The present invention attempts to break through the current situation of contrast echography using an ultrasound contrast medium. An object of the present invention is to provide a diagnostic ultrasound system capable of producing an appropriate image, of which brightness is enhanced by a contrast medium, by implementing contrast echography based on intravenous injection in examination of a region (for example, the myocardium and parenchymatous organs) whose imaging is prone to the influence of echoes emanating from surrounding tissues.

Another object of the present invention is to provide, in particular, a diagnostic ultrasound system for enabling assessment of a blood-perfusing region in the myocardium resulting from myocardial perfusion by implementing contrast echography based on intravenous injection.

Still another object of the present invention is to provide a diagnostic ultrasound system capable of acquiring and evaluating motion information concerning cardiac walls and blood-perfusion information concerning the cardiac muscle at a time owing to the ability of a diagnostic ultrasound system to evaluate motions of cardiac walls.

Still another object of the present invention is to provide a diagnostic ultrasound system capable of acquiring and evaluating motion information concerning cardiac walls and blood-perfusion information concerning the cardiac muscle at a time in various stressed states by performing stress echography used for diagnosis of angina pectoris.

For achieving the foregoing objects, a diagnostic ultrasound system in accordance with the present invention has the configuration described below.

As one aspect of the present invention, there is provided an ultrasound probe comprising: a transducer formed with a piezoelectric member for performing a conversion between an electric signal and an ultrasound signal bidirectionally; and at least three electrodes including a ground electrode attached to the piezoelectric member so as to provide a passband characteristic of at least two kinds of frequency components for the transducer.

It is preferred that the electrodes are three in number including the ground electrode used in common and two signal electrodes, and the passband characteristic is two kinds in kind number. Preferably, the piezoelectric member has a certain thickness in a certain direction and both sides in parallel with a thickness direction of the piezoelectric member, and the signal electrodes consist of a first signal electrode at least partially attached to either one of both the sides and a second signal electrode attached to the other side, the second signal electrode coupling with an intermediate electrode extending toward the either one side partitioning the piezoelectric member in the thickness direction, and the first and second signal electrodes being connected to an individual lead wire at connecting positions on the first and second electrodes respectively, each of the connecting positions residing in parallel with each of both the sides.

As another aspect of the present invention, provided is a diagnostic ultrasound system comprising: an ultrasound probe comprising; a plurality of transducers each formed with piezoelectric member for performing a conversion between an electric signal and an ultrasound signal bidirectionally, and at least three electrodes including a ground electrode attached to each transducer so as to provide a passband characteristics of at least two kinds of frequency components for each of the transducers, and a unit for transmitting the ultrasound signal to a subject and receiving the ultrasound signal echoed from the subject through the ultrasound probe on the basis of a transmission/reception operation related to the at least two kinds of the frequency components.

Preferably, the electrodes are three in number including the ground electrode used in common and two signal electrodes, and the passband characteristic is two kinds in kind number.

Still preferably, the two-kind passbands are passbands passing both a fundamental frequency component of the electric signal and a non-fundamental frequency component of the electric signal, respectively, the electric signal being acquired under performing an ultrasound contrast echography with an ultrasound contrast medium resulting in generating the non-fundamental frequency component.

Another aspect of the invention provides a diagnostic ultrasound system, comprising: a probe for not only converting an electrical driving signal into a corresponding transmission ultrasound wave but also converting an echoed ultrasound wave into a corresponding electrical echo signal; a unit for transmitting the transmission ultrasonic wave to a subject to be diagnosed by providing the probe the electrical driving signal substantially consisting of a fundamental component of a given driving frequency, a non-fundamental component of the driving frequency being lowered in power relative to the fundamental component; a unit for receiving the electrical echo signal from the probe and processing the electrical echo signal into a display image data; and a unit for displaying the display image data.

It is preferred that the fundamental component consists of one fundamental frequency and the non-fundamental component includes at least one of a harmonic, subharmonic, and ultra-harmonic to the fundamental component. Preferably, the non-fundamental component is a second harmonic to the fundamental component.

It is preferred that the transmitting unit comprises a suppressing element for intentionally suppressing the non-fundamental component. Preferably, the suppressing means is one of a transmission filter for passing the fundamental component of the driving signal alone, a transmission notch filter for cutting off the non-fundamental component of the driving signal, and a transmission resonant circuit for passing the fundamental component alone by producing a resonant state only in transmission of the driving signal. Preferably, the probe is a phased-array type probe in which a plurality of transducers is arranged in an array.

As a result, a driving pulse to be fed from the transmitting means to the probe (for example, a probe having a dual-frequency characteristic) has the level of the non-fundamental component (second harmonic or the like) thereof decreased substantially and intentionally, thus contains substantially only the fundamental component, and then fed to the probe. The intentional suppression of the non-fundamental component is preferably performed by a transmission resonant circuit that becomes resonant only for transmission so as to pass the fundamental component alone, The term "intentionally" or "intentional" for the suppression of the non-fundamental components is used herein for excluding natural loss and/or decay of the non-fundamental frequency components.

When the contrast echography in which an ultrasound contrast medium is injected intravenously is implemented, nonlinear scattering of ultrasound beams caused by the ultrasound contrast medium reflects in the non-fundamental component of each echo as it is. Since an ultrasound beam entering a subject contains substantially a fundamental component alone, a non-fundamental component contained in an echo is dependent on nonlinear scattering caused by a contrast medium. By imaging a non-fundamental component (this imaging technique is frequently referred to as "harmonic imaging"), a distribution of a contrast medium can therefore be grasped. Thus, since ultrasound beams each processed to contain a fundamental component alone are irradiated, the contrast echography based on intravenous injection can be adapted even for examination of a region whose imaging is prone to the influence of echoes emanating from tissues. A myocardial perfusion image or the like is thus produced for assessment of a blood-perfusing region in the cardiac muscle in a preferred manner.

The foregoing contrast echography is effective especially for intramyocardial diagnosis. When motion information concerning cardiac walls is acquired at the same time or stress echography is conducted in combination, assessment of cardiac functions can be achieved comprehensively in relation to an intramyocardial blood flow.

BRIEF DESCRIPTION OF THE DRAWINGS

In the accompanying drawings:

FIG. 32 is a flowchart briefly describing an example of processing performed by a manager for a diagnostic ultrasound system of the tenth embodiment of the present invention;

FIG. 38 is a block diagram showing a diagnostic ultrasound system of the thirteenth embodiment of the present invention;

DETAILED DESCRIPTION OF THE PREFERRED EMBODIMENTS

Embodiments of the present invention will be described in conjunction with the drawings.

(First Embodiment)

The first embodiment will be described in conjunction with FIGS. 1 to 4. A diagnostic ultrasound system of the first embodiment implements contrast echography to efficiently detect a second harmonic that is a non-fundamental component produced due to nonlinear scattering caused by a foam contained in an ultrasound contrast medium, and then two-dimensionally display a second-harmonic distribution image.

Figure 1:
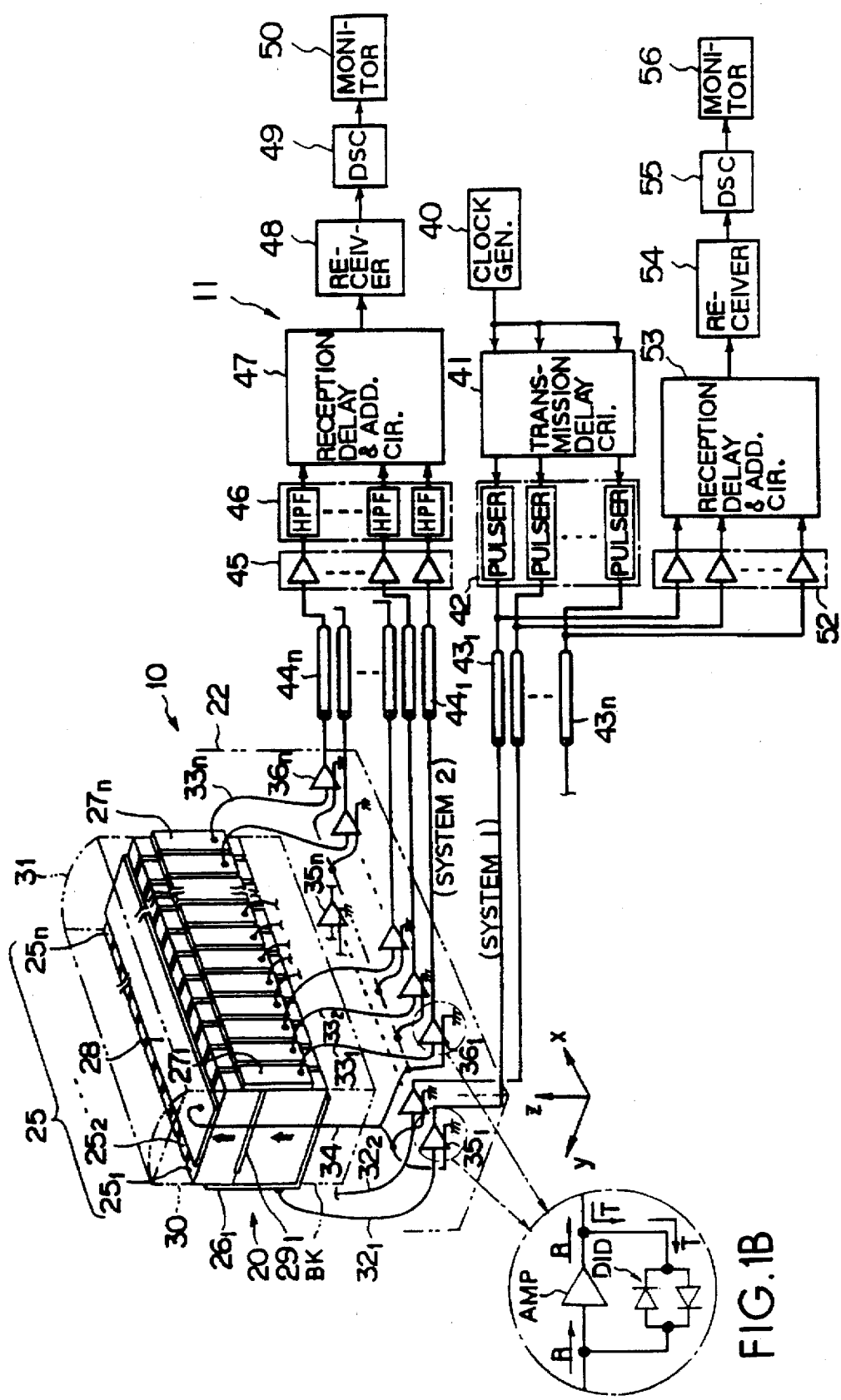
FIG. 1 is a schematic block diagram showing a diagnostic ultrasound system of the first embodiment of the present invention.

As shown in FIG. 1, the d agnostic ultrasound system comprises an ultrasound probe 10 for transmitting or receiving ultrasonic waves to or from a subject, and a main unit 11 for driving the ultrasound probe 10 and processing signals received by the ultrasound probe 10.

The ultrasound probe (hereinafter, probe) 10 is structured as an electronic sector probe of a phased-array type, comprising a probe body 20 and a probe head 22 in which a plurality of buffer amplifiers that will be described later are incorporated. The probe body 20 has a piezoelectric member 25 shaped like a parallelepiped. In FIG. 1, the longitudinal direction of the piezoelectric member 25 shall be a scanning direction x, and a lateral direction perpendicular to the scanning direction x shall be a lens direction y (or a slicing direction). A direction perpendicular to both the directions x and y shall be a thickness direction z (or a depth direction).

Figure 2:
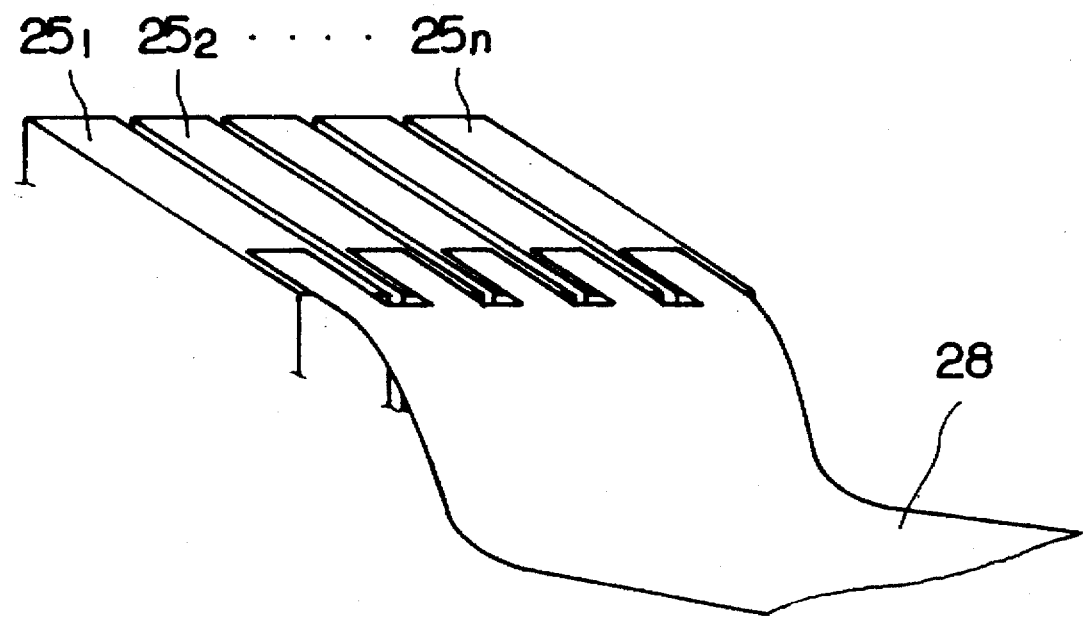
FIG. 2 is a perspective view showing part of an example of a ground.

The piezoelectric member 25 is segmented in the scanning direction x into a plurality (for example 64) of transducers $25_1$ to $25_n$ (where n denotes, for example, 64). The piezoelectric member 25 is thus structured as a phased array of transducers. Three electrodes 26, 27, and 28 are led out from the piezoelectric member 25, whereby a dual-frequency probe is realized. In other words, each transducer $25_1$ (to $25_n$) has a first electrode $26_1$ (to $26_n$) attached to one side surface and back surface thereof and shaped like a letter L when viewed laterally, a second electrode $27_1$ (to $27_n$) attached to the other side surface thereof, and a third common electrode; that is, a ground 28 attached to an ultrasonic wave transmission/reception surface. FIG. 1 schematically shows an example of a structure of the ground 28. An example of a particular structure thereof is shown in FIG. 2.

Figure 3:
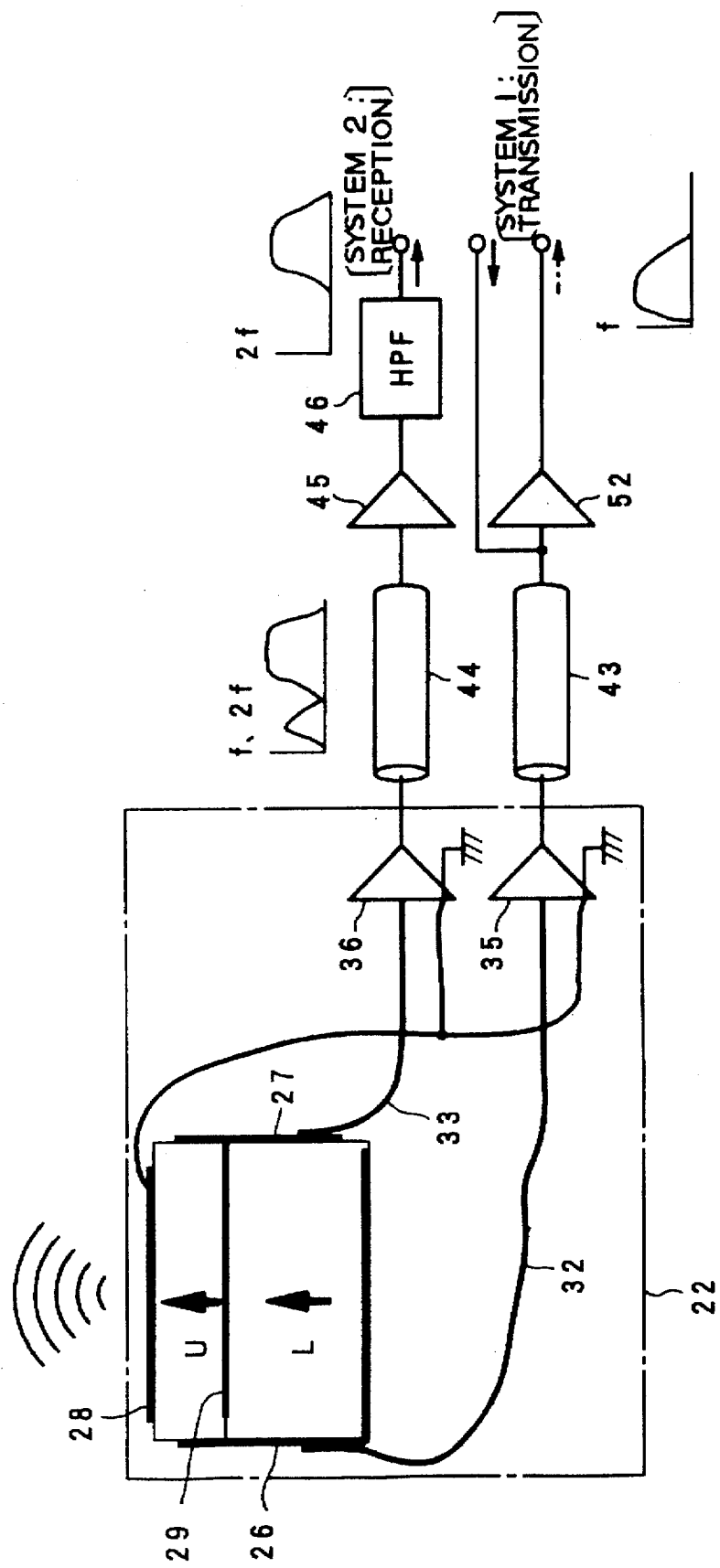
FIG. 3 is a schematic view showing the structures of electrodes attached to one transducer in the first embodiment.

The second electrodes $27_1$ to $27_n$ have intermediate electrodes $29_1$ to $29_n$ each formed as part of a second electrode at an intermediate position of the second electrode. The intermediate electrodes $29_1$ to $29_n$ divide the transducers $25_1$ to $25_n$ into two polarized areas in a thickness direction z. The position of each of the intermediate electrodes $29_1$ to $29_n$ in the thickness direction z of each transducer greatly affect the frequency characteristic of the transducer. The dual-frequency characteristic of the probe 10 is controlled by varying the positions of the intermediate electrodes FIG. 3 schematically shows a structure of a yz palne of one $29_1$ to $29_n$ and the directions of polarization. transducer $25_n$.

The dual-frequency characteristic of a transducer 25 having three electrodes 26, 27, and 28 will be described in conjunction with a typical example.

FIGS. 4A to 4D each schematically show a cross section along the yz plane viewed in the scanning direction x. Arrows in each drawing indicate the directions of polarization in division areas U and L partitioned in the thickness direction z of a transducer by an intermediate electrode 29. The position of the intermediate electrode 29 in the thickness direction z greatly affects the frequency characteristic of the transducer. In the drawings, "f" or "2f" means that the transducer offers a passband that is, as graphically shown in FIG. 5A or 5B, centered on the frequency of a fundamental component f or second harmonic 2f. "f, 2f" means that the transducer has, as graphically shown in FIG. 5C, a double-humped frequency characteristic offering two passbands centered on the frequencies of the fundamental component f and second harmonic 2f respectively.

Figures 4A, 4B, 4C, 4D:
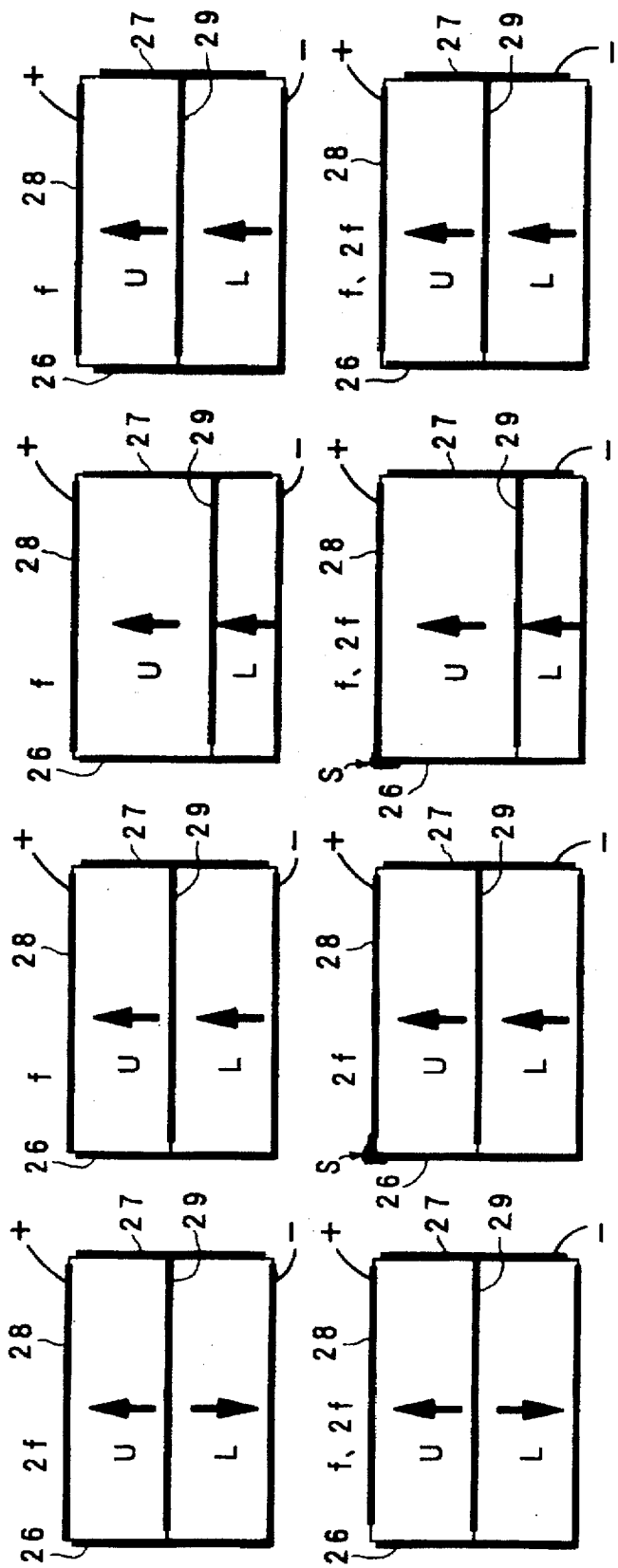
FIGS. 4A to 4D are explanatory diagrams each showing the structures of electrodes attached to each of two transducers and the frequency characteristics of the transducers dependent on different directions of polarization.
Figure 5A:
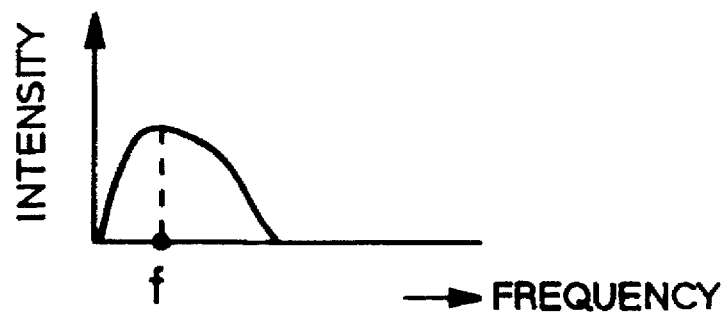
FIGS. 5A to 5C are explanatory diagrams each plotting a frequency characteristic.
Figure 5B:
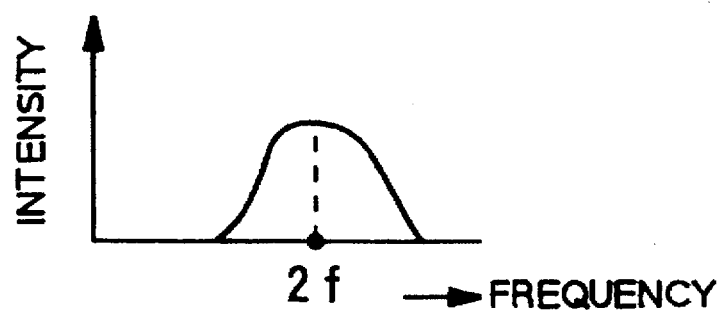
Figure 5C:
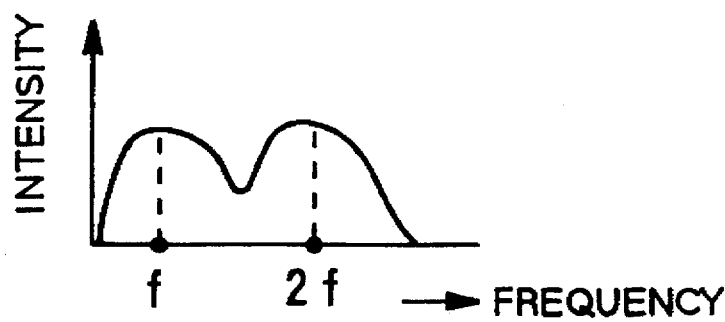

In each transducer shown in FIG. 4A, the directions of polarization in the division areas U and L are mutually-opposite directions. An intermediate electrode 29 is located at the center in a thickness direction z of each transducer. A first electrode (ground in this case) 26 and third electrode 28 provide a frequency band centered on the frequency of a second harmonic 2f (in the upper transducer in FIG. 4A). A second electrode (a ground in this case) 27 and third electrode 28 provide a double-humped frequency band covering the frequencies of the fundamental component f and second harmonic 2f (in the lower transducer in FIG. 4A).

In each transducer shown in FIG. 4B, the directions of polarization in division areas U and L are the same direction. An intermediate electrode 29 is, similarly to the one in FIG. 4A, located at the center of each transducer. In the lower transducer in FIG. 4B, the shoulder thereof is soldered (see an arrow S) in order to electrically couple first and third electrodes 26 and 28. A first electrode (ground) 26 and third electrode 28 provide a frequency band centered on the frequency of a fundamental component f (in the upper transducer in FIG. 4B). A first (=third) electrode 26 (=28) and second electrode (ground) 27 provide a frequency characteristic permitting a second harmonic to pass (in the lower transducer in FIG. 4B).

In each transducer shown in FIG. 4C, the directions of polarization and the structures of electrodes are identical to those in the one shown in FIG. 4B. The position of an intermediate electrode 29 is deviated from the center toward the back (bottom) surface of each transducer. As a result, first and third electrodes 26 and 28 provide a frequency characteristic permitting a fundamental component f to pass (in the upper transducer in FIG. 4C). First (=third) and second electrodes 26 (=28) and 27 provide a double-humped frequency characteristic permitting a fundamental component f and second harmonic 2f to pass.

In each transducer shown in FIG. 4D, the structures of electrodes are identical to those in the one shown in FIG. 4A, but the directions of polarization in division areas U and L are the same to each other. A first electrode (ground) 26 and third electrode 28 provide a frequency characteristic permitting a fundamental component f to pass (in the upper transducer shown in FIG. 4D). A second electrode (ground) 27 and third electrode 28 provide a double-humped frequency characteristic permitting a fundamental component f and second harmonic 2f to pass (in the lower transducer shown in FIG. 4D). In this case, when the position of the intermediate electrode 29 is shifted toward the ultrasonic wave transmission/reception surface, the double-humped frequency characteristic allows the second harmonic 2f to pass more smoothly than the fundamental component f.

As mentioned above, a frequency characteristic is varied depending on the structures of electrodes, position of an intermediate electrode 29, and directions of polarization. In the first embodiment, the transducer structure shown in FIG. 4D is adopted, and the position of the intermediate electrode 29 is shifted toward the ultrasonic wave transmission/reception surface. As a result, the double-humped frequency characteristic of a transducer allows a second harmonic 2f to pass more smoothly than that of a fundamental component f.

As shown in FIG. 1, a backing BK is attached to the back surface of the piezoelectric member 25, and a matching layer 30 and an acoustic lens 31 are attached in turn to the ultrasonic wave transmission/reception surface thereof.

In this embodiment, the first and third electrodes $26_1$ to $26_n$ and 28 of each of the transducers $25_1$ to $25_n$ are responsible for transmission in contrast mode (for implementing contrast echography according to B-mode scanning) and for transmission and reception in normal B mode (for producing a normal B-mode tomographic image of a tissue). The second and third electrodes $27_1$ (to $27_n$) and 28 are responsible for reception in contrast mode (see FIG. 3). The first electrodes $26_1$ to $26_n$ and third electrode 28 are led to the outside of the probe head 22 via buffer amplifiers $35_1$ to $35_n$ associated with the transducers by way of lead wires $32_1$ to $32_n$ and 34, and thus constitute "system 1." Likewise, the second electrodes $27_1$ to $27_n$ and third electrode 28 are led to the outside of the probe head 22 via buffer amplifiers $36_1$ to $36_n$ associated with the transducers by way of lead wires $33_1$ to $33_n$, and thus constitute "system 2."

Each of the buffer amplifiers $35_1$ to $35_n$ and $36_1$ to $36_n$ includes, as shown in an enlarged view in an inlet of FIG. 1, an amplifier AMP having an emitter follower type transistor, and a cross diode DID connected in parallel with the amplifier AMP. For transmission, the transistor in the amplifier AMP is turned off due to a large driving current and enters a non-operating state and the cross diode DID is kicked on because of a high voltage. This causes the driving current to flow as indicated with an arrow T in FIG. 1. Each transducer is thus driven. However, for reception, since the voltage of an echo is low, the cross diode DID remains off. This causes the echo to flow as indicated with an arrow R in FIG. 1 into a receiving/processing system via the amplifier AMP that is placed in an operating state using a bias voltage. Thus, the capability of an impedance transformer is provided.

As mentioned above, since the buffer amplifiers $35_1$ to $35_n$ and $36_1$ to $36_n$ each having a high input impedance are situated in the vicinity of the transducers (in the probe head 22), each lead wire to each transducer can be terminated with a high impedance. When a cable for signal transmission is connected directly to each transducer, a transmitting system and receiving system act as a load to each other. This may bring about an event that a desired transmission characteristic is not attained. However, in this embodiment, since the buffer amplifiers $35_1$ to $35_n$ and $36_1$ to $36_n$ each provide a high impedance for termination, such event can be avoided reliably.

The main unit 11 includes circuits constituting a transmitting system for driving the probe 10 and circuits constituting a receiving/processing system for receiving and processing signals sent from the probe 10. An input system including an operation panel and a detecting system for detecting a biomedical signal such as a echocardiogram (hereinafter ECG) signal are also included but not illustrated.

The transmitting system is used in common between contrast and normal B modes, comprising a clock generator 40, transmission delay circuit 41, and pulser circuit 42. The clock generator 40 is a circuit for generating a clock for use in determining the timing of transmitting an ultrasonic wave or determining a transmission frequency. The transmission delay circuit 41 is a circuit for effecting transmission focusing by delaying signals for transmission. The pulser circuit 42 consists of the same number of pulsers as the number of individual channels associated with the transducers, generates a driving pulse for each channel according to delayed transmission timing, and supplies driving pulses to system 1 of the probe 10 over transmission lines $43_1$ to $43_n$.

The receiving/processing system is divided into subsystems for contrast and normal B modes. The contrast-mode receiving/processing subsystem is led to the buffer amplifiers $36_1$ to $36_n$ associated with channels of system 2 of the probe 10 by way of the transmission lines $44_1$ to $44_n$, and composed of a preamplifier circuit 45, high-pass filter (hereinafter HPF) circuit 46, reception delay & adding circuit 47, receiver 48, digital scan converter 49 (hereinafter DSC), and monitor 50 which are connected in that order in the output stage of the transmission lines $44_1$ to $44_n$.

The preamplifier circuit 45 amplifiers the power of an echo received through each reception channel of system 2 on the basis of the double-humped (f and 2f) frequency characteristic (see FIGS. 3 and 5), and sends a resultant echo to the reception delay & adding circuit 47 via the HPF circuit 46. The HPF circuit 46 consists of HPFs each passing a second harmonic 2f alone out of a double-humped echo, and has a cutoff frequency, which marks the lower limit of the passband thereof, determined so that a fundamental component f can be cut off. As shown in FIG. 3, a received echo entering the reception delay & adding circuit 47 contains the second harmonic 2f alone.

The position of the HPF circuit 46 is not limited to the foregoing one but may be set in the input stage of the preamplifier circuit 45 or the output stage of the reception delay & adding circuit 47. When the specifications for a transducer are defined so that a transducer of system 2 contains a second harmonic 2f alone (see the lower transducer in FIG. 4B), the HPF circuit can be omitted. Alternatively, a resonant circuit that becomes resonant relative to a second harmonic and passes the second harmonic alone may be substituted for the HPF circuit.

The reception delay & adding circuit 47 consists of delay circuits associated with reception channels and an adder for adding the results of delay, and executes reception focusing for received echoes. The receiver 48 is a receiving/processing circuit for performing envelope detection and logarithmic decrementation on a second harmonic 2f and acquiring an image signal representing a contrast B-mode image. The DSC 49 consists of an A/D converter, multiplexer, frame memory, read/write circuit, and D/A converter, and produces an image signal constituting one frame according to a designated display form. The image signal can be read in conformity with a standard TV system. The image signal read from the DSC 49 is output to the monitor 50 and displayed.

The normal B-mode receiving/processing subsystem consists, as shown in FIG. 1, of a preamplifier circuit 52, reception delay & adding circuit 53, receiver 54, DSC 55, and monitor 56 which are connected in parallel with the transmitting system. The receiver and subsequent circuit elements may be shared with the contrast-mode subsystem. The normal B-mode receiving/processing subsystem processes echoes each resulting from transmission of a fundamental component f performed by the transmitting system, and displays a normal B-mode tomographic image.

As mentioned above, the electronic sector probe 10 having 64 elements is structured, and the transmitting/receiving system having 128 channels is constructed for driving the probe 10. In contrast mode, ultrasound beams are transmitted through system 1 (64 channels) involving the transducers $25_1$ to $25_n$ of the probe 10, and then echoes are received through system 2 (64 channels) thereof. Since system 1 has, as described previously, the frequency characteristic permitting a fundamental component f to pass, ultrasound beams each having the fundamental component f alone are irradiated to a desired diagnostic region of a subject. Since an ultrasound contrast medium is flowing into or out from the diagnostic region by means of blood, each of echoes consists mainly of scattered components induced by a tissue and the ultrasound contrast medium; that is, nonlinear scattered components including a second harmonic induced by the contrast medium are included in each echo.

The echoes are received through system 2 of the probe 10 having the double-humped frequency characteristic. Since the intermediate electrodes $29_1$ to $29_n$ of the transducers $25_1$ to $25_n$ are off-centered and positioned near the transmission/reception surfaces of the transducers in order to suppress the sensitivity to a fundamental component f, the saturation of the receiving system due to the contrast medium can be avoided.

The power of each of the echoes sent from the probe 10 is amplified by the preamplifier circuit 45. The gain for the preamplifiers constituting the preamplifier circuit 45 is set to a larger value than that in normal B mode, and the frequency characteristics of the preamplifiers relative to the gain are defined to offer a frequency band centered on the frequency of a second harmonic 2f. This makes it possible to receive the second harmonic 2f contained in each echo at a better signal-to-noise ratio.

The second harmonic 2f alone of each echo is extracted by the HPF circuit 46, and processed as mentioned above. This results in a contrast-mode B-mode image signal deriving from the second harmonic stemming from nonlinear scattering caused by a contrast medium. The image signal is displayed as a contrast image of a subject resulting from myocardial contrast echography. A blood-perfusing region in the cardiac muscle due to myocardial perfusion can then be assessed.

In the diagnostic ultrasound system of this embodiment, ultrasound beams each containing a fundamental component f is transmitted or received through system 1 in normal B mode. This results in a normal B-mode image. Thus, the diagnostic ultrasound system has both the contrast-mode and normal B-mode imaging capabilities which can be used selectively. The diagnostic ultrasound system is an excellent general-purpose modality.

As mentioned above, a probe (transducers) is designed to have different frequency characteristics between transmission and reception. The probe and transmitting/receiving system are constructed so that a fundamental component f alone can be transmitted during transmission, and a second harmonic whose power can be the largest among all nonlinear(non-fundamental) components is received at a high signal-to-noise ratio. Owing to the echo enhancement effect of an ultrasound contrast medium containing microscopic foams and causing a strong nonlinear scattering characteristic, echoes emanating from tissues other than the foams can be distinguished from those emanating from the foams at a high signal-to-noise ratio. When an ultrasound contrast medium is injected intravenously, if the concentration of the contrast medium decreases in a diagnostic region, the brightness enhancement effect of the contrast medium (that is, a blood flow) in a region reflecting large echoes; such as, the cardiac muscle or any organ can be detected efficiently. A blood flow in the cardiac muscle or a microscopic circulation in an organ can be imaged with high quality (high signal-to-noise ratio and high resolution). As a result, imaging of a myocardial blood flow by means of contrast echography based on intravenous injection can be adapted for examination of the cardiovascular system. Ultrasonic assessment of myocardial infarction can be achieved at a high patient throughput without the necessity of imposing an unnecessary and unpleasant load on a patient or the need of a large-scale facility for indwelling a catheter. In addition, high-quality imaging of a microscopic intrahepatic circulation or tumoral blood flow, and high-quality imaging of the parenchymatous kidney can be adapted for abdominal examination.

(Second Embodiment)

Figure 6:
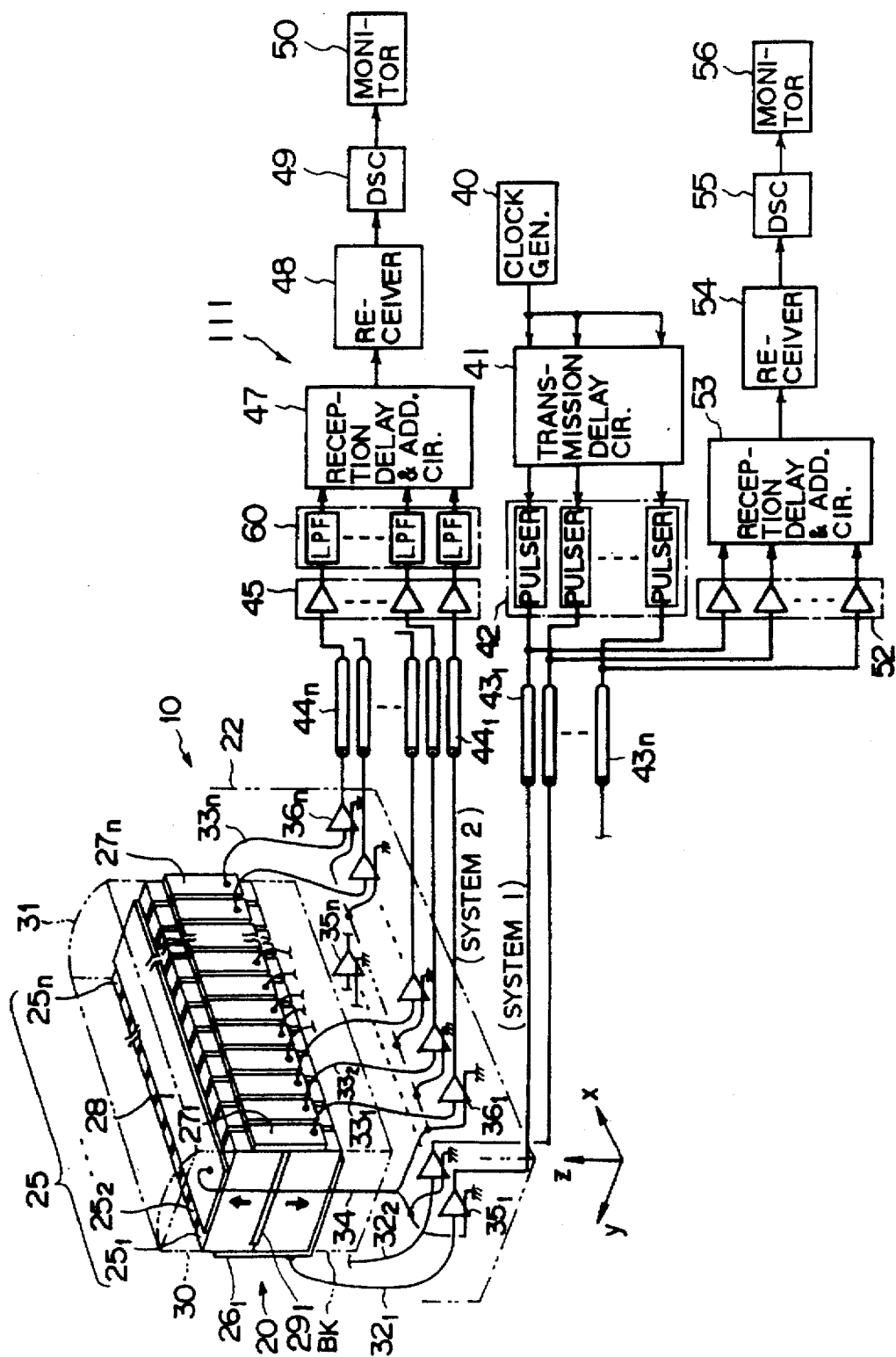
FIG. 6 is a schematic block diagram showing a diagnostic ultrasound system of the second embodiment of the present invention.
Figure 7:
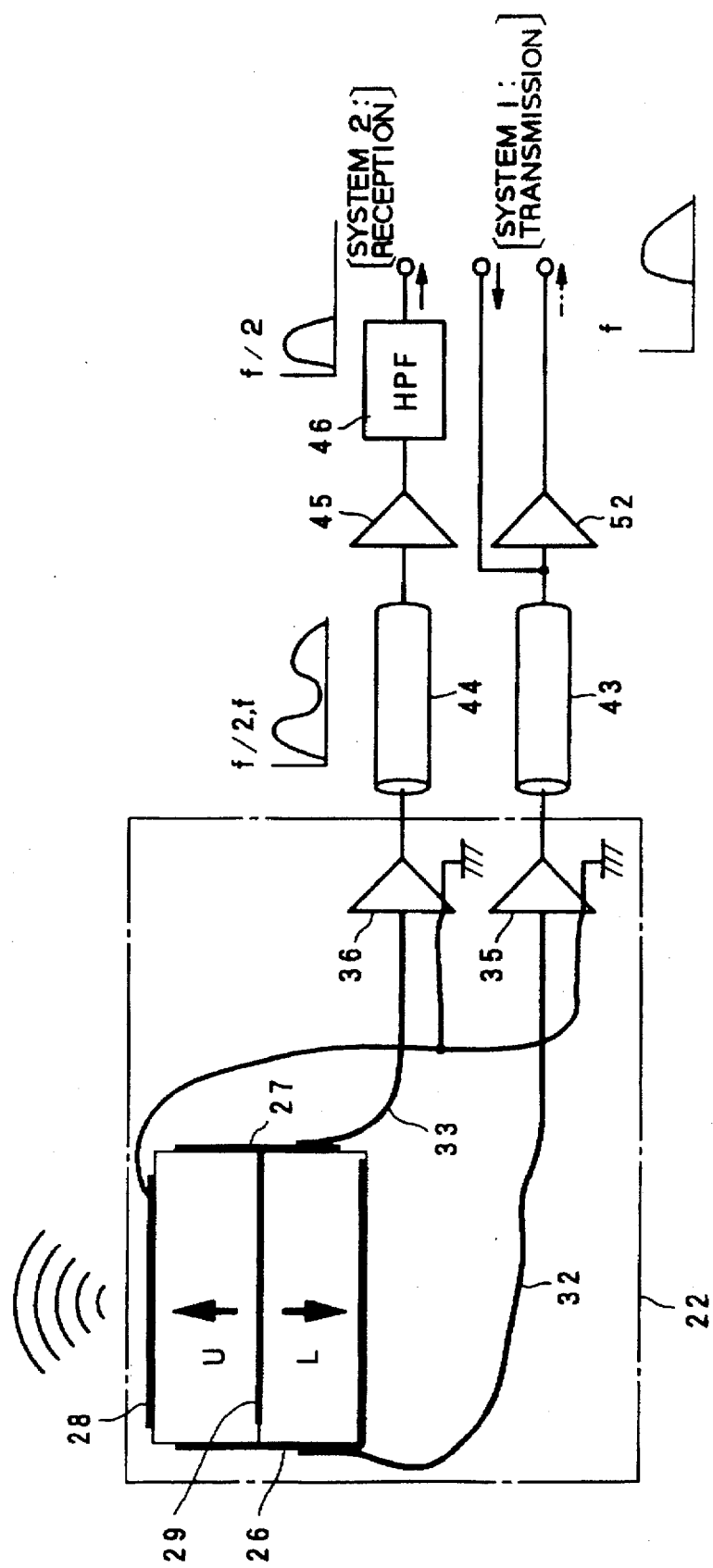
FIG. 7 is a schematic view showing the structures of electrodes attached to one transducer in the second embodiment.

The second embodiment of the present invention will be described in conjunction with FIGS. 6 and 7. Component elements identical to or similar to those in the first embodiment will be assigned the same reference numerals. The description of those elements will be omitted or briefly described.

A probe 10 in the second embodiment is a 64-element electronic sector probe of a phased-array type, and has the electrodes led to outside as described previously in conjunction with FIG. 4A. Specifically, each of intermediate electrodes 29 is positioned at the center in a thickness direction z of an transducer. First electrodes 26 attached to one of the side surfaces and back surfaces of the transducers and a third electrode (ground) 28 attached to transmission/reception surfaces thereof constitute system 1. Second electrodes 27 attached to the other side surface of the transducers and the third electrode 28 constitute system 2 (see FIG. 7). Assuming that the frequency band for system 1 is centered on the frequency of a fundamental component f, system 2 has a double-humped frequency characteristic permitting the fundamental component f and a subharmonic f/2 to pass.

In this embodiment, system 1 of the probe 10 is used for 64-channel transmission (on a frequency band centered on the frequency of a fundamental component f) in contrast mode, while system 2 is used for 64-channel reception (on a frequency band centered on the frequency of a subharmonic f/2). The transmitting/receiving system is identical to that shown in FIG. 1 except that the receiving system has a low-pass filter (hereinafter LPF) circuit 60 interposed between the preamplifier circuit 45 and reception delay circuit adder 47. The LPF circuit 60 consists of LPFs associated with the channels, passes received echoes, of which frequencies correspond to a frequency band centered on the frequency of the subharmonic f/2, among all the echoes received by the transducers having the double-humped frequency characteristic (f/2 and f), and cuts off echoes each containing the fundamental component f. Thus, transmission is achieved on the frequency band centered on the frequency of the fundamental component f. Reception is achieved on the frequency band centered on the frequency of the subharmonic f/2. Similarly to the above described embodiment, only the subharmonic f/2 stemming from nonlinear scattering caused by an ultrasound contrast medium is received. A B-mode contrast image deriving from the subharmonic f/2 (amplitude/brightness-modulated image); that is, a contrast image can be displayed.

In this case, the gain for the preamplifier circuit 45 can be set to a larger value than that in normal B mode, and a subharmonic can be received at a better signal-to-noise ratio. Since signals are fetched through the intermediate electrodes, the sensitivity to a fundamental component f is suppressed. The saturation of the receiving system due to an ultrasound contrast medium can therefore be avoided, whereby a sufficient dynamic range can be ensured.

In this embodiment, normal B-mode imaging can also be achieved. For this, the transmitting system connected to system 1 is assigned to transmission in normal B mode, and the normal B-mode receiving system is, as shown in FIG. 6, connected in parallel with the transmitting system. Thus, the diagnostic ultrasound system is designed to be a multi-function modality.

(Third Embodiment)

The third embodiment of the present invention will be described in conjunction with FIGS. 8 and 9.

A probe 10 in this embodiment is formed as an electronic sector probe of a phased-array type having a dual-frequency characteristic. Unlike the probes in the aforesaid embodiments, the probe has transducers thereof divided structurally into two groups of transducers 1 and 2 in terms of two frequency components f and 2f.

Figure 8:
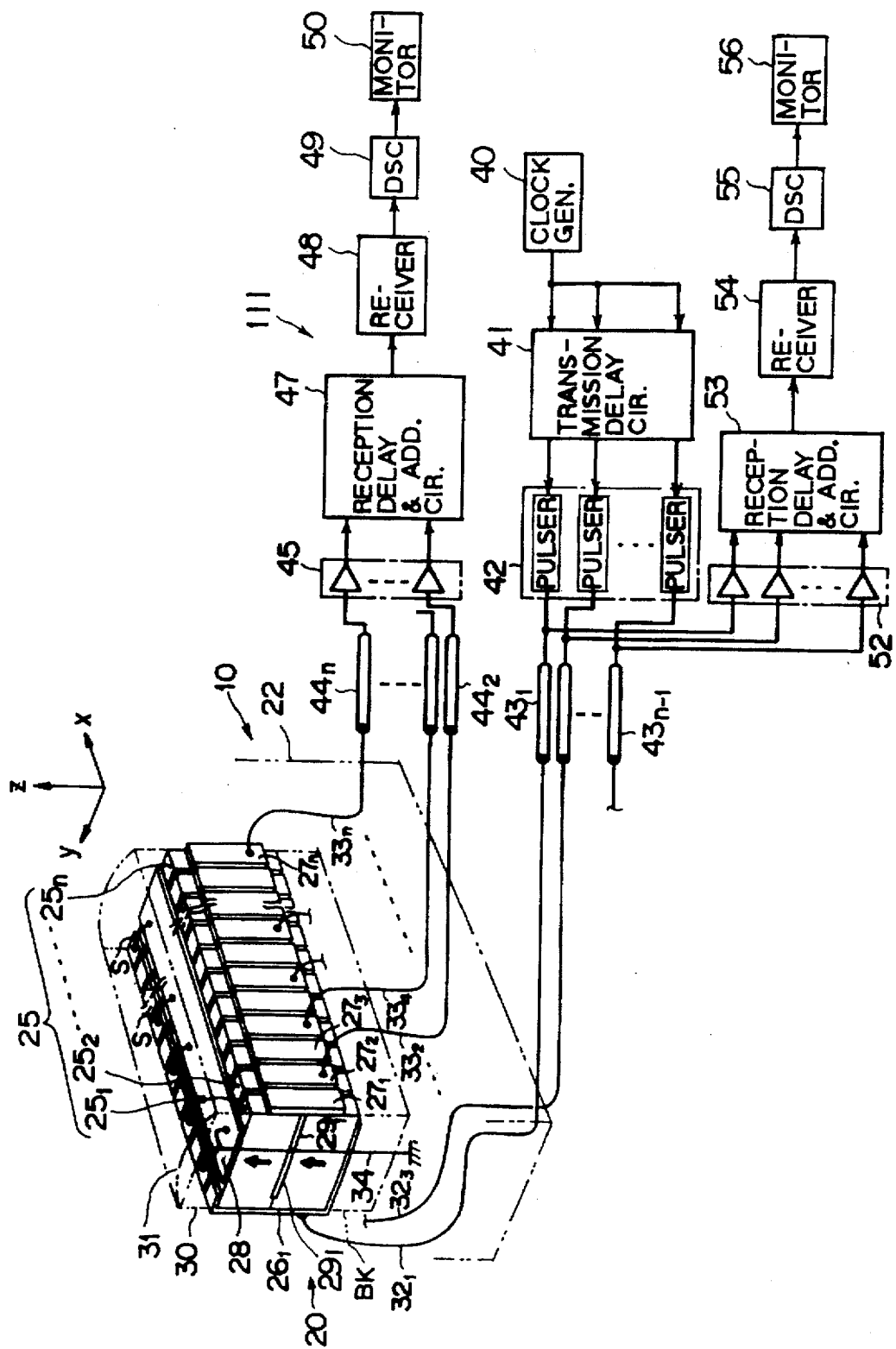
FIG. 8 is a schematic block diagram showing a diagnostic ultrasound system of the third embodiment of the present invention.

To be more specific, as shown in FIG. 8, the probe 10 has transducers $25_1$ to $25_n$ (where n equals to, for example, 128) of 128 elements arranged in a scanning direction x. Similarly to the ones in the aforesaid embodiments, first to third electrodes $26_1$ (to $26_n$), $27_1$ (to $27_n$), and 28 are attached to each of the transducers $25_1$ to $25_n$. The ends of the first electrodes $26_1$ to $26_n$ on the side of transmission/reception surfaces of the transducers are extended to the transmission/reception surfaces, angled along the transmission/reception surfaces, and thus attached to the transmission/reception surfaces.

Figure 9:
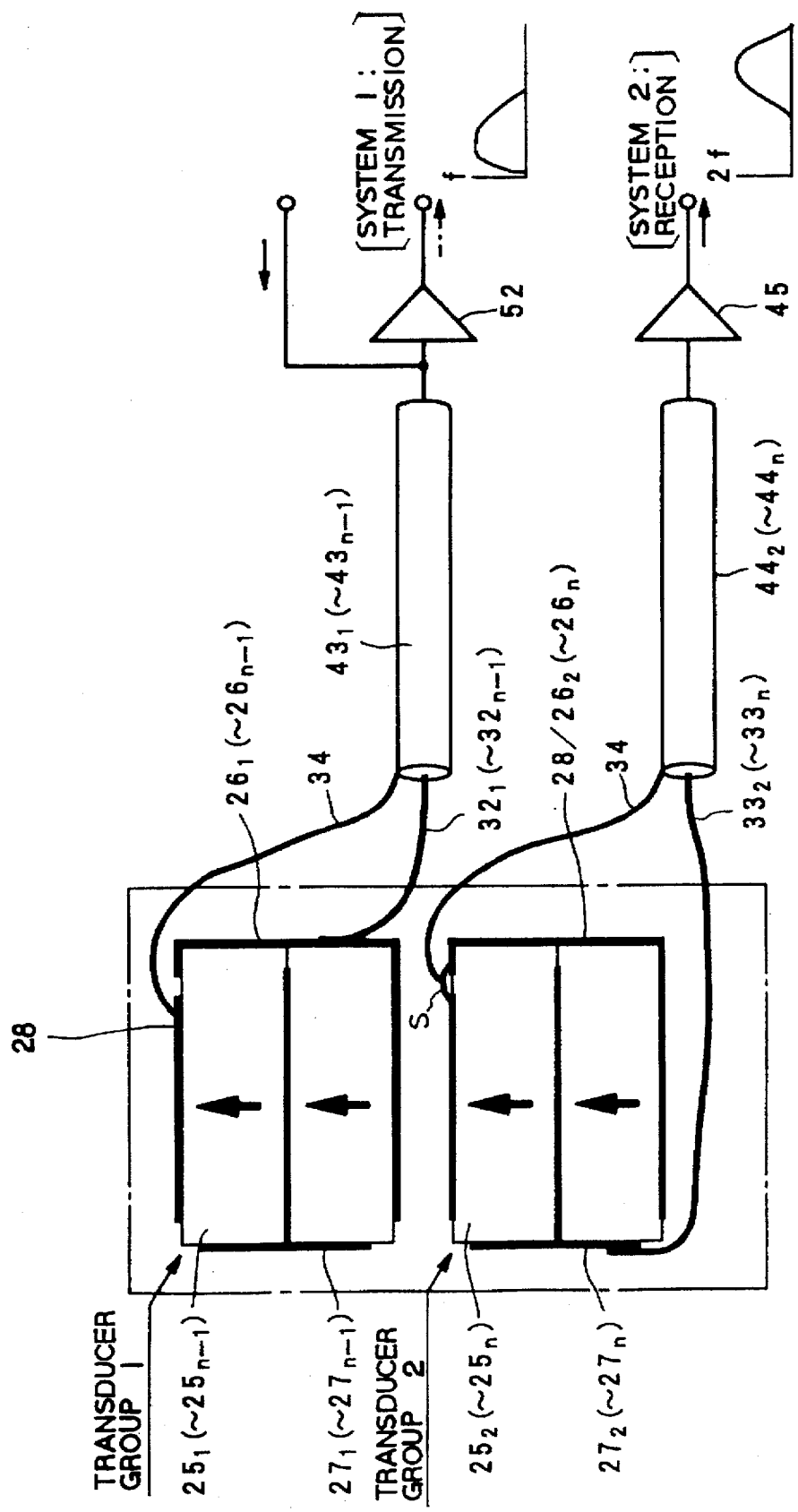
FIG. 9 is a schematic view showing the structures of electrodes attached to one transducer in the third embodiment.

Among the transducers $25_1$ to $25_n$ that are divided structurally and have the electrodes attached as mentioned above, odd-numbered transducers $25_1$, $25_3$, etc., and $25_{n-1}$ constitute "transducer group 1," and even-numbers transducers $25_2$, $25_4$, etc., and $25_n$ constitute "transducer group 2" (see FIG. 9). The transducers of the two transducer groups 1 and 2 are arranged alternately in a scanning direction. Out of the two transducer groups 1 and 2, the transducer group 1 consisting of odd-numbers transducers has the electrodes arranged and led to outside in the same manner as the upper transducer shown in FIG. 4B. The transducer group 1 therefore has a frequency characteristic permitting a frequency band centered on the frequency of a fundamental component f to pass. In this embodiment, the transducer group 1 is allocated to system 1, and assigned to transmission in contrast mode and to transmission and reception in normal B mode. The transducer group 2 consisting of even-numbered transducers has electrodes arranged and led to outside in the same manner as the lower transducer shown in FIG. 4B, and has a frequency characteristic permitting a frequency band centered on the frequency of a second harmonic 2f to pass. The transducer group 2 is allocated to system 2 and dedicated to reception in contrast mode.

Since the second electrodes $27_1$, $27_3$, etc., and $27_{n-4}$ of the transducer group 1 are not involved in any operation, they may be structured to be detachable. For the sake of manufacturing efficiency, however, the second electrodes remain undetachable. The ends of the first electrodes $26_2$, $26_4$, etc., and $26_n$ of transducer group 2 on the side of the irradiation surfaces are electrically coupled to the third electrode, or ground 28, by applying solder S. The ground 28 may be segmented in association with the transducers in the scanning direction x.

A main unit 11 includes a 64-channel transmitting system for contrast mode (composed of a clock generator 40, transmission delay circuit 41, and pulser circuit 42). The transmitting system is connected to the transducers $25_1$, $25_3$, etc., and $25_{n-1}$ of transducer group 1 linked to system 1 by way of transmission lines $43_1$, $43_3$, etc., and $43_{n-1}$. The transmitting system is connected in parallel with a receiving system for normal B mode (composed of a preamplifier circuit 52, reception delay & adding circuit 53, receiver 54, DSC 55, and monitor 56). The main unit 11 further includes a 64-channel receiving system for contrast mode (composed of a preamplifier circuit 45, reception delay & adding circuit 47, receiver 48, DSC 49, and monitor 50). The channels are connected to the transducers $25_2$, $25_1$, etc., and $25_n$ of transducer group 2 linked to system 2 by way of transmission lines $44_2$, $44_1$, etc., and $44_n$.

In contrast mode, ultrasound beams are transmitted by transducer group 1, and echoes are received by transducer group 2 whose transducers alternate with transducers of transducer group 1. Thus, only a second harmonic stemming from nonlinear scattering caused by an ultrasound contrast medium employed in contrast echography based on intravenous injection can be received, and a brightness-modulated image can be displayed. Although only one probe is employed, transducers are alternately set to either of two different frequency bands f and 2f. Thus, the transducers are dedicated to either transmission or reception. Echoes emanating from a blood flow (that is, a contrast medium) in a microscopic circulation can be detected and imaged at a high signal-to-noise ratio. In particular, since the gain for the preamplifier circuit 45 can be set to a higher value than that in normal B-mode, a second harmonic 2f can be received at a much higher signal-to-noise ratio.

In normal B mode, transducer group 1 is used for transmission and reception. A brightness-modulated image derived from a fundamental component f can be displayed.

A LPF or resonant circuit for passing a fundamental component f alone may be included in the transmitting system connected to transducer group 1 (having a frequency characteristic f). In this case, in contrast mode, occurrence of a second harmonic 2f in the transmitting system can be suppressed reliably. A high-purity beam containing the fundamental component f alone can be received, and a second harmonic 2f induced by a contrast medium can be detected highly accurately.

As mentioned above, when a LPF or resonant circuit are connected to system 1 linked to transducer group 1, a selector switch may be interposed between the LPF or resonant circuit and system 1 so that the LPF and resonant circuit will not operate in normal B mode.

Various variations are conceivable for arrangement of transducer groups. The aforesaid alternate arrangement in which 64 elements of one of two transducer groups 1 and 2 alternate with 64 elements of the other group is simple so as to facilitate manufacturing efficiency. However, the present invention is not limited to this form of arrangement. Alternatively, 128 elements lying in a scanning direction may be divided in consecutive 64 elements into transducer groups 1 and 2. The ratio of the number of transducers of transducer group 1 to that of transducer group 2 may be set to any other than 1:1. Moreover, each transducer of one of transducer groups may be arranged every two or three transducers of the other transducer group.

(Fourth Embodiment)

Figure 10:
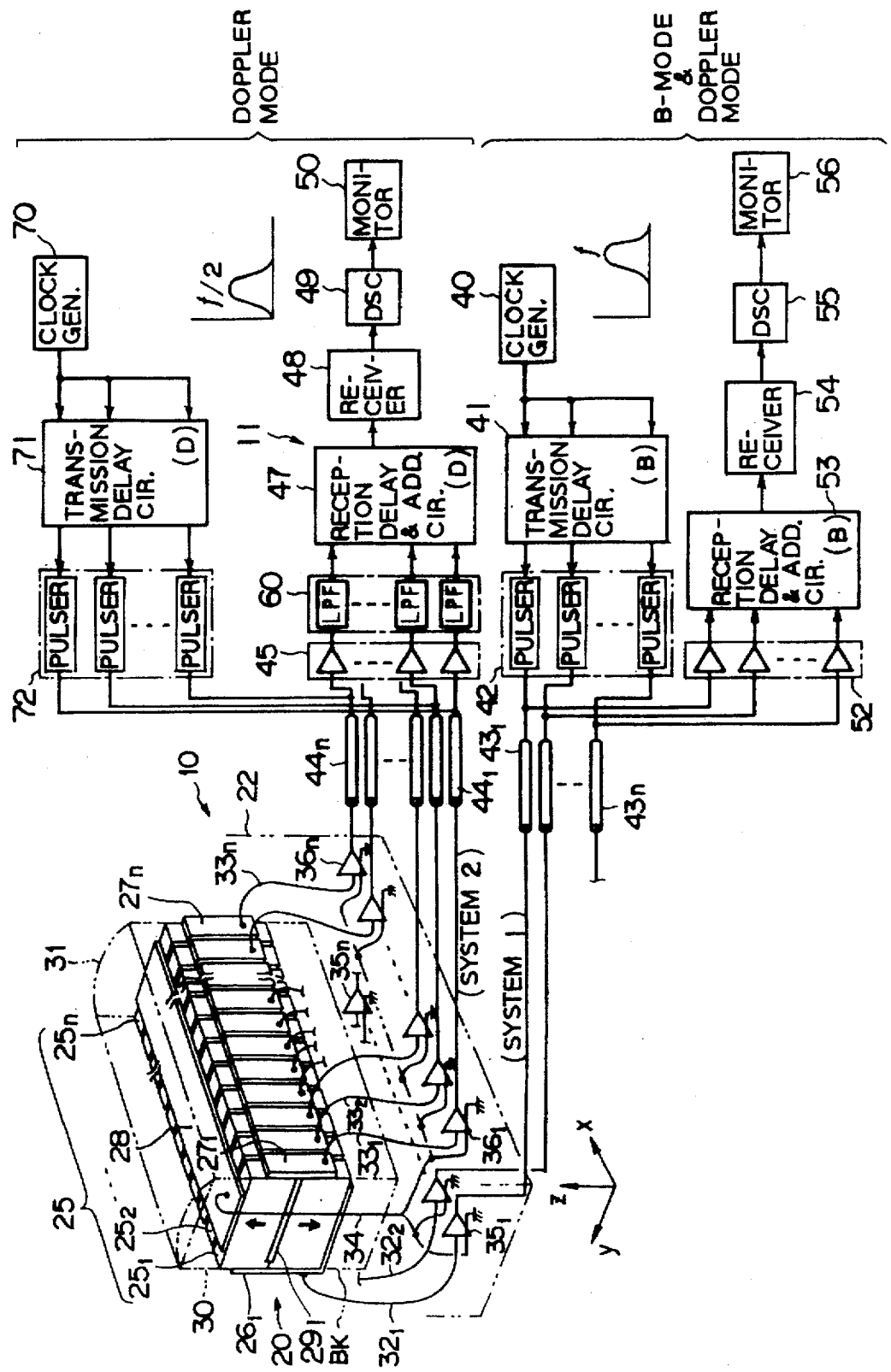
FIG. 10 is a schematic block diagram showing a diagnostic ultrasound system of the fourth embodiment of the present invention.

FIG. 10 shows a diagnostic ultrasound system of the fourth embodiment of the present invention. The diagnostic ultrasound system acquires velocity information from a blood flow together with information concerning a B-mode tomographic image, and includes a probe 10 having three electrodes 26 to 28 (intermediate electrodes 29) attached in accordance with the present invention. The probe 10 has the same structure as the one of the second embodiment shown in FIG. 6 (has electrodes thereof led to outside as shown in FIG. 4A).

System 1 of the probe 10 is connected to circuits 40, 41, and 42 of a transmitting system and circuits 52, 53, 54, 55, and 56 of a receiving/processing system, wherein the transmitting system and receiving/processing system are connected in parallel with each other. System 2 of the probe 10 is connected to a transmitting system including a clock generator 70, transmission delay circuit 71, and pulser circuit 72, and to a series of circuits 45, 60, 47, 48, 49, and 50 constituting a receiving/processing circuit (equivalent to the circuitry in FIG. 6 with the circuits 70 to 72 added). Systems 1 and 2 have independent transmitting and receiving capabilities. System 1 is assigned to normal B-mode tomography and Doppler-mode imaging, and system 2 is assigned to Doppler-mode imaging. In normal B-mode, transmission and reception are achieved at a higher frequency (frequency of a fundamental component f) handled by system 1. In Doppler mode, transmission and reception are achieved at a lower frequency (frequency of a subharmonic f/2) handled by system 2.

In the diagnostic ultrasound system having the foregoing configuration, when blood flow information is acquired in Doppler mode, the advantage of improved sensitivity is provided as described below.

For detecting a blood flow signal emanating from even a peripheral region, the diagnostic system is requested to offer higher sensitivity for detection. It is already known that a biomedical attenuation of an ultrasound signal is the factor affecting sensitivity most greatly. In a known diagnostic system, the transmission and reception frequencies for Doppler-mode imaging are set to rather low frequencies within a frequency band permissible by the system. However, the frequency band permissible by the known system is normally narrow and the low frequencies are 0.8 times the center frequencies of waves transmitted and received by a probe. According to the embodiment shown in FIG. 10, the transmission and reception frequencies for Doppler-mode imaging can be lowered to half of the center frequencies for B-mode imaging (corresponding to the center frequencies of waves transmitted and received by a known probe). Assuming that the biomedical attenuation is 0.6 dB/MHz/cm, when a 3.5 MHz probe is employed, a depth in an object is X cm, and an improvement in sensitivity is G dB, the following expression is established:

$$G(dB)=2\times 0.6\times 3.5\times (0.8-0.5)\times X(cm)$$

An improvement in sensitivity of +13 dB is attained at a depth of 10 cm. A greater effect is exerted in a higher-frequency probe.

Various variations are conceivable for arrangement of transducer groups. The aforesaid alternate arrangement in which 64 elements of one of two transducer groups 1 and 2 alternate with 64 elements of the other group is simple so as to facilitate manufacturing efficiency. However, the present invention is not limited to this form of arrangement. Alternatively, 128 elements lying in a scanning direction may be divided in consecutive 64 elements into transducer groups 1 and 2. The ratio of the number of transducers of transducer group 1 to that of transducer group 2 may be set to any other than 1:1. Moreover, each transducer of one of transducer groups may be arranged every two or three transducers of the other transducer group.

In addition, variations for the dual-frequency characteristic can be obtained in a phased-array type probe, as shown in FIGS. 11 to 14 where the same or equivalent elements as ones described in the foregoing embodiments are given the same or similar reference numerals. In those figures, a backing, matching layer and acoustic lens are omitted.

Figure 11:
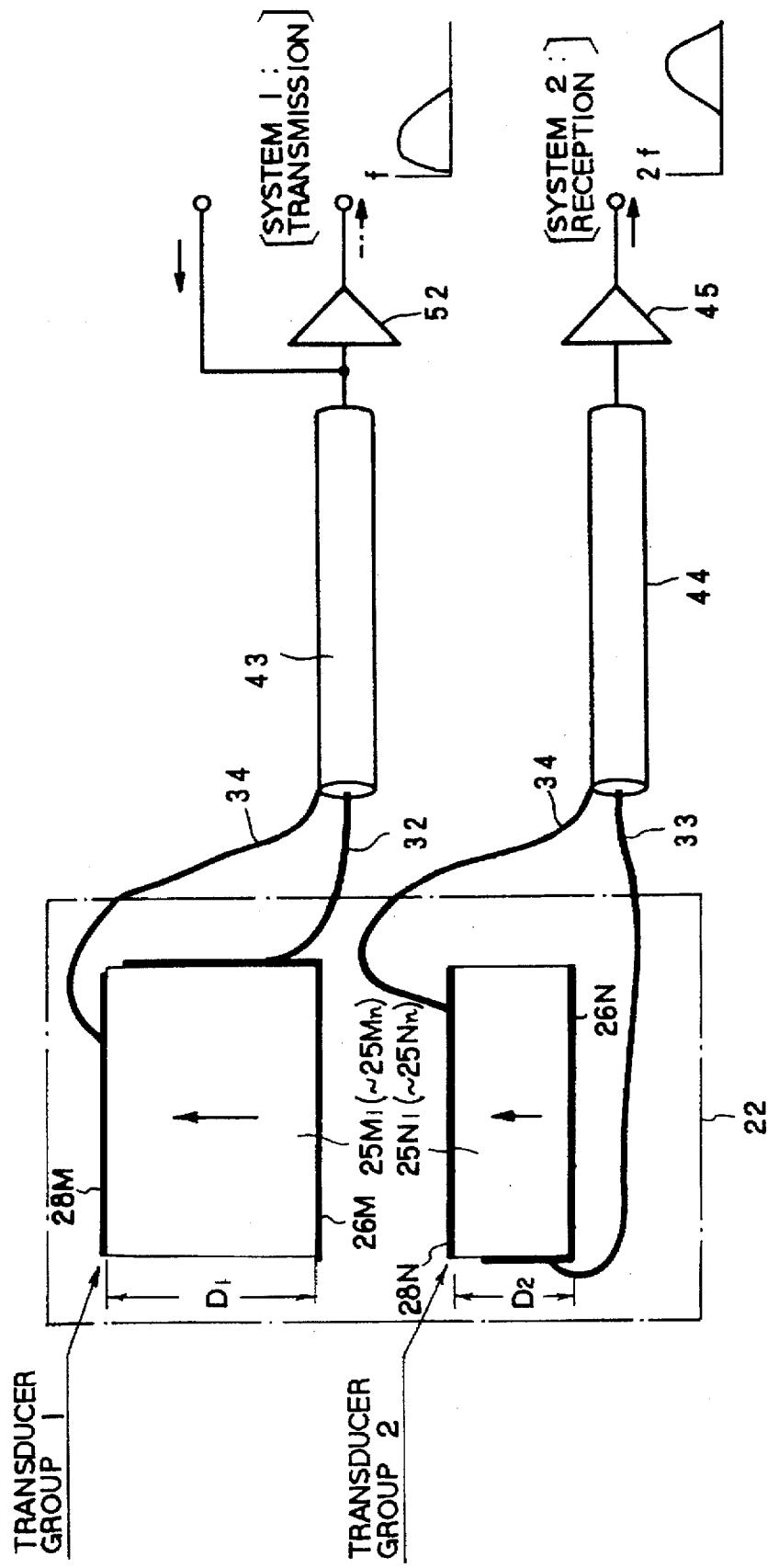
FIG. 11 is a schematic view showing the structure of a probe head according to a variation of a dual-frequency probe.

The probe head 22 shown in FIG. 11 uses two-type transducer groups 1 and 2 each of which comprises a plurality of transducers formed by piezoelectric member $25M_1$ to $25M_n$ ($25N_1$ to $25N_n$). Each of the transducers $25M_1$ to $25M_n$ belonging to one transducer group 1, to which electrodes 26M and 28M are attached, respectively, has a thickness D1, while each of the transducers $25N_1$ to $25N_n$ belonging to the other transducer group 2, to which electrodes 26N and 28N are attached, respectively, has a thickness D2 different from D1 in value. Such difference in the thickness causes a different two passbands of frequency.

Figure 12A:
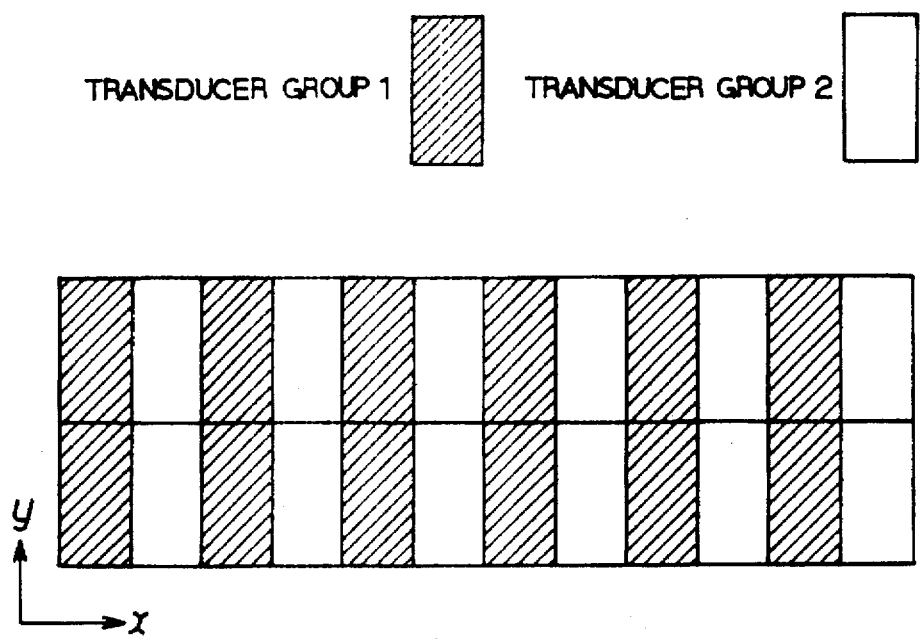
FIGS. 12A to 12C each pictorially show allocations of two transducer groups in an array probe.
Figure 12B:
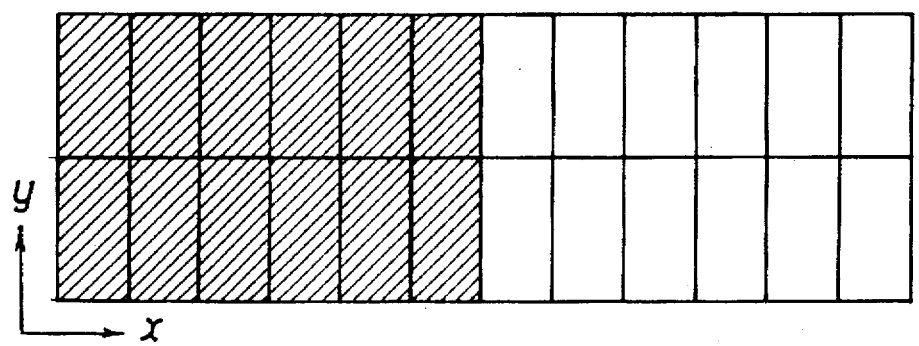
Figure 12C:
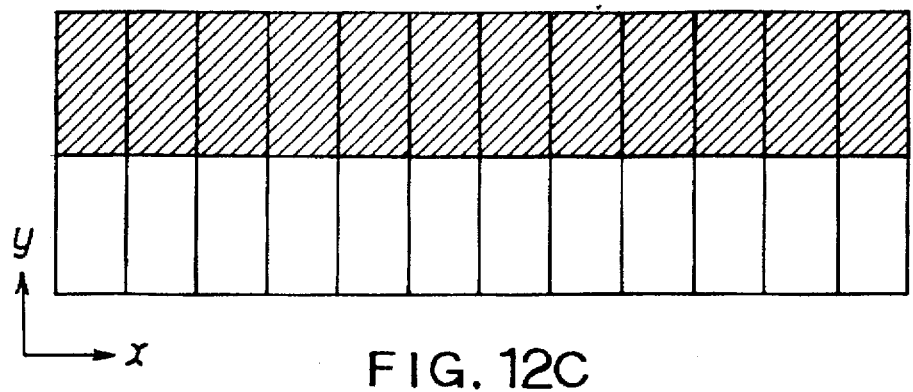
Figure 13:
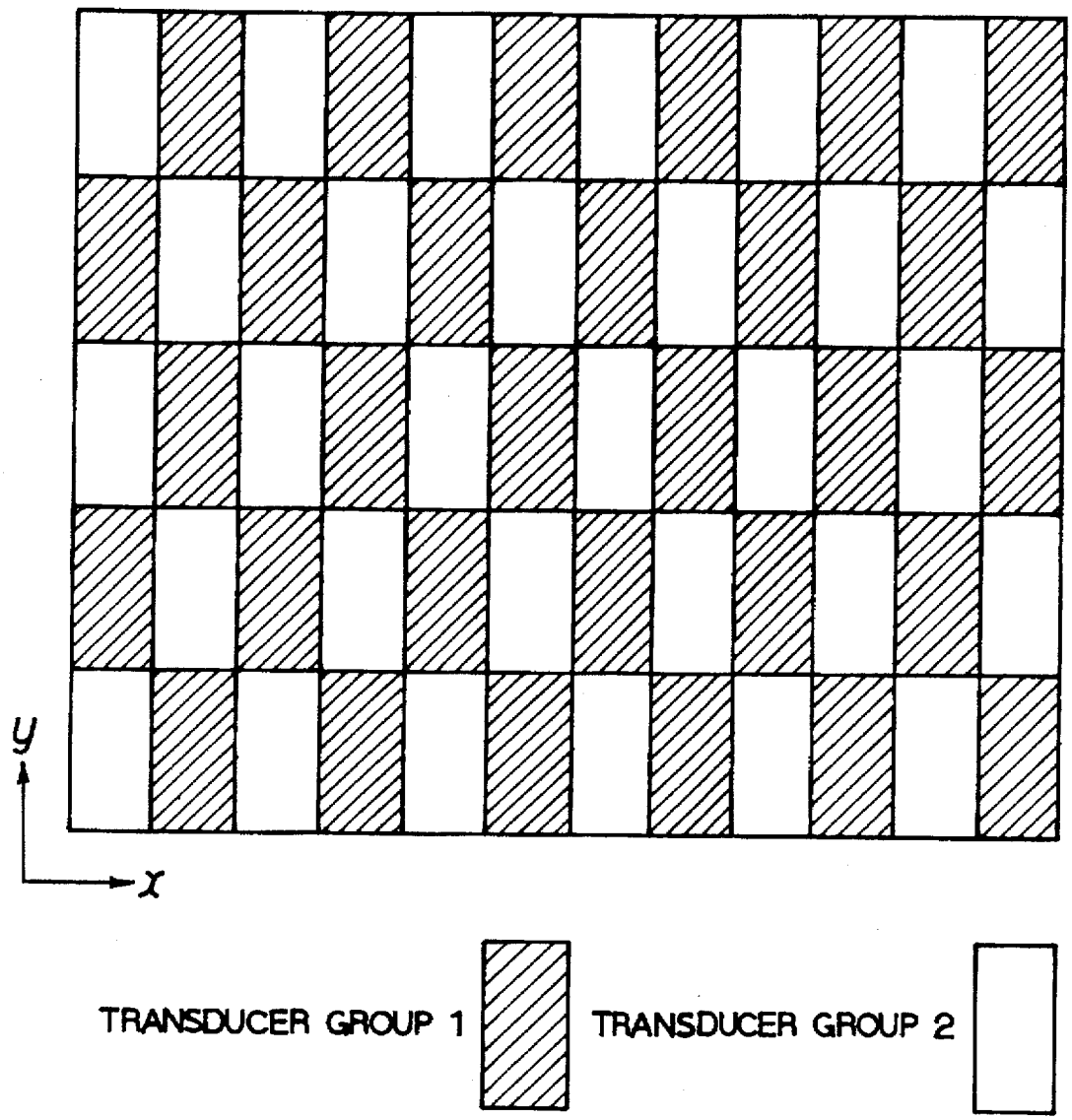
FIG. 13 pictorially shows an allocation of two transducer groups in a two-dimensional array probe.

Allocation of such transducer groups 1 and 2 is exemplified in FIGS. 12A to 12C and 13. The transducer groups 1 and 2 in FIG. 12A are alternately arranged in the scanning direction x, those groups 1 and 2 in FIG. 12B are separately arranged group by group in the scanning direction x, and those groups 1 and 2 in FIG. 12C are separately arranged group by group in the slicing direction y perpendicular to the direction x. The number of transducers belonging to each transducer group 1 (or 2) is arbitrary, not limited to equal numbers between the groups. One allocation example for a two-dimensional array-type probe is illustrated in FIG. 13. Other allocation methods are of course possible for two-dimensional array-type probe.

Figure 14:
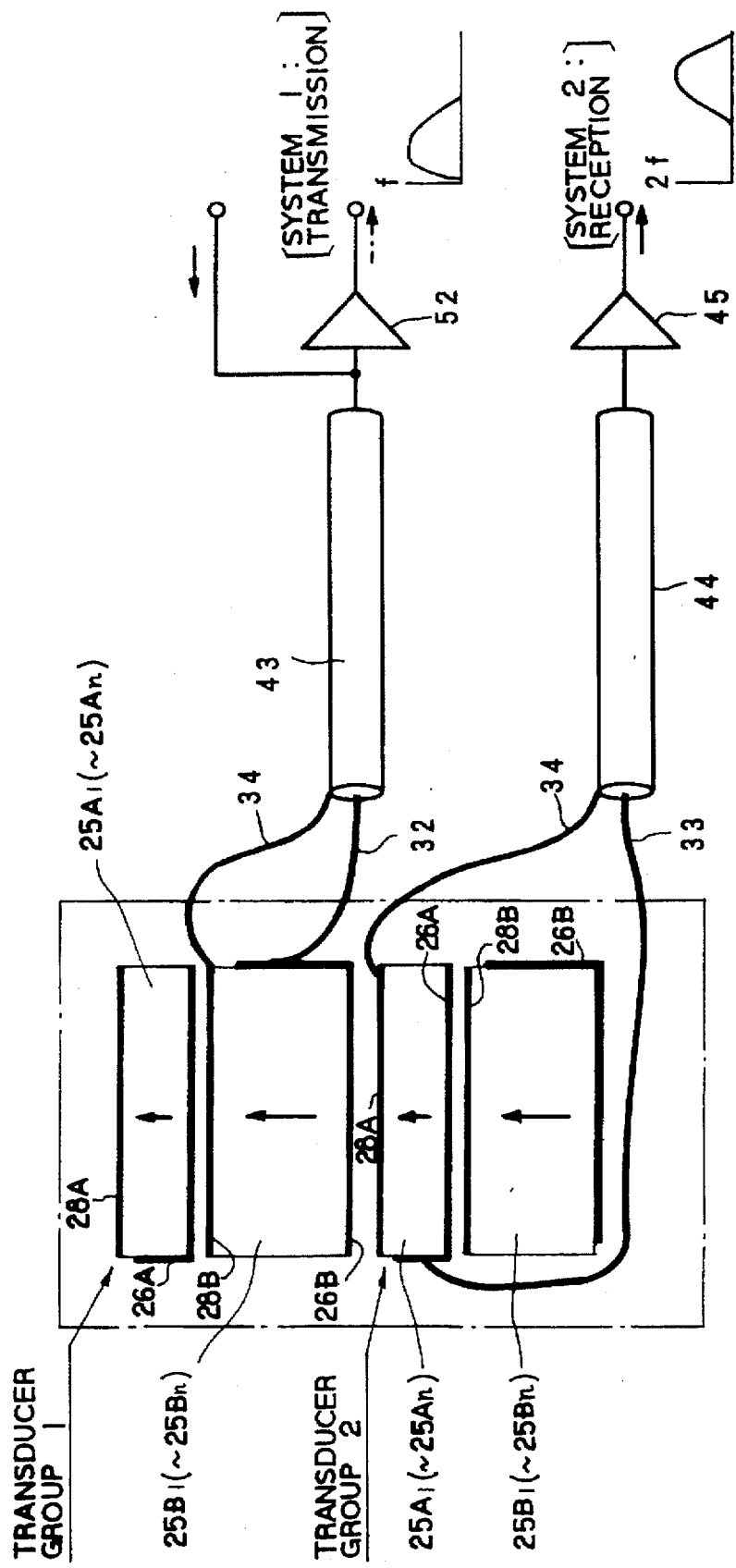
FIG. 14 is a schematic view showing the structure of a probe head according to another variation of a dual-frequency probe.

The probe head 22 shown in FIG. 14 adopts a structure in which two-type transducers $25A_1$ (to $25A_n$) and $25B_1$ (to $25B_n$) each having a different thickness from each other are laminated in each of transducer groups 1 and 2. It is preferable to use diverse materials for the two-type transducers 25A and 25B. Preferably one example is a combination of high polymer piezoelectric member or composite piezoelectric member for the first layer transducer 25A (upper side in the figure) and ceramic piezoelectric member for the second layer transducer 25B (lower side in the figure). Such lamination structure provides a desired two-type frequency characteristic due to difference in acoustic impedance between the laminated transducers 25A and 25B and permits the first layer transducer 25A to auxiliary function as a matching layer to the second layer transducer 25B. In FIG. 13, references 26A, 28A, 26B and 28B are electrodes.

(Fifth Embodiment)

Figure 16:
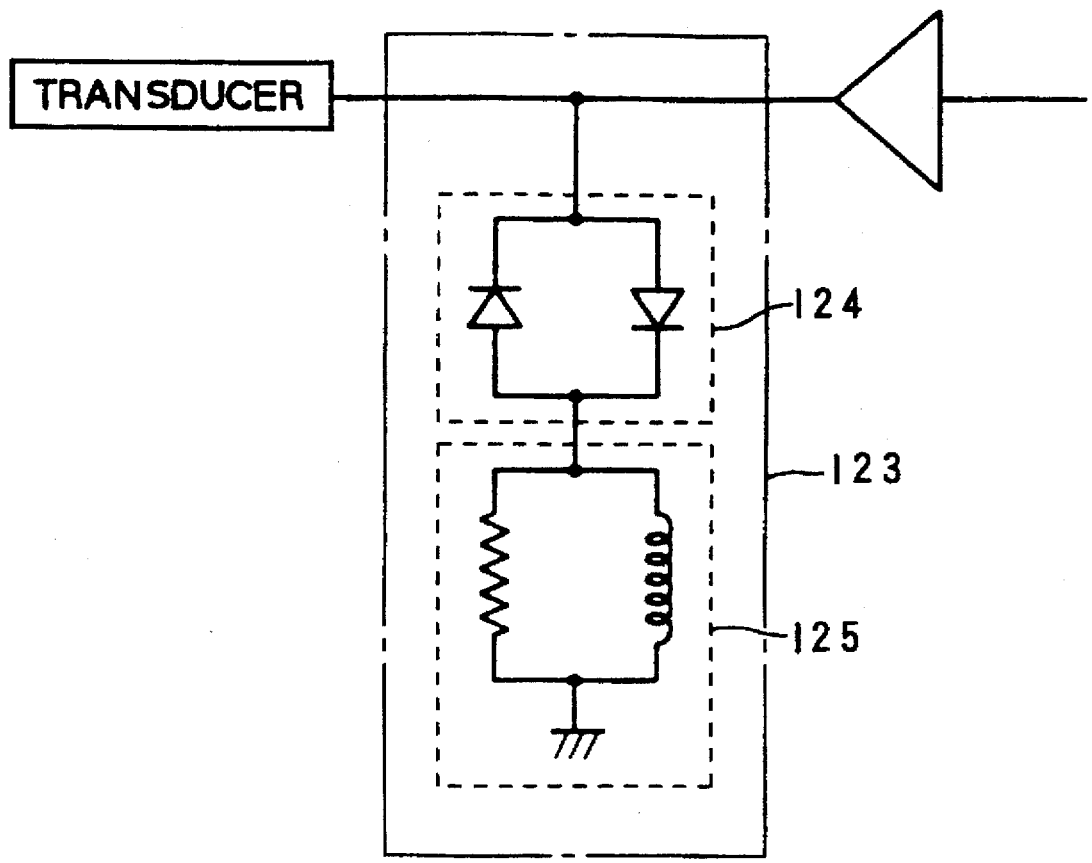
FIG. 16 is a circuit diagram showing an example of a transmission resonant circuit.
Figure 17:
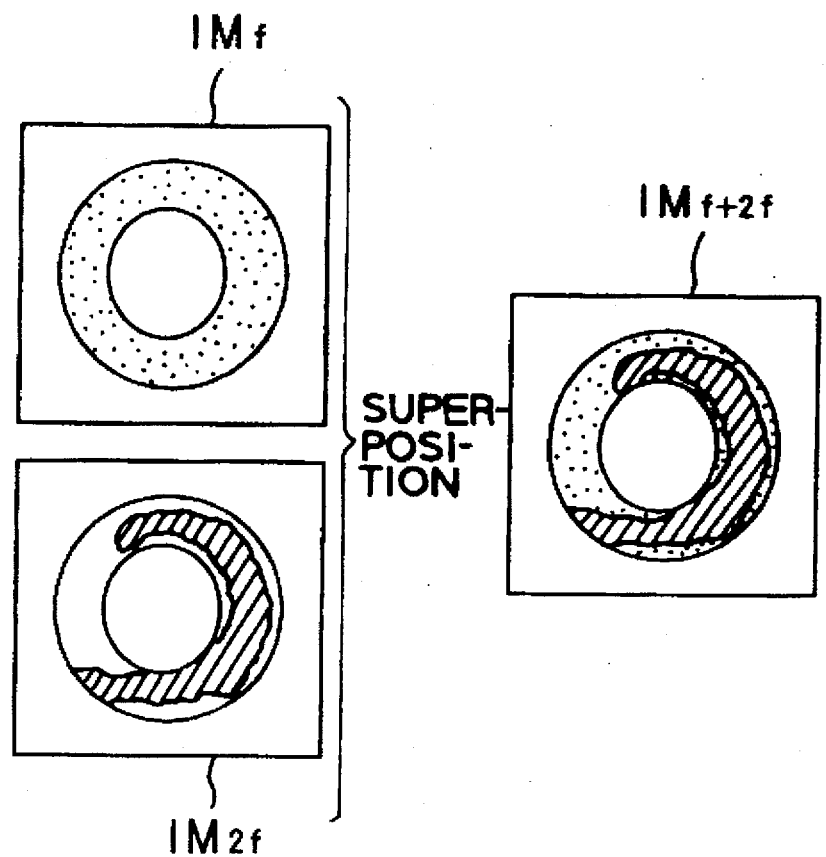
FIG. 17 shows examples of images produced in the fifth embodiment.

The fifth embodiment will be described in conjunction with FIGS. 15 to 17. A diagnostic ultrasound system of this embodiment implements contrast echography in which a second harmonic resulting from nonlinear scattering caused by foam contained in an ultrasound contrast medium is detected efficiently, and a distribution image of a second harmonic is displayed two-dimensionally.

Figure 15:
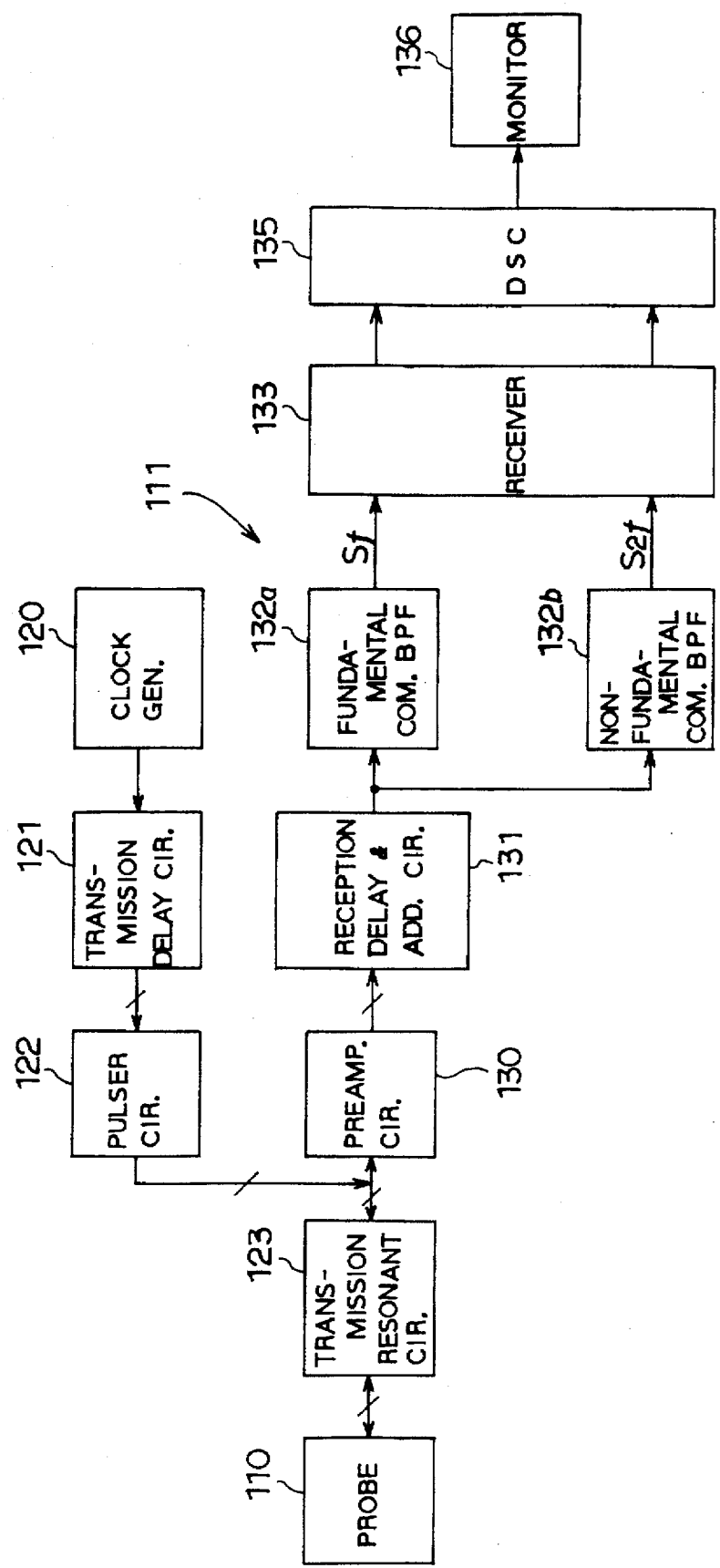
FIG. 15 is a block diagram showing a diagnostic ultrasound system of the fifth embodiment of the present invention.

As shown in FIG. 15, the diagnostic ultrasound system comprises a ultrasound probe 110 for transmitting or receiving ultrasonic waves to or from a subject, and a main unit 111 for driving the ultrasound probe 110 and processing signals received by the ultrasound probe 110.

The ultrasound probe (hereinafter, the probe) 110 is of a phased-array type, wherein a plurality of transducers are set in array in a scanning direction. The transducers have the same receiving characteristic. Each transducer offers a sufficiently wide passband enabling detection of both a fundamental component for driving a transducer and a second harmonic generated by a living body as a subject.

The main unit 111 consists of a transmitting system for driving the probe 110, a receiving/processing system for receiving and processing signals sent from the probe 110, and a display system for displaying a processed image. An input system including an operation panel and a detecting system for detecting a biomedical signal such as an echocardiogram (hereinafter ECG) signal are also included in the main unit 111 but not illustrated in FIG. 15.

The transmitting system includes a clock generator 20, a transmission delay circuit 121, a pulser circuit 122, and a transmission resonant circuit 123. The clock generator 120 is a circuit for generating a clock used to determine the timing of transmitting a ultrasonic wave or a frequency for transmission. The transmission delay circuit 121 is a circuit for effecting transmission focusing by delaying an ultrasonic wave for transmission. The pulser circuit 122 is composed of the same number of pulsers as the number of individual channels associated with transducers, generates a driving pulse according to delayed transmission timing, and supplies the driving pulse to each of the transducers of the probe 110.

The transmission resonant circuit 123 is a circuit corresponding to one of the constituent features of the present invention. The transmission resonant circuit 123 is provided for efficiently detecting a second harmonic of an echo induced by an ultrasound contrast medium in a living body. The transmission resonant circuit 123 has the ability to eliminate harmonics occurring without fail unless the pulsers are driven with a perfect sine wave for transmission. More particularly, the transmission resonant circuit 123 is, as shown in FIG. 6, composed of a limiter 124 made up of diodes connected in inverse parallel with each other, and a coil 125 that becomes resonant due to a capacitive impedance of a probe, cable, or the like, and that has a passband thereof centered on the frequency a fundamental component. The limiter 124 is turned on with application of a signal whose level is higher than a certain level. The transmission resonant circuit 123 becomes therefore resonant during transmission of a high-level signal, and remains non-resonant during reception. Actually, the series circuit composed of the limiter 124 and coil 125 is provided for each channel.

The receiving/processing system includes a preamplifier circuit 130, a reception delay & adding circuit 131, bandpass filters (hereinafter BPFs) 132a and 132b, and a receiver 133 in that order in the output stage of the probe 110. The preamplifier circuit 130 amplifies the power of a received echo for each reception channel, and sends a resultant echo to the reception delay & adding circuit 131. The circuit 131 consists of delay circuits associated with reception channels and an adder for adding up the results of delay, and performs reception focusing on received echoes. In the output stage of the reception delay & adding circuit 131, the BPFs 132a and 132b for passing a fundamental component and non-fundamental (nonlinear) component respectively are connected in parallel with each other. The passband of the fundamental component BPF 132a covers the frequency of the fundamental component of an echo, while the passband of the non-fundamental component BPF 132b covers the frequency of the second harmonic of an echo. The receiver 133 is a receiving/processing circuit for performing envelope detection, logarithmic compression, or the like on each fundamental component or second harmonic so as to produce an image signal representing a B-mode image.

The receiving/processing system further includes a digital scan converter (hereinafter a DSC) 135 and a monitor 136. The DSC 135 includes an A/D converter, multiplexer, frame memory, write/read circuit, and D/A converter, and structures an image signal constituting one frame according to a commanded display form. The image signal can be read in conformity with a standard TV system. An image signal read from the DSC 135 is output to the monitor 136 and displayed.

The operation and advantage of the fifth embodiment will be described.

For transmission, transmission focusing is effected by the transmission delay circuit 121. In this state, the pulser circuit 122 supplies a driving voltage to each transducer in the probe 110 via the transmission resonant circuit 123 channel by channel. At this time, since the driving voltage is higher than a given level, an associated limiter 124 in the transmission resonant circuit 123 is kicked on. The resonator 124 becomes resonant. The resonance allows only the fundamental component of the driving voltage to pass through the transmission resonant circuit 123 and enter the transducer in the probe 110.

It is practically difficult to drive the pulser circuit 122 with a perfect sine wave. Normally, the generated driving voltage contains a harmonic. The transmission resonant circuit 123 intentionally cuts off such a harmonic. Consequently, a driving voltage containing a fundamental component alone is used to excite each transducer.

When each transducer in the probe 110 is excited, the probe 110 transmits ultrasonic beams, which have been subjected to transmission focusing, to a diagnostic region such as the cardiac muscle of a subject. The ultrasonic beams are reflected and scattered by an ultrasound contrast medium (for example, the aforesaid "Albunex 5 ml" (product name)) that has been injected to the tissues at the diagnostic region, whereby echoes are produced. Incidentally, the ultrasound contrast medium contains microscopic foam. The strong scattering characteristic of the foam provides an intensified echo. The scattering is characteristic of nonlinearity. The nonlinear scattering causes a harmonic. As a result, an echo includes an echo component (fundamental component) emanating from living tissues other than the contrast medium (foams) and an echo component (fundamental component and harmonics as non-fundamental components) emanating from the contrast medium.

The ultrasound echoes are received by the transducers in the probe 110, and transformed into corresponding electric signals. The power of an echo is very weak and therefore does not kick on each limiter 124 in the transmission resonant circuit 123. The transmission resonant circuit 123 therefore remains non-resonant. As a result, the echoes each including a fundamental component and harmonic are fed to the preamplifier circuit 130 without any interference by the transmission resonant circuit 123, and then amplified. The echoes are then received and delayed by the reception delay & adding circuit 131 channel by channel, and then added up thereby. Reception focusing is then effected. Each of the received echoes is sent to the fundamental component BPF 132a and non-fundamental component BPF 132b concurrently. The fundamental component BPF 132a extracts a fundamental component $S_f$ from an echo and sends it to the receiver 133 in the succeeding stage. The non-fundamental component BPF 132b extracts only a second harmonic $S_{2f}$ from the echo and sends it to the receiver 133.

The fundamental component $S_f$ of the echo sent to the receiver 133 is subjected to envelope detection and logarithmic compression, whereby image data representing a B-mode image (amplitude/brightness—modulated image) for the fundamental component are produced. The second harmonic $S_{2f}$ of the echo sent to the receiver 133 is also subjected to envelope detection and logarithmic decrement, whereby image data representing a B-mode image for the second harmonic are produced.

The image data representing the B-mode images for the fundamental component and second harmonic are converted into image data conformable to a commanded display form by the DSC 135. Various display forms are available for the B-mode image $IM_f$ deriving from the fundamental component (hereinafter, a fundamental component image) and the B-mode image $IM_{2f}$ deriving from the second harmonic (hereinafter, a second harmonic image). A command instructing a display form, according to which, for example, the second harmonic image $IM_{2f}$ is superposed on the fundamental component image $IM_f$, is issued at the onset of contrast echography. In response to the command, the DSC 135 synthesizes both the image data, and then supplies synthetic data to the monitor 136. On the monitor 136, as shown in FIG. 17, an image $IM_{f+2f}$ in which the second harmonic image $IM_{2f}$ is superposed on the fundamental component image $IM_f$ is displayed. This enables observation of the morphology of a living tissue and the perfusion of an ultrasound contrast medium into the tissue.

As mentioned above, a harmonic other than a fundamental component is cut off intentionally (actively) by the transmission resonant circuit 123. An ultrasound beam having the fundamental component alone is transmitted. A second harmonic contained in an echo is therefore almost entirely attributable to the nonlinear scattering characteristic of an ultrasonic wave relative to an ultrasound contrast medium. Namely, second harmonics attributable to scattering caused by a contrast medium can be extracted from transmitted ultrasonic waves containing solely fundamental components and selectively processed for imaging. Thus, when consideration is taken into a biomedical attenuation or a frequency band of a transmitting or receiving system, the second harmonics can be utilized effectively.

In the above-described embodiment, a second harmonic is extracted as an example of nonlinear (non-fundamental) components. The present invention is not limited to the second harmonic. Alternatively, an N-th harmonic (N×f where "x" denotes a multiplication sign, "f" denotes a fundamental frequency and "N" denotes an integer), an N-th subharmonic (f/N where f denotes a fundamental frequency and N denotes an integer), a super-harmonic (M×f/N where f denotes a fundamental frequency and M and N denote integers except 1), or any other nonlinear component may be adopted. The frequency components may be selectively extracted by a nonlinear component BPF as mentioned above. Alternatively, the plurality of kinds of harmonics may be adopted at a time. In this case, a signal extracting/processing system may be installed for each of the plurality of kinds of harmonics, or the plurality of kinds of harmonics may remain unseparated and be routed to one signal extracting/processing system.

In the above-described embodiment, fundamental and non-fundamental components are processed by separate systems. In the stage after digitization succeeding reception by a preamplifier, only one signal processing system may be installed to process fundamental and non-fundamental components on a time-sharing basis. Alternatively, a memory may be installed so that a desired component alone can be processed.

In the above-described embodiment, two BPFs for extracting fundamental and nonlinear components respectively are installed in the stage succeeding a reception delay & adding circuit. Alternatively, the BPFs may be installed in the stage succeeding a preamplifier circuit. However, when the BPFs are installed in the output stage of the reception delay & adding circuit as they are in the aforesaid embodiment, the number of filters can be minimized. This layout is more advantageous for avoiding an increase in the scale of a system or a rise in manufacturing cost.

A probe for the diagnostic ultrasound system is not limited to an electronic phased-array type probe but may be a mechanical scanning type probe.

Various variants are conceivable for the diagnostic ultrasound system of the fifth embodiment.

Figure 18:
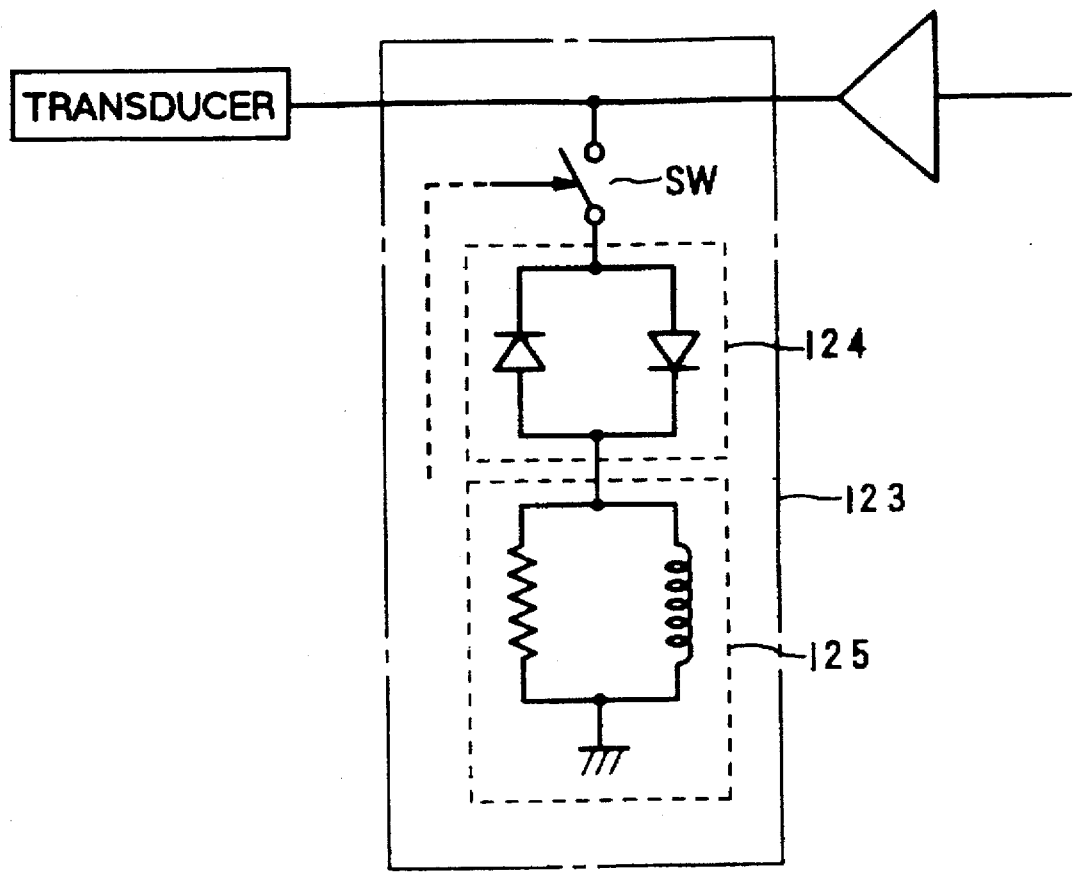
FIG. 18 is a circuit diagram showing another example of a transmission resonant circuit.

FIG. 18 shows a variant of the transmission resonant circuit 123. In the transmission resonant circuit 123, an on-off type electronic switch SW is interposed between a limiter 124 and transmission/reception line. In diagnostic mode in which nonlinear scattered components induced by a contrast medium are handled, the electronic switch SW is turned on. A resonant state is then attained for transmission in the same manner as in the fifth embodiment. In normal diagnostic mode in which linear scattered components (fundamental components) are handled, the electronic switch SW is turned off so that a non-resonant state can be attained for transmission and reception. The on and off states of the electronic switch SW are switched in response to a control signal sent from a controller that is not shown. Owing to this circuitry, the transmission resonant circuit 123 can be disconnected from other circuits in normal mode other than contrast echography. This results in improved capability of the transmission resonant circuit.

Figure 19:
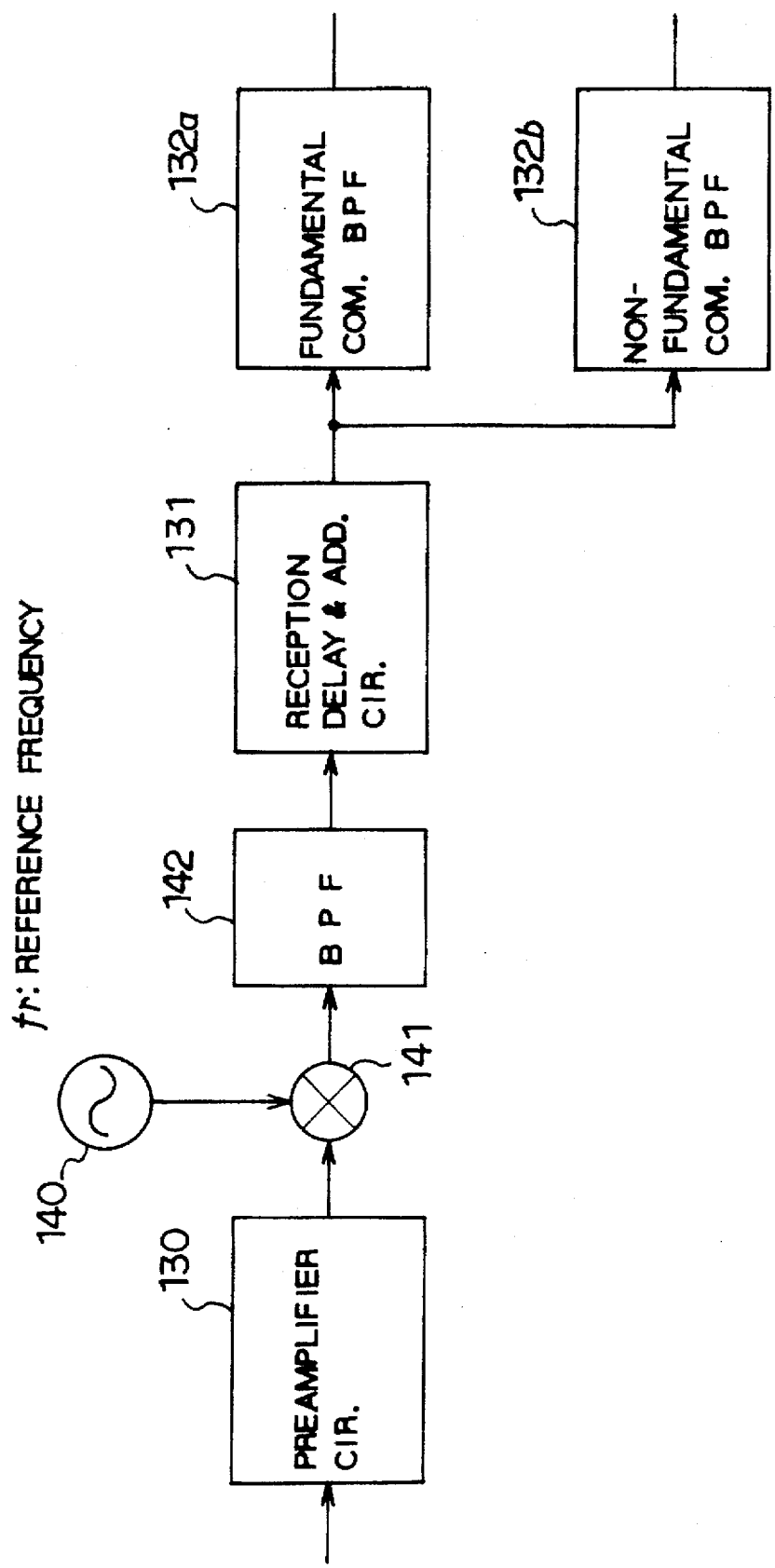
FIG. 19 is a block diagram showing part of a diagnostic ultrasound system of a variant of the fifth embodiment.
Figure 20:
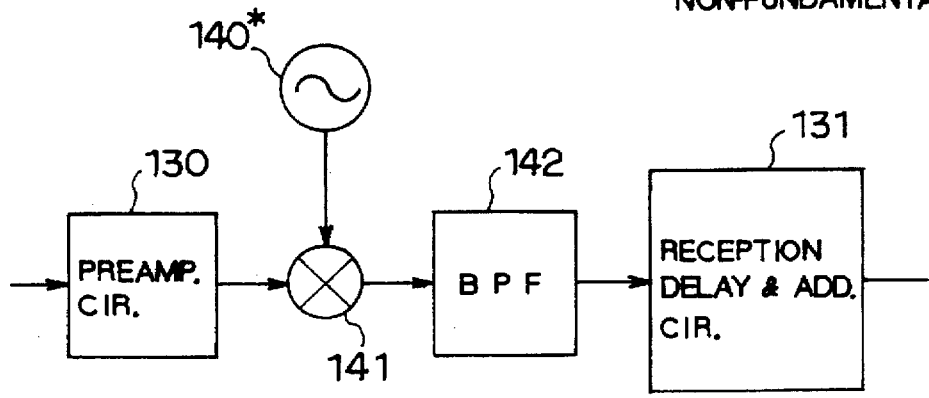
FIG. 20 is a block diagram showing part of a diagnostic ultrasound system of another variant of the fifth embodiment.

In the fifth embodiment, beam forming is performed on a radio-frequency signal. Alternatively, a receiving system in which the frequency band of a signal is shifted to a medium frequency and then beam forming is carried out may be adopted. Variants are shown in FIGS. 19 and 20. In the receiving system shown in FIG. 19, a mixer 141 for receiving a reference signal of a reference frequency fr from a reference signal generator 140, and BPFs 132a and 132b for extracting fundamental and non-fundamental components from a signal whose frequency is shifted to a medium frequency are interposed between the preamplifier circuit 130 and a BPF 142 connecting to the reception delay & adding circuit 131. The receiving system of a variant shown in FIG. 20 has the same capability as the one shown in FIG. 19. A reference signal generator 40* can vary the reference signal frequency fr between the frequency of a fundamental component fr=fr(1) and the frequency of a non-fundamental component fr=fr(2). The frequency of a reference signal to be fed to the mixer 141 can therefore be varied depending on whether a fundamental component is detected or a non-fundamental component is detected. Thus, only one receiving system can detect both kinds of components. The variation of the reference frequency fr may be achieved on a time-sharing basis for each channel. Alternatively, reception channels may be grouped into those for detection of a fundamental component and those for detection of a non-linear component. The reference frequency is then varied between the channel groups.

Figure 21:
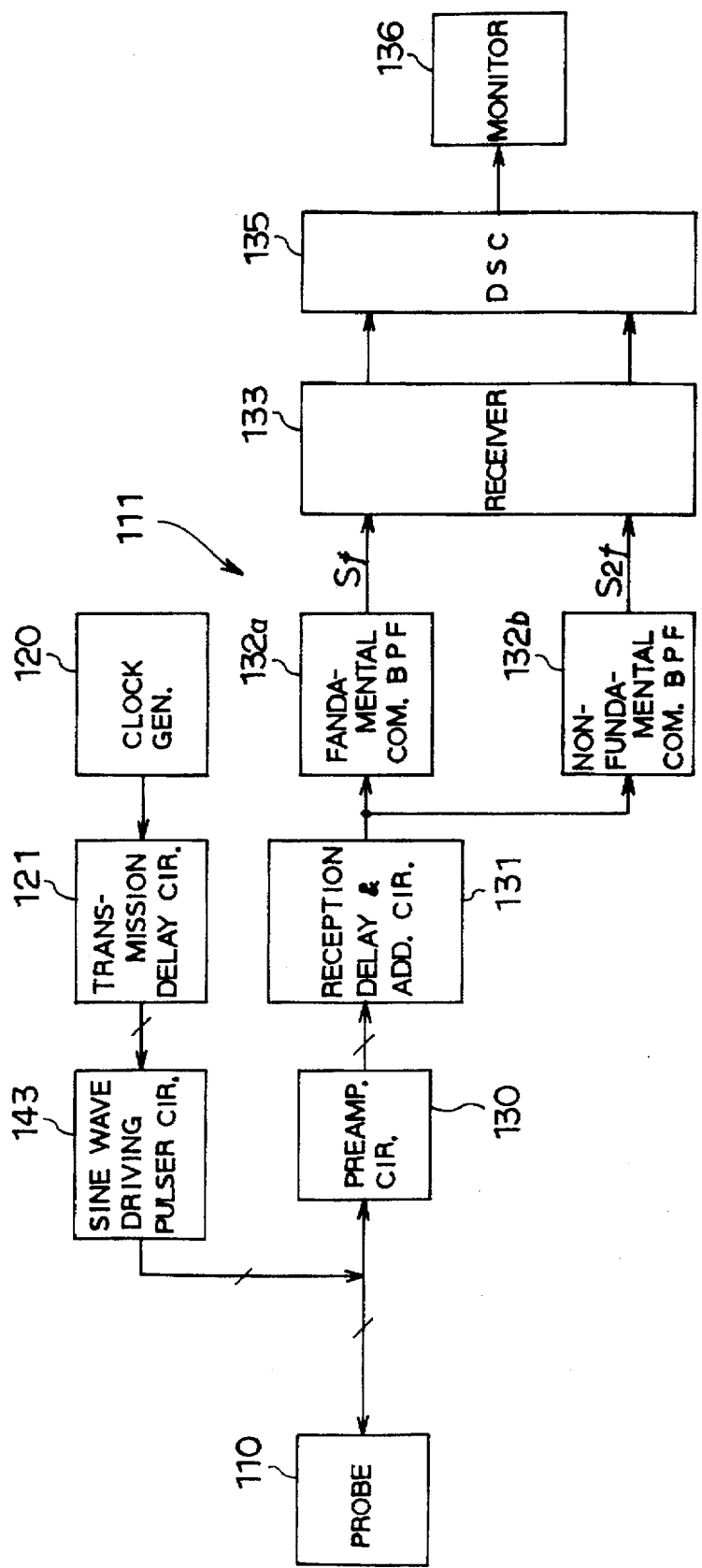
FIG. 21 is a block diagram showing a diagnostic ultrasound system of yet another variant of the fifth embodiment.
Figure 22:
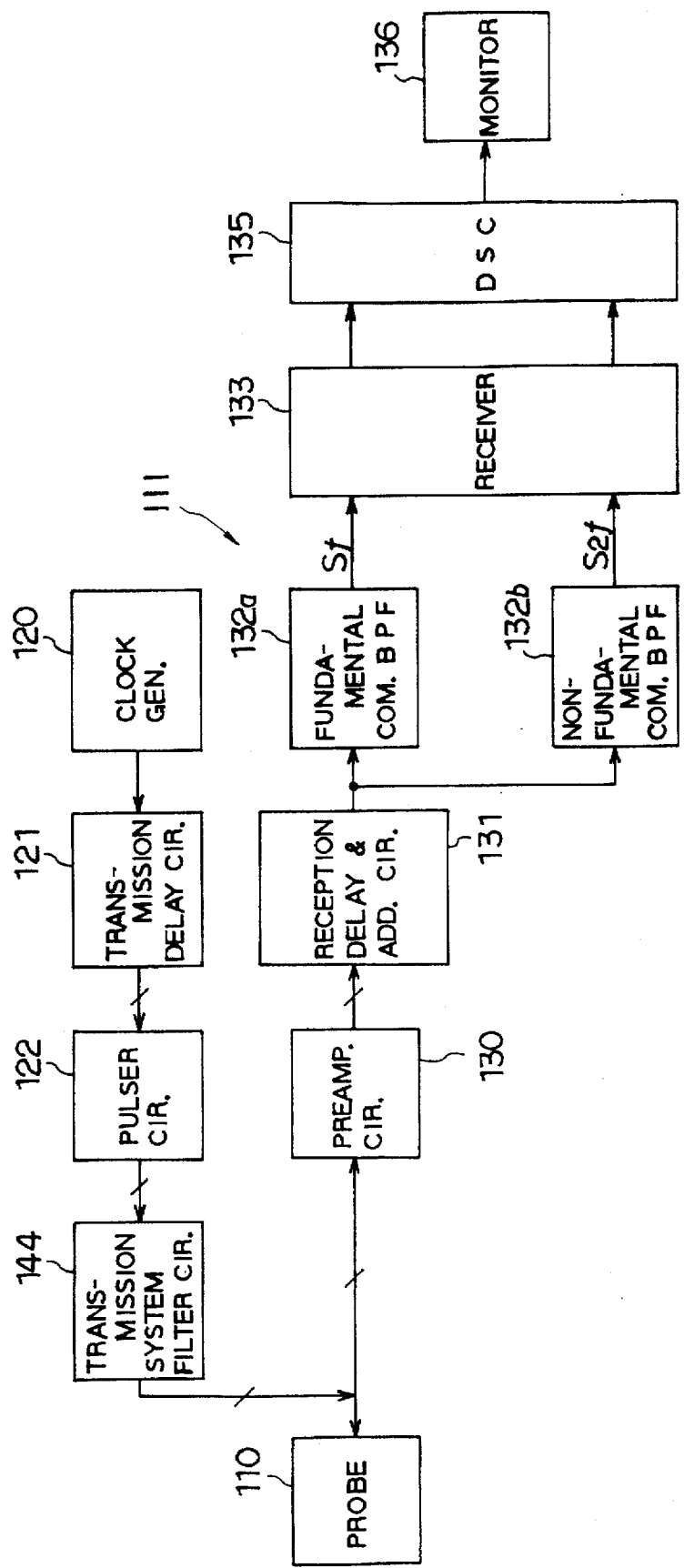
FIG. 22 is a block diagram showing a diagnostic ultrasound system of still another variant of the fifth embodiment.

In the fifth embodiment, the transmission pulser circuit 122 is used to generate and step down a harmonic. Variants of diagnostic ultrasound systems in terms of the pulser circuit are shown in FIGS. 21 and 22. In the variant shown in FIG. 21, a sine wave driving pulser circuit 43 capable of being driven with a sine wave is installed in place of the pulser circuit 122 in the first embodiment. For stepping down a second harmonic, the pulser circuit 143 is realized with the circuitry in which a pulser that is driven with a rectangle wave and has a duty ratio of 50% or a pulser capable of achieving a class-A operation is installed for each channel. A harmonic can thus be stepped down without the aforesaid transmission resonant circuit. This contributes to simplification and downsizing of a system.

In the diagnostic ultrasound system of a variant in FIG. 22, a transmission system filter circuit 144 for eliminating a harmonic and a fractional harmonic except a fundamental component during transmission is included in a transmitting circuit interposed between the pulser circuit 122 and probe 110. A transmission resonant circuit is unused. Owing to this circuitry, compared with the circuitry including the transmission resonance circuit, although the scale of the circuitry becomes slightly larger, a harmonic can be lowered to a given level during transmission.

(Sixth Embodiment)

The sixth embodiment will be described in conjunction with FIG. 23. In the sixth embodiment and thereafter, component elements identical or similar to those in the fifth embodiment will be assigned the same reference numerals. The description of the component elements will be omitted or briefed.

Figure 23:
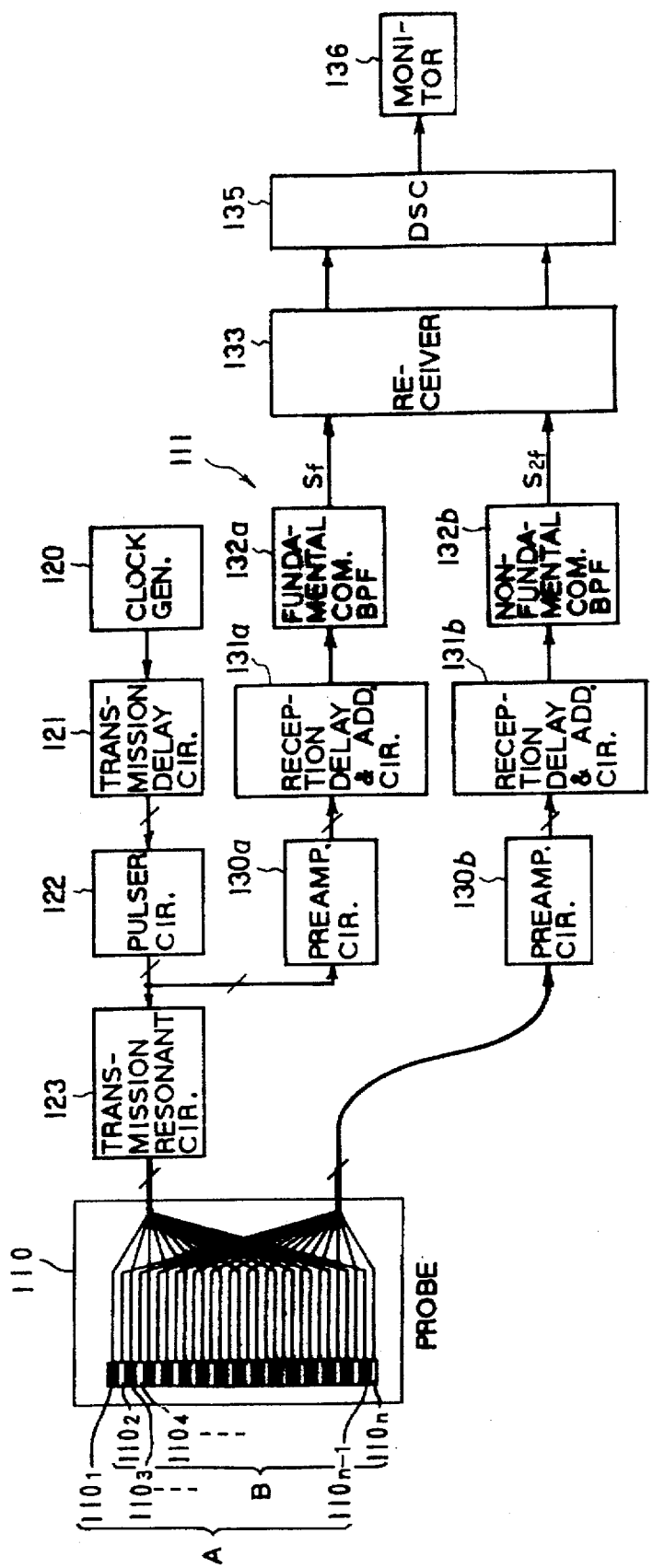
FIG. 23 is a block diagram showing a diagnostic ultrasound system of the sixth embodiment of the present invention.

A diagnostic ultrasound system shown in FIG. 23 has a phased-array type probe 110 in which a plurality of transducers $110_1$ to $110_n$ (where n denotes a positive even number) are set in array. Each of the transducers $110_1$ to $110_n$ has the transmission/reception sensitivity that is high enough to respond to both a frequency band centered on the frequency of a fundamental component of a signal handled and a frequency band centered on the frequency of a second harmonic thereof. The transducers in the probe 110 are divided functionally into transducer group A for transmitting and receiving a fundamental component and transducer group B for receiving a second harmonic. In one example of division, as illustrated, odd-numbered transducers are allocated to transducer group A, and even-numbered transducers are allocated to transducer group B.

The transducers $110_1$, $110_3$, etc., and $110_{n-1}$ of transducer group A are connected to the transmission resonant circuit 123 having the same circuitry and capability as the one in the fifth embodiment. The transmission resonant circuit 123 as well as the clock generator 120, transmission delay circuit 121, and pulser circuit 122 constitute a transmitting system.

The transmission resonant circuit 123 is connected to a preamplifier circuit 130a connected in parallel with the pulser circuit 122, a reception delay & adding circuit 131a, a fundamental component BPF 132a, and a receiver 133, which constitute a fundamental component receiving/processing system. The transducers $110_2$, $110_4$, etc., and $110_n$ of transducer group B are connected to a preamplifier circuit 130b, a reception delay & adding circuit 131b, a non-fundamental component BPF 132b, and the receiver 133, which constitute a nonlinear component receiving/processing system. The DSC 135 and monitor 136 constituting a display system are connected in the output stage of the receiver 133.

The operation and advantage of the sixth embodiment will be described. The transducers $110_1$, $110_3$, etc., and $110_{n-1}$ of transducer group A are excited by the circuits constituting the transmitting system. Ultrasound beams are then transmitted to a subject's body. At this time, even if each pulser in the pulser circuit 122 outputs a pulsating signal containing harmonics because the pulser is not driven with a perfect sine wave, the harmonics are eliminated properly by the transmission resonant circuit 123. A driving signal containing substantially a fundamental component alone is supplied channel by channel to each of the transducers of transducer group A. Each of the ultrasound beams irradiated to the subject's body therefore contains substantially a fundamental component alone. The ultrasound beams are reflected or scattered by tissues or an ultrasound contrast medium in the subject's body. Similar to the ones in the first embodiment, the ultrasound beams are received by the transducers in the probe 110, and converted into echoes that are electrical quantities.

Echoes which are provided by the transducers $110_1$, $110_3$, etc., and $110_{n-1}$ of transducer group A and each of which contains a fundamental component and second harmonic pass through the transmission resonant circuit 123 that is in a non-resonant state, and are then amplified by the preamplifiers of the preamplifier circuit 130a associated with odd channels. The amplified echoes are received and delayed channel by channel and then added together by the reception delay & adding circuit 131a. Thus, reception focusing is effected. A fundamental component $S_f$ alone is extracted from an echo resulting from the delay and addition by means of the fundamental component BPF 132a, and then sent to the receiver 133.

Echoes which are provided by the transducers $110_2$, $110_4$, etc., and $110_{n-1}$ of transducer group B and each of which contains a fundamental component and second harmonic are amplified by the preamplifier circuit 130b, and thus subjected to reception focusing by means of the reception delay & adding circuit 131b. A resultant echo is sent to the non-fundamental component BPF 132b. A second harmonic $S_{2f}$ is then extracted from the echo, and then output to the receiver 133.

The echoes of the fundamental component $S_f$ and second harmonic $S_{2f}$ which are sent to the receiver 133, are subjected to envelope detection and logarithmic compression, converted into image signals representing B-mode images, and then sent to the DSC 135. Similar to the ones in the fifth embodiment, a fundamental component image $IM_f$ and second harmonic image $IM_{2f}$ (for example, an image producing by superposing the second harmonic image on the fundamental component image) are displayed on the monitor 136 with a desired display form.

Even the sixth embodiment, similar to the fifth embodiment, provides the same advantage. Since the transducers in the probe 110 are divided into transducer group A for transmission and reception and transducer group B dedicated to reception, a circuit for turning on for transmission alone need not be included in the transmission resonant circuit or the like. A series resonance or any other feature can be realized easily. An example of the "circuit for turning on for transmission alone" will be described in conjunction with FIGS. 45A and 45B.

The locations of the BPFs 132a and 132b for extracting a fundamental component and second harmonic respectively are not limited to those described above. Alternatively, the BPFs 132a and 132b may be located, for example, in the output stage of the preamplifier circuits 130a and 130b. Similar to the one shown in FIG. 22, a transmission resonant filter circuit (denoted with 144 in FIG. 22) may be installed in place of the transmission resonant circuit 123. The filter circuit 123 may be retained in an operating state even during reception.

Figure 24:
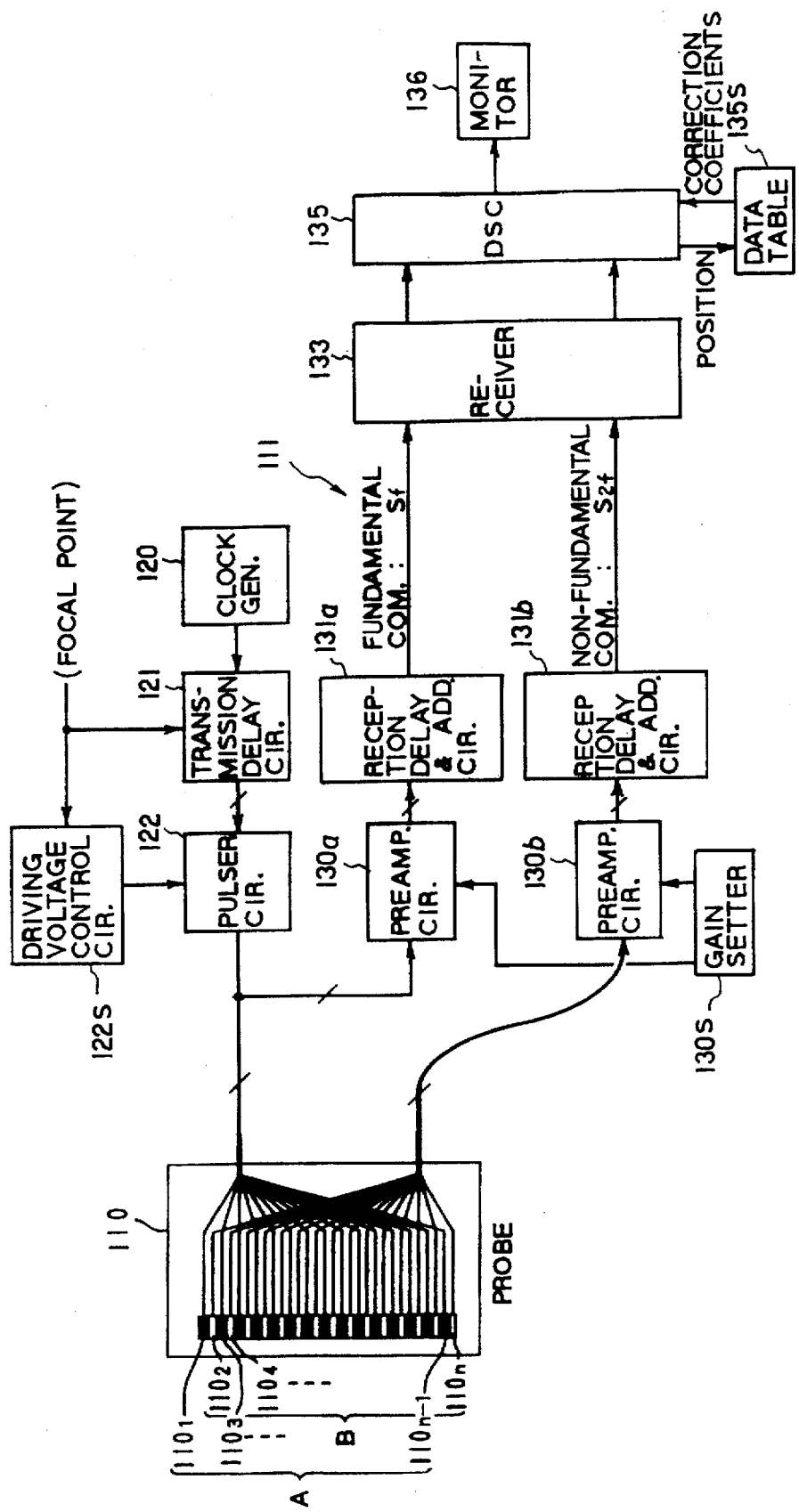
FIG. 24 is a block diagram showing a diagnostic ultrasound system of a variant of the sixth embodiment of the present invention.
Figure 25A:
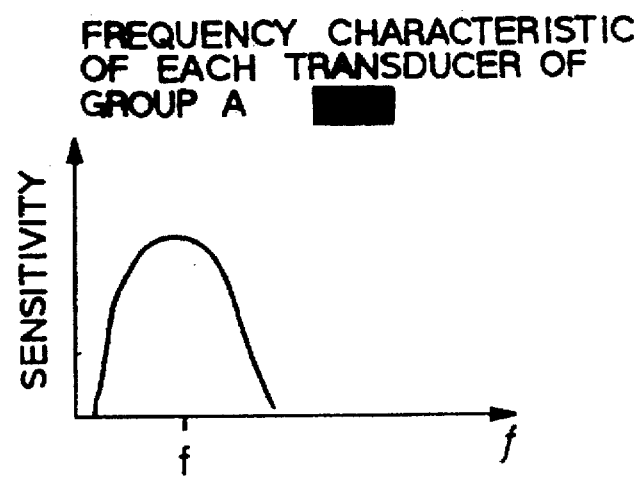
FIGS. 25A and 25B each show a frequency characteristic of a transducer.
Figure 25B:
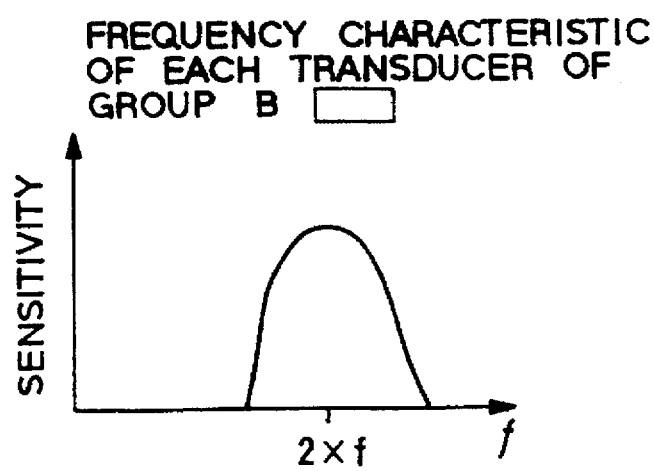

Variants of the sixth embodiment will be shown in FIGS. 24 and 25. In a diagnostic ultrasound system shown in FIG. 24, the transducers in the phased-array type probe 110 are divided into transducer groups A and B in the same manner as those in the sixth embodiment (FIG. 23). The frequency band for each of the transducers $110_1$, $110_3$, etc., and $110_{n-1}$ of transducer group A is determined so that each transducer will respond to a fundamental component f alone (See FIG. 25A). The frequency band for each of the transducers $110_2$, $110_4$, etc., and $110_n$ of transducer group B is determined so that each transducer will respond to a second harmonic 2f alone (See FIG. 25B). These frequency bands are set by, for example, varying the resonant frequencies of transducer groups.

When the probe 110 has the foregoing structure, ultrasonic waves each having a fundamental component alone are transmitted or received by transducer group A. An echo having a fundamental component $S_f$ alone is provided directly by the preamplifier circuit 130a and reception delay & adding circuit 131a which are connected to transducer group A. Likewise, echoes each having a second harmonic $S_{2f}$ alone that is one of nonlinear components resulting from nonlinear scattering caused by an ultrasound contrast medium are received by transducer group B. An echo having the second harmonic $S_{2f}$ alone is provided directly by the preamplifier circuit 130b and reception delay & adding circuit 131b which are connected to transducer group B. Unlike the second embodiment, the transmission resonant circuit 123 and BPFs 132a and 132b for reception need not be installed. This results in simplified circuitry. This variant still has the same advantage as the sixth embodiment. When the BPFs are installed, a second harmonic can be detected at a more high signal-to-noise ratio.

Various circuit elements are added to the variant shown in FIG. 24.

The first circuit element is included because the signal strength of a non-fundamental component is smaller than that of a fundamental component. The gains set for the preamplifier circuits 130a and 130b for handling a fundamental component and non-fundamental component respectively are variable. A signal used to determine the gains is supplied from a gain setter 130S. The gain setter 130S sets the gain for the preamplifier circuit 130b for handling a non-fundamental component to a higher value than the one for the preamplifier circuit 130a for handling a fundamental component. Thus, the signal strengths of the fundamental component and non-fundamental component can therefore be adjusted uniformly or substantially uniformly. This makes it possible to resolve the in balance between the signal-to-noise ratios in the components.

The second circuit element is included because when an ultrasound beam is irradiated to a subject, the attenuation of an ultrasonic wave varies depending on a scan depth in the subject. Specifically, a driving voltage control circuit 122S is connected to the pulser circuit 122. The driving voltage control circuit 122S inputs transmission focal point information from a controller that is not shown. As the focal point for transmission gets deeper with respect to the subject's surface, the driving voltage for the pulser circuit 22 is raised, for example, in multiple steps.

Even if the focal point is deep, the transmission sound pressure is held substantially constant. As long as the state of a blood flow remains unchanged, an image of a tissue can be produced substantially with the same brightness irrespective of the focal point.

The third circuit element is included so that the inhomogeneity of various conditions dependent on a position in an (tomographic) image can be coped with by a receiving/processing system. For this purpose, a data table 135S is connected to the DSC 135 included in the receiving/processing system. Pre-set in the data table 135S is correspondence data. Correction coefficients are stored in one-to-one correspondence to positions relative to the transmission sound pressure in a tomographic layer, width of an ultrasound beam, scanning mode, specificity of an object tissue, and other various conditions that vary depending on a position in an image. When producing an image derived from a non-fundamental component, the DSC 135 references the data table 135S so as to read corresponding correction coefficients for each position in a tomographic layer. While correcting the echo level of a non-fundamental component using the read correction coefficients, the DSC 135 produces image data. This can avoid a problem that image quality varies depending on a position in a tomographic layer.

Owing to the control or correction achieved by the second or third circuit element, when contrast echography based on intravenous injection of an ultrasound contrast medium is adopted, as long as the perfusion of the contrast medium in a tomographic layer is uniform, an image of the same brightness or color can be produced.

The correction based on the data table 134S is not limited to the circuitry included in the DSC 135. Alternatively, the read correction coefficients may be used to adjust the gain for the preamplifier circuit 130b channel by channel or to change the gain for the receiver 133.

The correction performed by the receiving/processing system using the data table 135S and the correction of a transmission sound pressure performed by the driving voltage control circuit 122S may be effected concurrently.

Various variations identical to those described in relation to the fifth embodiment (for example, see FIGS. 18 to 22) are conceivable for the sixth embodiment and its variants. A second harmonic is adopted as a non-fundamental component. Alternatively, any other harmonic, a subharmonic, or a super-harmonic may be used for imaging.

(Seventh Embodiment)

Figure 26:
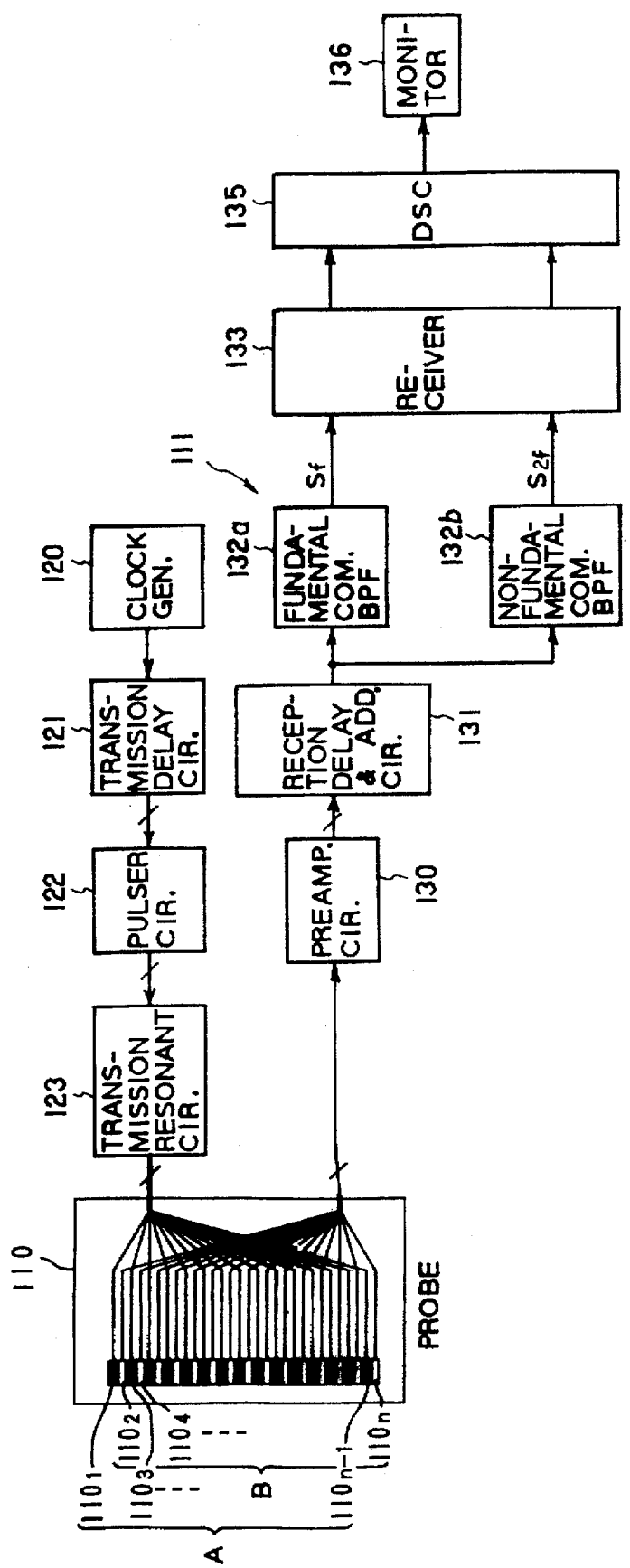
FIG. 26 is a block diagram showing a diagnostic ultrasound system of the seventh embodiment of the present invention.

The seventh embodiment will be described in conjunction with FIG. 26. A diagnostic ultrasound system shown in FIG. 26 includes the probe 110 having the same structure as the one shown in FIG. 23 (sixth embodiment). Specifically, the transducers in the probe 110 are sensitive enough to respond to both the frequency bands centered on the frequencies of a fundamental component and second harmonic, and divided into transducer groups A and B functionally. In this embodiment, transducer group A is assigned to transmission and transducer group B is assigned to reception.

The clock generator 120, transmission delay circuit 121, pulser circuit 122, and transmission resonant circuit 123 are, as illustrated, connected in that order in series with the transducers $110_1$, $110_3$, etc., and $110_{n-1}$ of transducer group A. The transducers $110_2$, $110_4$, etc., and $110_n$ of transducer group B are connected to the reception delay & adding circuit 131 via the preamplifier circuit 130. In the output stage of the circuit 131, the BPFs 132a and 132b for passing a fundamental component and non-fundamental component respectively are connected in parallel with each other, and linked to the receiver 133, DSC 135, and monitor 136 in that order.

Next, the operation and advantage of the seventh embodiment will be described. Each of the transducers of transducer group A is excited by a driving signal. The driving signal is produced for each odd channel by the pulser circuit 122, passed through the transmission resonant circuit 123 in order to eliminate harmonics thereof substantially completely, and thus contains substantially a fundamental component alone. As a result, ultrasound beams each containing substantially a fundamental component alone are irradiated to a subject.

Echoes corresponding to ultrasonic waves reflected or scattered by the subject and each containing a fundamental component and second harmonic are output from the transducers of transducer group B. The echoes are amplified by the preamplifier circuit 130, subjected to reception focusing by means of the reception delay & adding circuit 131, and then supplied to both the BPFs 132a and 132b. As a result, the fundamental component BPF 132a extracts a fundamental component $S_f$ and the non-fundamental component BPF 132b extracts a second harmonic $S_{2f}$. Both the components are processed by the receiver 133 in the same manner as those described previously, and converted into image signals representing B-mode images. Based on the image signals deriving from the fundamental component and second harmonic, a B-mode fundamental component image and second harmonic image are displayed on the monitor 136.

Consequently, this embodiment provides the same advantage as the above-described embodiments. Unlike the circuitry shown in FIG. 23 (sixth embodiment), this circuitry requires only one set of a preamplifier circuit and reception delay & adding circuit.

Figure 27:
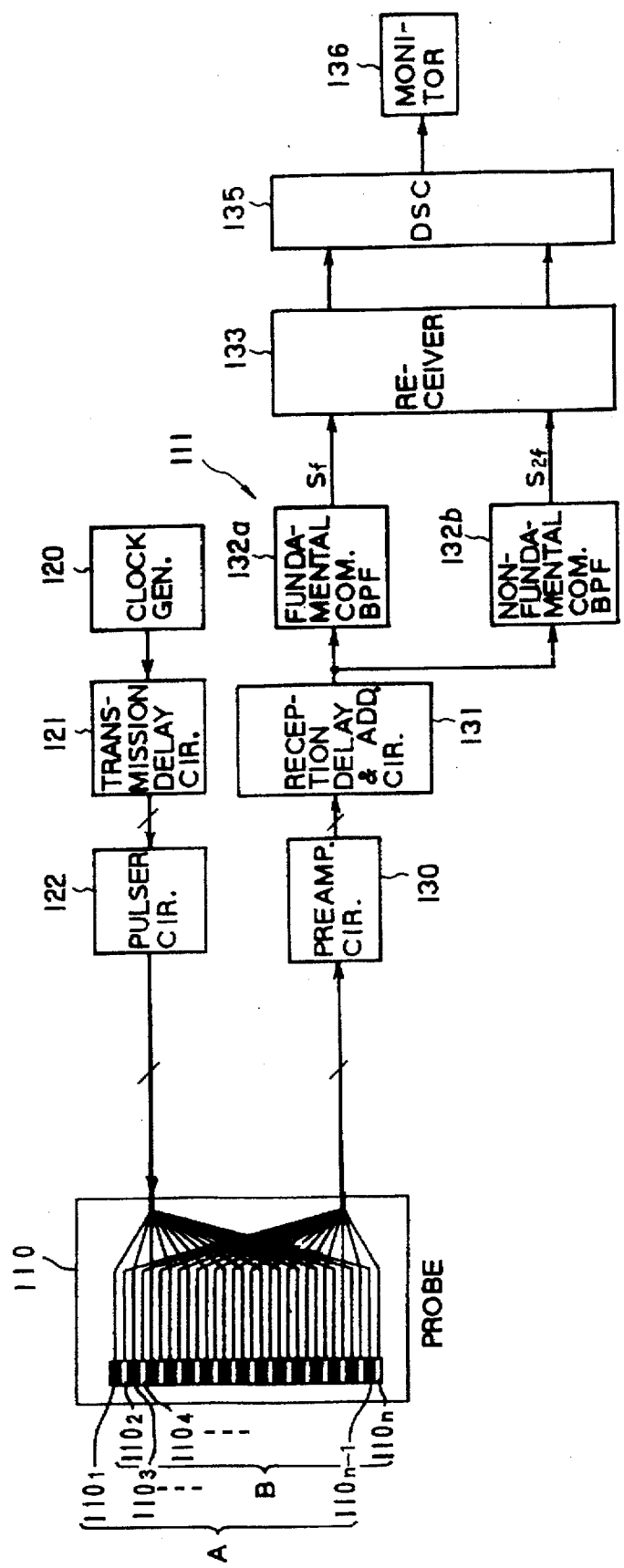
FIG. 27 is a block diagram showing a diagnostic ultrasound system of a variant of the seventh embodiment of the present invention.
Figure 28A:
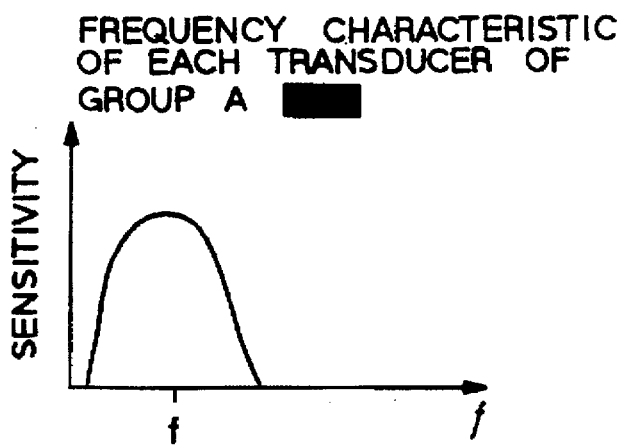
FIGS. 28A to 28C each show a frequency characteristic of a transducer.
Figure 28B:
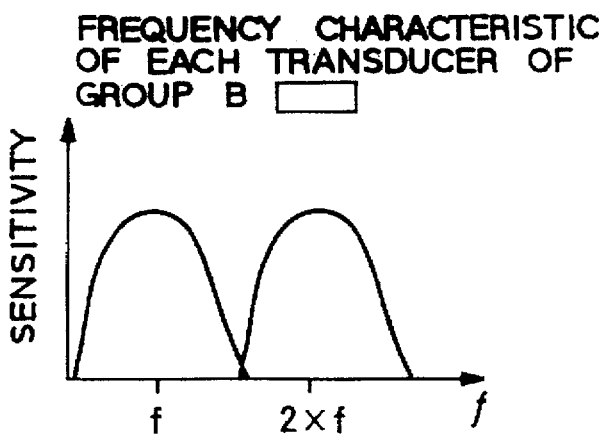
Figure 28C:
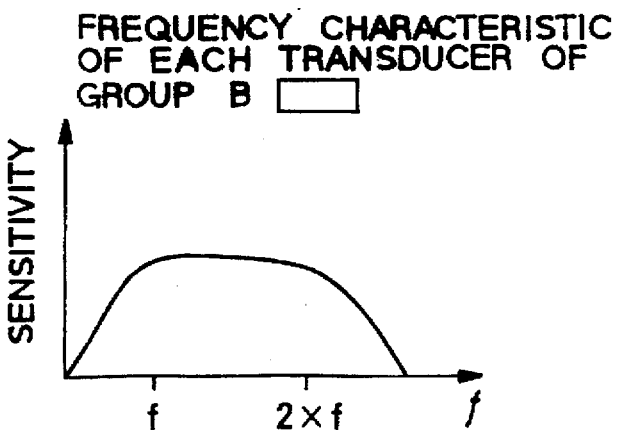

A variant of the seventh embodiment is shown in FIGS. 27 and 28. A diagnostic ultrasound system shown in FIG. 27 has the phased-array type probe 110. The transducers in the probe 110 are functionally divided into transducer groups A and B in the same manner as those in the seventh embodiment. Using a technique such as the one for varying the thickness of transducers, the transducers $110_1$, $110_3$, etc., and $110_{n-1}$ of transducer group A are set to a frequency band (see FIG. 28A) permitting the transducers to respond to a fundamental component f alone, and the transducers $110_2$, $110_4$, etc., and $110_n$ of transducer group B are set to a frequency band (see FIGS. 28B or 28C) permitting the transducers to respond to the fundamental component f and second harmonic 2f. The clock generator 120, transmission delay circuit 121, and pulser circuit 122 are, as illustrated, connected to the transducers of transducer group A. In the output stage of the transducers of transducer group B, the preamplifier circuit 130, reception delay & adding circuit 131, fundamental component BPF 132a, non-fundamental component BPF 132b, receiver 133, DSC 135, and monitor 136 are connected in that order. Thus, this variant provides the same operation and advantage as the seventh embodiment (FIG. 26). Unlike the diagnostic ultrasound system shown in FIG. 26, this system obviates the necessity of the transmission resonant circuit 123.

The same variations as those made in the fifth embodiment (for example, see FIGS. 18 to 22) are conceivable for the seventh embodiment and its variant. A second harmonic is used as a nonlinear component. Alternatively, any other harmonic, a subharmonic, or a super-harmonic may be used for imaging.

(Eighth Embodiment)

Figure 29:
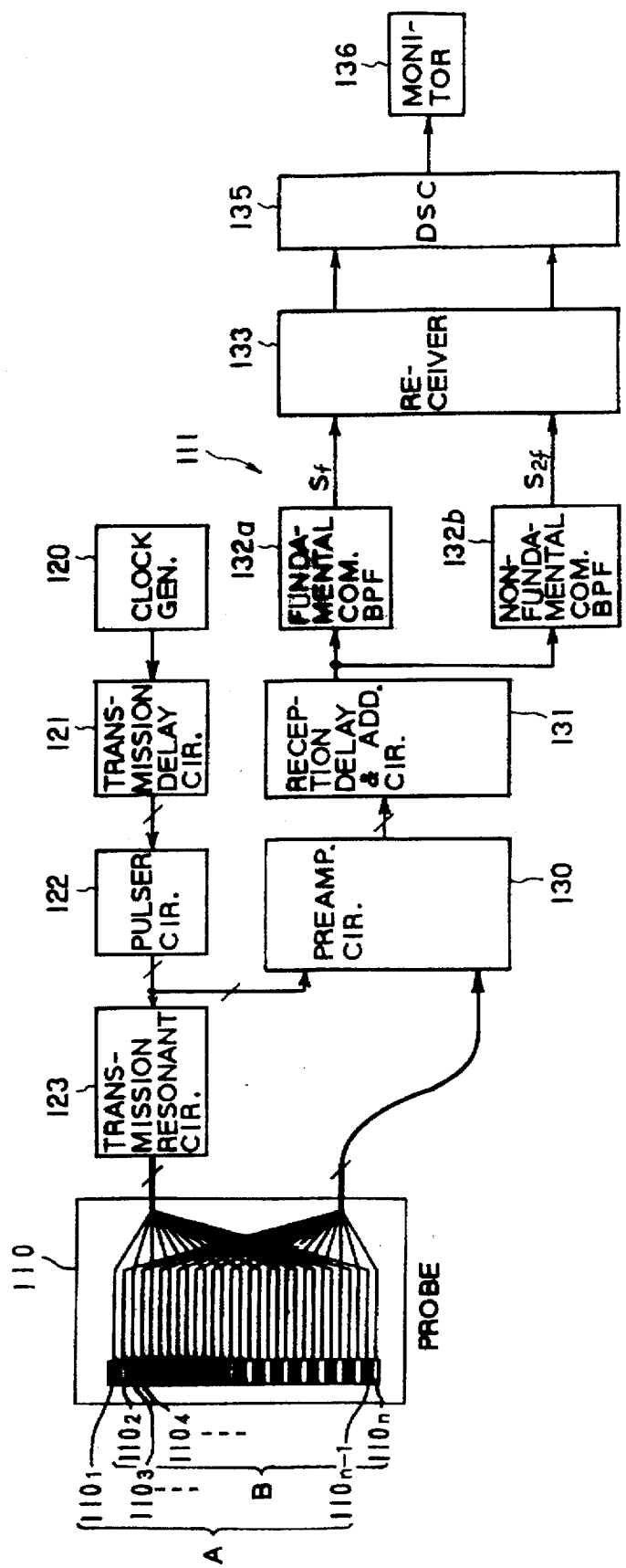
FIG. 29 is a block diagram showing a diagnostic ultrasound system of the eighth embodiment of the present invention.

The eighth embodiment will be described in conjunction with FIG. 29. An illustrated diagnostic ultrasound system includes the probe 110 having the same structure as the one shown in FIG. 23 (sixth embodiment). Specifically, the transducers in the probe 110 are sensitive enough to respond to at least both the frequency bands centered on the frequencies of a fundamental component and second harmonic, and functionally divided into transducer groups A and B. In this embodiment, transducer group A is assigned to transmission and reception, and transducer group B is assigned to reception only.

The clock generator 120, transmission delay circuit 121, pulser circuit 122, and transmission resonant circuit 123 are, as illustrated, connected in that order in series with the transducers $110_1$, $110_3$, etc., and $110_{n-1}$ of transducer group A. The transducers of transducer group B, and the channels associated with the transducers of transducer group A and interposed between the transmission resonant circuit 123 and pulser circuit 122 are connected to a delay circuit in the circuit 131 via the preamplifiers in the preamplifier circuit 130. In the output stage of the circuit 131, the fundamental component BPF 132a and non-fundamental component BPF 132b are connected in parallel with each other, and then linked to the receiver 133, DSC 135, and monitor 136 in that order.

Next, the operation and advantage of the eighth embodiment will be described. Each of the transducers of transducer group A is excited by a driving signal. The driving signal is produced for each channel by the pulser circuit 122, passed through the transmission resonant circuit 123 in order to eliminate harmonics thereof substantially completely, and thus contains substantially a fundamental component alone. As a result, ultrasound beams each containing a fundamental component alone are irradiated to a subject.

Echoes corresponding to the ultrasonic waves reflected or scattered by the subject and each containing a fundamental component and second harmonic are output from the transducers of transducer groups A and B. The echoes supplied from both the transducers of transducer groups A and B are amplified by the preamplifier circuit 130, subjected to reception focusing by means of the reception delay & adding circuit 131, and then supplied to the BPFs 132a and 132b. As a result, the fundamental component BPF 132a extracts a fundamental component $S_f$ and the non-fundamental component BPF 132b extracts a second harmonic $S_{2f}$. Both the components are processed by the receiver 133 as described previously, and converted into image signals representing B-mode images, respectively. Based on the image signals deriving from the fundamental component and second harmonic, a B-mode fundamental component image $IM_f$ and second harmonic image $IM_{2f}$ are displayed on the monitor 136.

Consequently, this embodiment provides the same advantage as the above-described embodiments. The number of transducers assigned to reception is larger than that in the circuitry shown in FIGS. 26 and 27 (seventh embodiment and its variant) (twice as large as that, because both transducer groups A and B are involved in reception). High-level echoes can therefore be acquired. This results in an improved signal-to-noise ratio.

(Ninth Embodiment)

The fifth embodiment will be described with reference to FIGS. 30 and 31. The ninth embodiment is intended to improve the workability for injecting a contrast medium and the easiness in recognizing an image produced with a contrast medium injected for the purpose of contrast echography using an ultrasound contrast medium.

Figure 30:
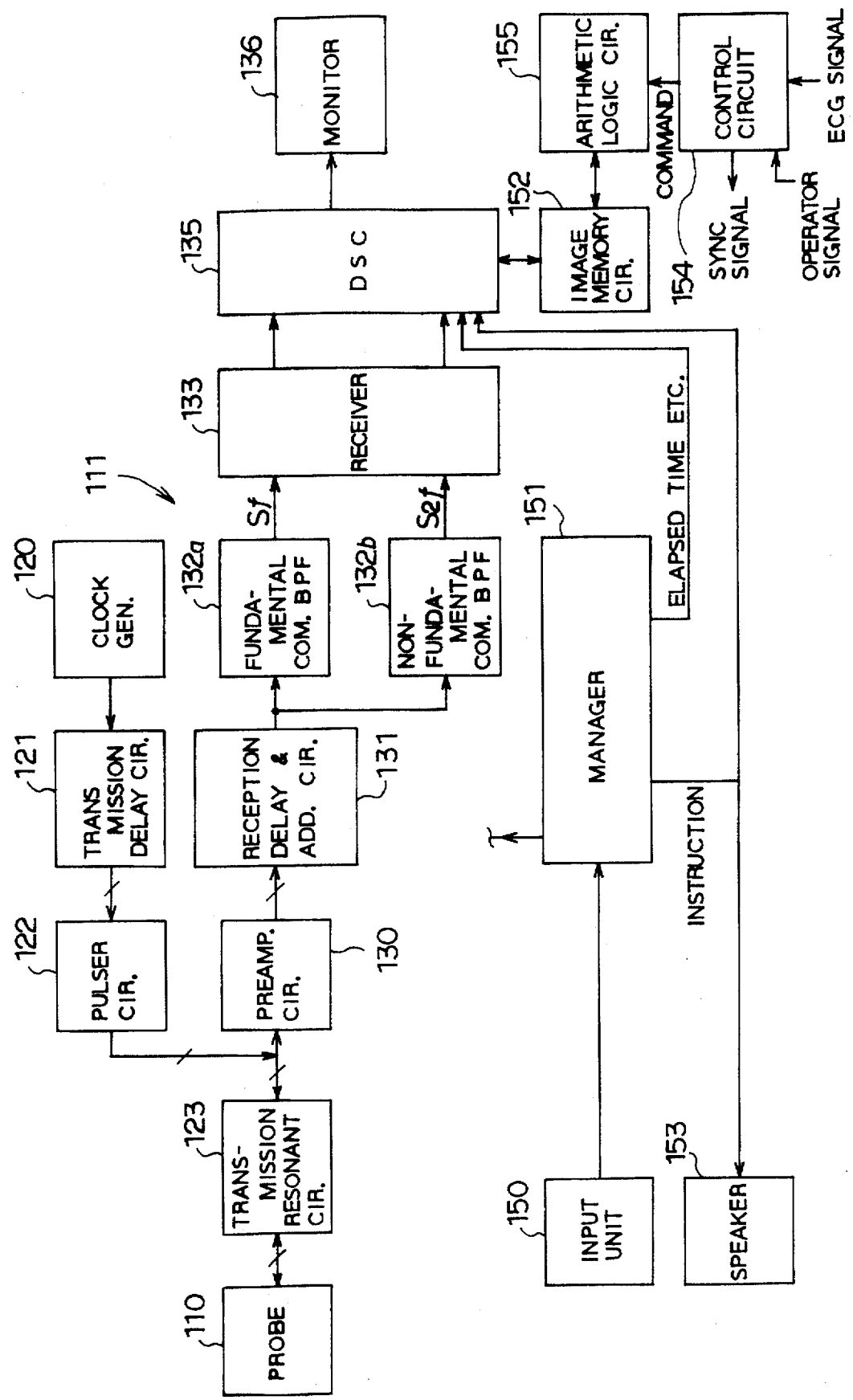
FIG. 30 is a block diagram showing a diagnostic ultrasound system of the ninth and tenth embodiments of the present invention.

A diagnostic ultrasound system shown in FIG. 30 includes the same probe 110 and main unit 111 as those described in the fifth embodiment (see FIG. 15) as well as an input unit 150 to be manipulated by an operator, a manager 151 for executing processing according to a preprogrammed procedure (see FIG. 31), an image memory circuit 152 that operates in response to a command issued from the manager 151, and a speaker 153. Among those components, the input unit 150 is a keyboard, trackball, mouse, or voice input unit, or consists of a plurality of them. The input unit 150 is used to input data representing a schedule of contrast echography (for example, a time instant of contrast medium injection) to the manager 151. The input unit 150 may be a floppy disk, hard disk, magneto-optical disk, CD-ROM, DAT tape, magnetic tape, or any other recording medium. The image memory circuit 152 consecutively stores image data converted by the DSC 135, for example, image data representing a superposition image in which a second harmonic image is superposed on a fundamental component image. The DSC 135 converts image data into a form suitable for display, synthesizes character data instructed by the manager 151, and outputs resultant data to the monitor 136.

Figures 31A, 31B:
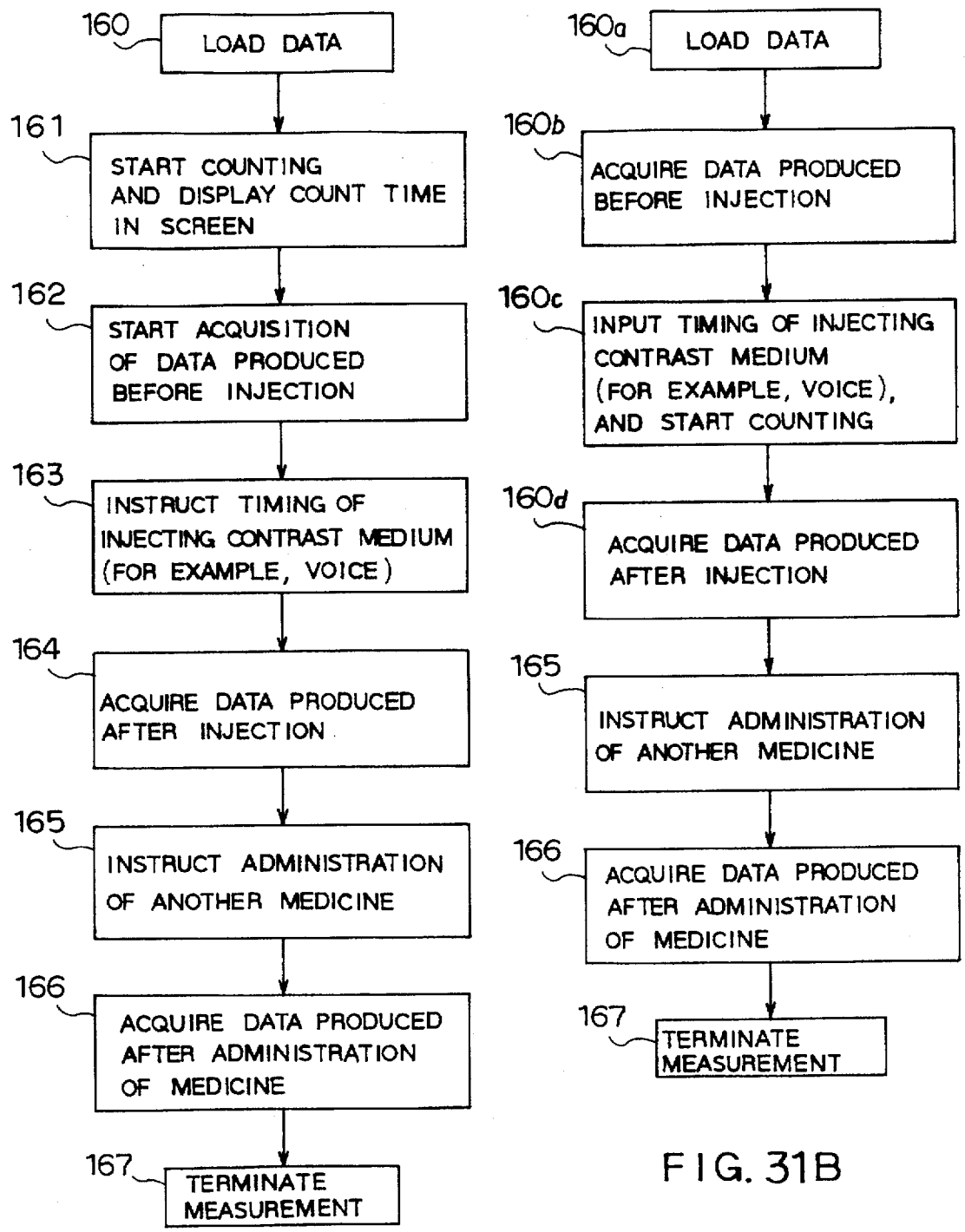
FIGS. 31A and 31B are flowcharts briefly describing examples of processing performed by a manager.

The manager 151 includes computer components such as a dedicated CPU and internal memory input/output interface, and executes the processing described in FIG. 31A.

To be more specific, first, conditions for contrast echography (for example, a condition for image quality setting, conditions for time-density curve (TDC) measurement (ROI and measurement time interval), and a condition for ECG gating) and a schedule of contrast echography (a (scheduled) time instant of contrast medium injection) (when any other medicine is used in combination, the quantity of the medicine and the timing of administering the medicine) are loaded from a floppy disk or the like (step 160).

Counting is then started, and the display of a count time in a screen on the monitor 136 is started (step 161). Thereafter, acquisition of necessary data is started prior to injection of a contrast medium (step 162). The data includes image data and brightness data produced prior to contrast medium injection, image data produced for a desired time interval according to desired timing, and brightness data specified with a ROI and produced for a desired time interval according to desired timing. These data items are transferred to an magneto-optical disk or workstation.

When a scheduled time instant of injection comes, the timing of injecting a contrast medium is instructed with voice through the speaker 153 (step 163).

Thereafter, data produced after contrast medium injection is acquired (step 164). When a given time instant occurs, administration of any other medicine is instructed with voice (step 165), and then data produced after administration of the medicine is acquired (step 166). When a scheduled end time instant occurs, image data acquisition, ROI brightness data acquisition, data transfer to a magneto-optical disk or workstation, and counting are terminated (step 167).

The processing to be executed by the manager 151 may be sequenced as described in FIG. 31B. Herein, an operator can instruct the timing sequence of injecting a contrast medium with his/her voice. Steps having the same contents as those in FIG. 31A are assigned the same step numbers.

First, similarly to step 160 in FIG. 31A, data is loaded (step 160a). The data does not include a "(scheduled) time instant of injecting a contrast medium." When data load is completed at the step, acquisition of data produced before contrast medium injection (image data and brightness data specified with a ROI which are produced before injection) is started, and data transfer to a magneto-optical disk or workstation is started (step 160b).

An operator then instructs injection (timing) of a contrast medium through a microphone on the input unit 150 (step 160c). Accordingly, counting is started.

After contrast medium injection is completed, it is started to acquire image data for a desired time interval according to desired timing. It is also started to acquire brightness data specified with a ROI for a desired time interval according to desired timing.

The subsequent steps are identical to those in FIG. 31A (steps 165 to 167).

Since the diagnostic ultrasound system has the above-described configuration and capability, when contrast echography using an ultrasound contrast medium is conducted, an operator or doctor can properly recognize the timing of injecting a contrast medium. Synchronously with the injection timing, image data produced for a subsequent elapsed time can be acquired automatically. This results in simplified image processing and interpretation.

In the ninth embodiment, ECG data may be acquired so that an image can automatically be acquired on a desired cardiac phase at a desired time instant after injection of a contrast medium. The manager need not always include a dedicated CPU. A CPU inherent to the diagnostic ultrasound system may be used in common.

A variant of this embodiment is, as shown in FIG. 30, a diagnostic ultrasound system including a control circuit 154 and arithmetic logic circuit 155. The control circuit 154 inputs an ECG signal, and outputs a synchronizing signal for use in commanding acquisition timing to the transmitting system and receiving/processing system so that data acquisition can be started synchronously with the ECG signal. The control circuit 154 inputs a signal entered by an operator or the like and outputs a command instructing start of image processing to the arithmetic logic circuit 155. In response to the command, the arithmetic logic circuit 155 performs the operations of subtraction and maximum value hold on each pair of pixels of each pair of tomographic images constituting a plurality of frames which are stored in the image memory circuit 152 through ECG gating. Consequently, an image representing a change between each pair of images is displayed on the monitor 136 via the DSC 135. Thus, a change between, for example, second harmonic images can be discerned easily.

For the operation of subtraction, it is particularly preferable to subtract an image from a reference image $IM_{ref}$ (see FIG. 34) produced before injection of a contract medium.

The diagnostic ultrasound system having the configuration shown in FIG. 30 may be used to conduct stress echography. That is to say, contrast echography based on intravenous injection of an ultrasound contrast medium is conducted before and after loading of medication. For this purpose, tomographic image data deriving from a non-fundamental component $S_{2f}$ acquired from a tomographic layer on the same cardiac phase before and after the loading of medication is stored in the image memory circuit 152. The arithmetic logic circuit 155 is used to perform a desired operation such as subtraction on each pair of pixels of each pair of images acquired before and after the loading. The results of the operation are displayed on the monitor 136 via the DSC 135. Thus, a myocardial region that is devoid of a circulation before and after the loading can be observed clearly.

(Tenth Embodiment)

The tenth embodiment will be described in conjunction with FIG. 30 (used in common with the ninth embodiment) and FIGS. 32 to 34. The tenth embodiment relates to a diagnostic ultrasound system optimal for contrast echography that is adapted to examination of the cardiac muscle, or especially, to production of a myocardial perfusion image. When a myocardial perfusion image is produced, since brightness enhancement due to a contrast medium in the cardiac cavities is must stronger than that in the cardiac muscle, there is a possibility that brightness enhancement due to a contrast medium in the cardiac muscle cannot be identified. Once this kind of event occurs, the brightness of a myocardial perfusion image may not be recognized accurately.

For avoiding the above event, the diagnostic ultrasound system of this embodiment has the configuration shown in FIG. 30. In addition, the manager 151 is designed to execute the processing described in FIG. 32, and the DSC 135 is designed to execute the processing described in FIG. 33.

FIG. 32 will now be described. When contrast echography is used to display a myocardial perfusion image, the manager 151 first instructs a controller that is not shown to produce a B-mode reference image of the cardiac muscle at a proper time instant $t_{0-1}$ (see FIG. 34) preceding a time instant to at which a contrast medium is injected (steps 170 and 171). The production yields a reference image $IM_{ref}$ as shown in FIG. 34. The image $IM_{ref}$ is displayed on the monitor 136, and the image data is stored in an image memory that is the image memory circuit 152.

The reference image $IM_{ref}$ is used to identify areas corresponding to the cardiac cavities manually or automatically (step 172). For manual identification, an operator manipulates the input unit 150 to trace the contours of the cardiac-cavity areas of the reference image $IM_{ref}$ appearing on the monitor 136. For automatic identification, the brightness level of the B-mode image (reference image $IM_{ref}$) can be discriminated with respect to a desired threshold. As a result, the cardiac-cavity areas $H_{SP}$ are defined as shown in FIG. 34 (see a cardiac-cavity area image $IM_{HSP}$).

The cardiac-cavity area image $IM_{HSP}$ is used to produce a mask image, and the image data is stored in the image memory circuit 152 (step 173).

Figure 33:
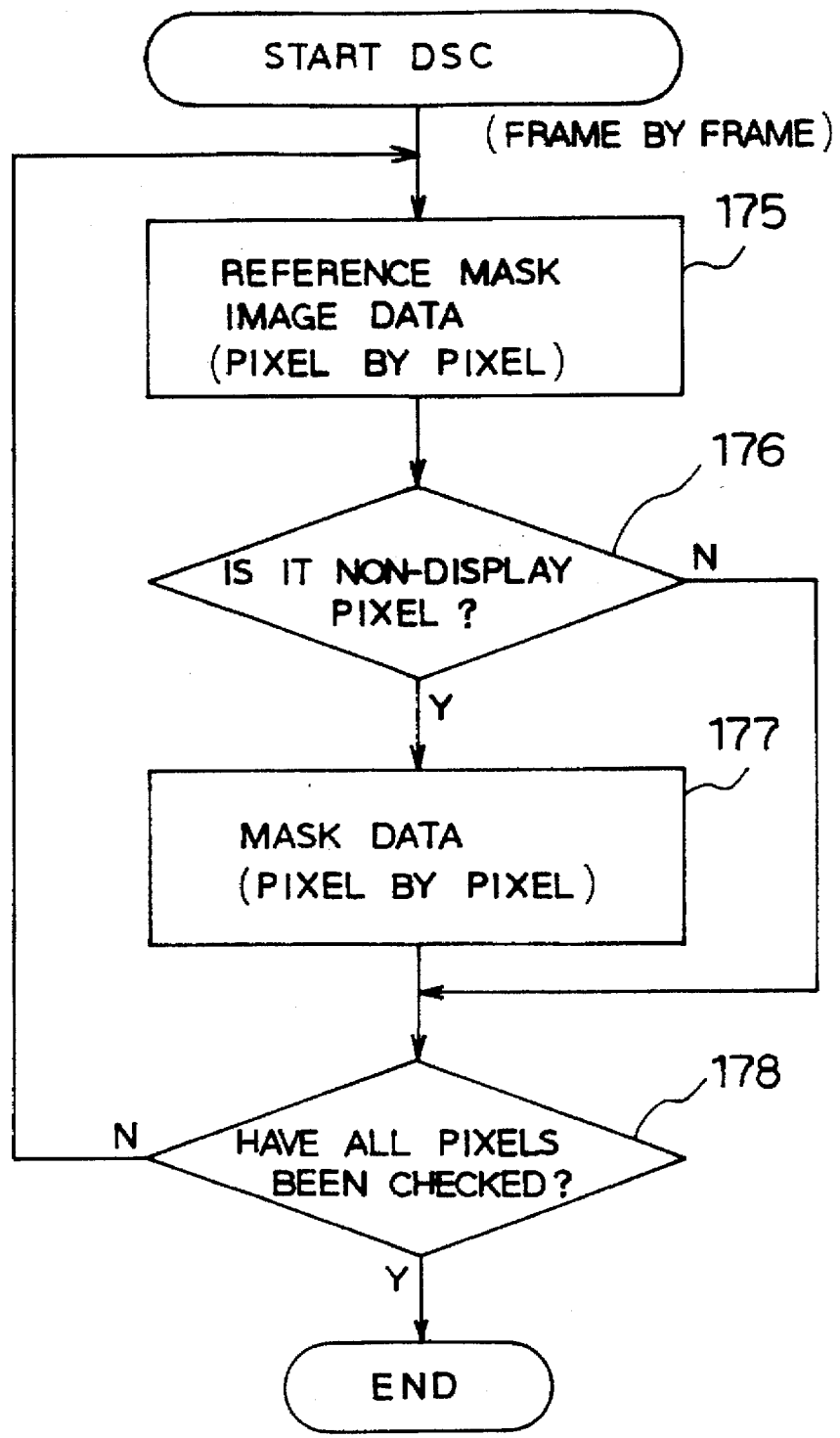
FIG. 33 is a flowchart briefly describing an example of processing performed by a DSC for the diagnostic ultrasound system of the tenth embodiment of the present invention.

The processing described in FIG. 33 is executed for each frame by the DSC 135 after the time instant to of contrast medium injection. First, image data constituting one frame (for example, data representing a superposition image in which a second harmonic image is superposed on a fundamental component image) is produced. The values of pixels of a mask image (cardiac-cavity area image $IM_{HSP}$) corresponding to the image data are then referenced pixel by pixel (step 175). A pixel of the mask image of which value is zero is recognized as a display pixel. Nothing is carried out, and then the subsequent pixel is checked (steps 176 and 178). When the pixel value of a pixel of the mask image is not zero, the pixel is recognized as a non-display pixel. A value of the image data corresponding to the pixel value is set to zero (step 177).

As a result, after injection of a contrast medium is completed, the spread and intensity (brightness) of the contrast medium vary with the passage of time. Images of the cardiac muscle $H_M$ in each of which the cardiac cavities $H_{SP}$ are masked (for example, see images $IM_1$ to $IM_3$ in FIG. 34) are created and displayed time-sequentially. For producing a myocardial perfusion image, the cardiac-cavity areas are not displayed but a brightness change in a myocardial area alone is displayed in real time. Thus, brightness enhancement of a myocardial area due to a contrast medium is achieved properly.

Figure 34:
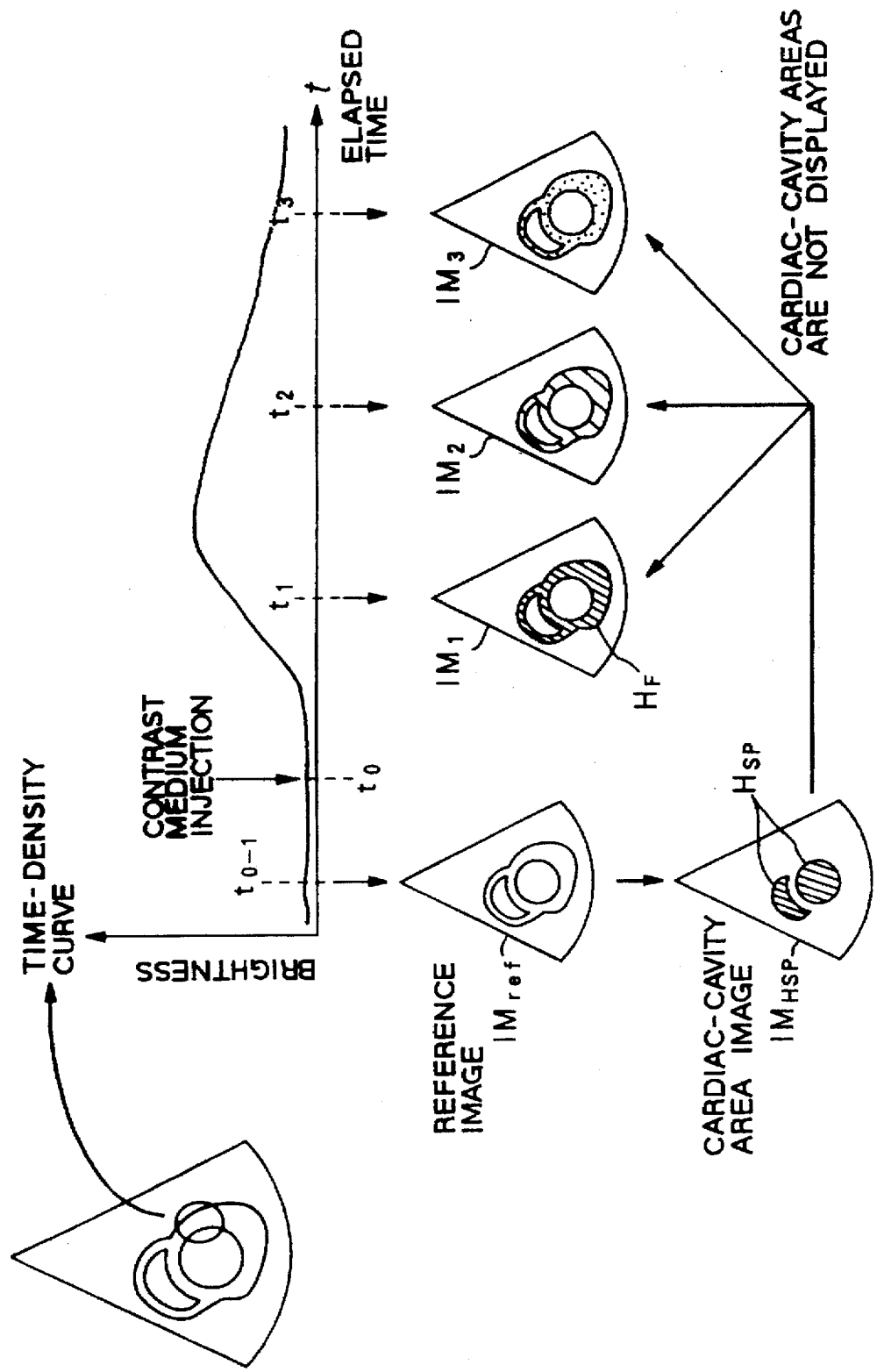
FIG. 34 is an explanatory diagram showing a time-density curve that plots a brightness change caused by injection of a contrast medium, and depicting variations of a second harmonic image of the cardiac muscle.

A brightness change curve, or a time-density curve, in FIG. 34 plots a change in average brightness level of part of a myocardial image for better understanding of brightness enhancement due to a contrast medium.

(Eleventh Embodiment)

The eleventh embodiment will be described with reference to FIG. 35. Similar to the tenth embodiment, the eleventh embodiment is intended to alleviate the influence of brightness enhancement of a cardiac-cavity image due to a contrast medium, which is stronger than that of a myocardial area, on display. Similar to the sixth embodiment, cardiac-cavity areas are recognized as non-display areas, and a brightness change in a myocardial area alone is displayed. A difference from the tenth embodiment lies in a technique for identifying cardiac-cavity areas. A level difference or level ratio between a fundamental component and non-fundamental component is marked.

Figure 35:
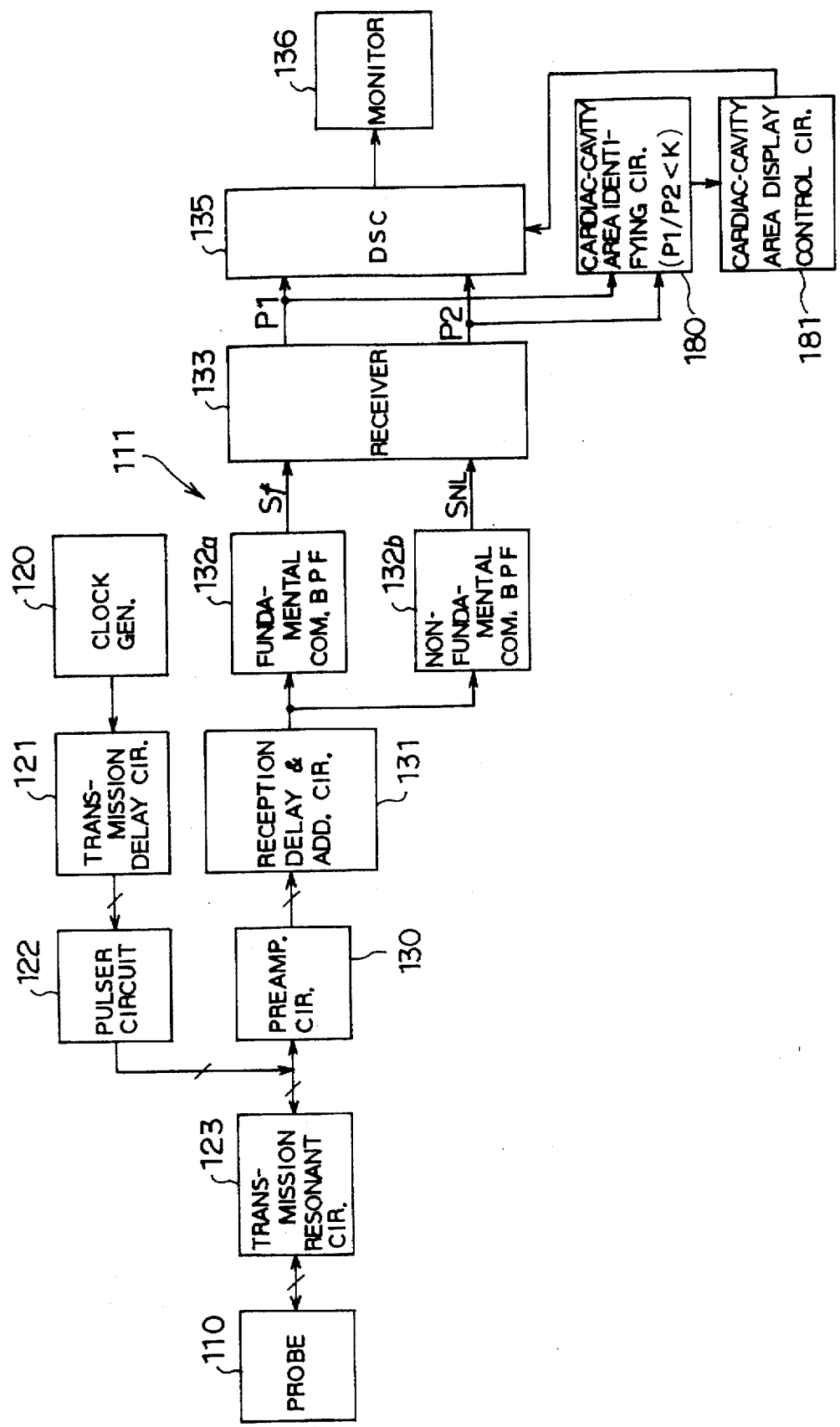
FIG. 35 is a block diagram showing a diagnostic ultrasound system of the eleventh embodiment of the present invention.

A diagnostic ultrasound system of this embodiment has, as shown in FIG. 35, the same configuration as the one of the fifth embodiment shown in FIG. 15. Moreover, a cardiac-cavity area identifying circuit 180 and a cardiac-cavity area display control circuit 181 are interposed between the receiver 133 and DSC 135.

An echo level of a fundamental component $S_f$ provided by the receiver 133 shall be P1 and an echo level of a nonlinear component $S_{NL}$ shall be P2. In contrast echography based on intravenous injection, occurrence of a fundamental component and non-fundamental component in the cardiac cavities is attributable to a contrast medium therein. However, occurrence of a fundamental component in the cardiac muscle is attributable to the cardial muscle tissue, and occurrence of a non-fundamental component in the cardiac muscle is attributable to a contrast medium therein. In this situation, it is thought that the formula below is established.

(P1 (cardiac cavity)/P2 (cardiac cavity))<(P1 (cardiac muscle)/P2 (cardiac muscle))

Herein, an appropriate threshold K is introduced.

(P1/P2)<K

Pixels satisfying the above condition can be defined as cardiac-cavity areas (or non-myocardial areas).

The cardiac-cavity area identifying circuit 180 compares the levels P1 and P2 of an output signal of the receiver 133 for each pixel. An pixel in which a quotient of P1 by P2 is smaller than the threshold K is automatically identified as a pixel constituting a cardiac-cavity area. Based on the result of identification (in other words, depending on whether or not "P1/P2" is larger than K), the cardiac-cavity area display control circuit 181 sends display/non-display information concerning each pixel value of image data to the DSC 135. According to the display/non-display information, the DSC 135 masks (disables display of) pixels of a frame image. Consequently, similarly to the tenth embodiment, this embodiment produces a myocardial perfusion image in which cardiac-cavity areas are not displayed. A change in brightness enhancement in a myocardial image due to a contrast medium in the cardiac muscle can be identified effortlessly and accurately.

A logical expression employed in the cardiac-cavity area identifying circuit 180 is not limited to the aforesaid one but can be varied depending on the condition of a diagnostic object. The threshold K may also be set to any selected value.

In the tenth and eleventh embodiments, a diagnostic object is the cardiac muscle. Aside from the cardiac muscle, large vessels will do. The present invention may be adapted for display/non-display control of a vascular wall relative to the inside of the vessel.

(Twelfth Embodiment)

The twelfth embodiment will be described with reference to FIGS. 36 and 37. This embodiment relates to a diagnostic ultrasound system in which a plurality of ultrasound beams having different frequencies are irradiated to a living body simultaneously, and then contrast echography is conducted. The diagnostic ultrasound system comprises a transmitting system for transmitting a plurality of ultrasound beams having different frequencies (fundamental components $f_1$, $f_2$, $f_3$, etc.) to a living body simultaneously, a receiving/processing system for receiving and processing echoes whose frequencies correspond to a frequency band including at least one of summation frequencies that are sums of frequencies of fundamental components produced in the living body and sums of frequencies of harmonics relative to the fundamental components ($f_1+f_2$, $f_2+f_3$, etc., $Nf_1+Mf_3$, etc., where M and N denote integers) and difference frequencies that are differences of frequencies of the fundamental components and differences of frequencies of the harmonics ($f_1-f_2$, $f_2-f_3$, etc., $Nf_1-Mf_3$, etc., where M and N denote integers), and a display system capable of displaying contrast images deriving from a fundamental component and non-fundamental component. Summation-frequency or difference-frequency components among transmitted frequency components affected by nonlinear scattering due to a contrast medium in a living body are detected and used to visualize the perfusion of the ultrasound contrast medium in the living body.

Figure 36:
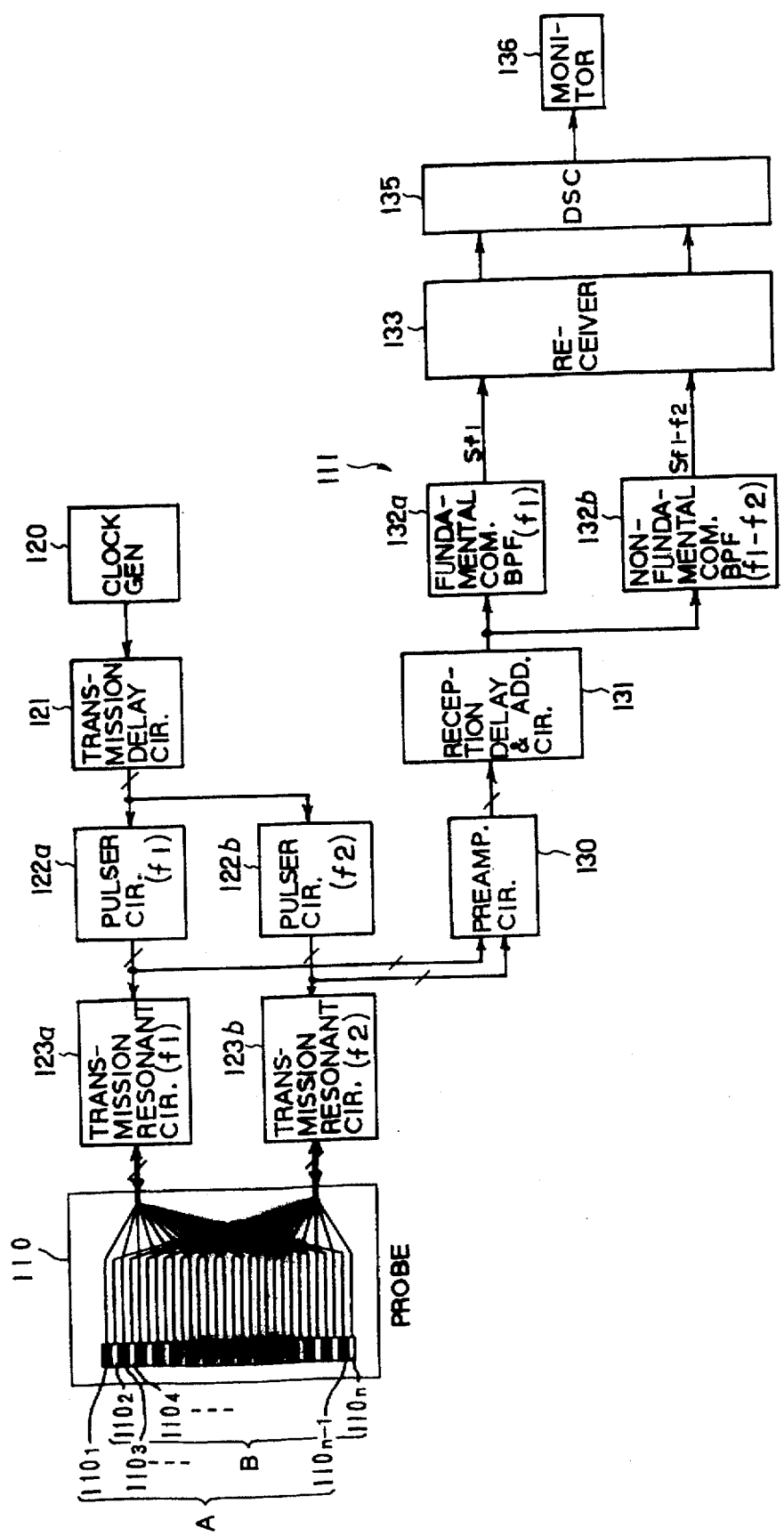
FIG. 36 is a block diagram showing a diagnostic ultrasound system of the twelfth embodiment of the present invention.
Figure 37A:
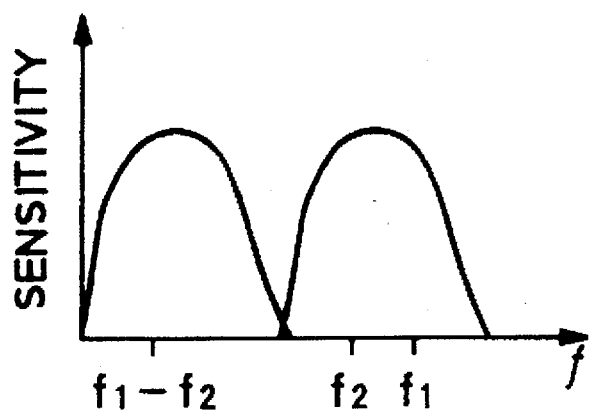
FIGS. 37A and 37B each show a frequency characteristic of a transducer.
Figure 37B:
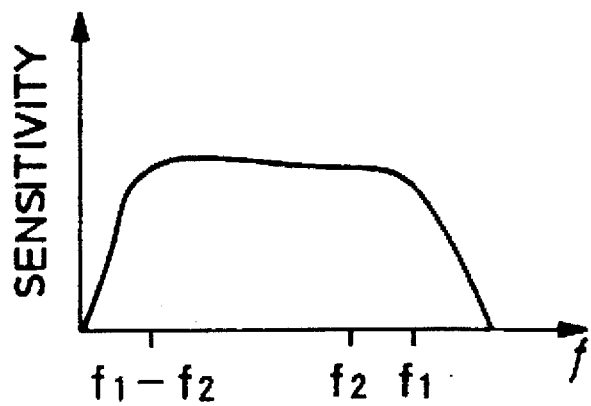

A diagnostic ultrasound system shown in FIG. 36 is an exemplary embodiment, wherein two frequency components $f_1$ and $f_2$ are used for simultaneous drive and a difference frequency component "$f_1-f_2$" is visualized.

The transducers in the probe 110 included in the diagnostic ultrasound system are, similarly to those in the aforesaid embodiments, functionally divided into transducer groups A and B. The transducers of transducer group A are assigned to transmission of a first fundamental component $f_1$, and the transducers of transducer group B are assigned to transmission of a second fundamental component $f_2$. All the transducers in the probe 110 have a sufficient transmission/reception sensitivity so as to respond to the frequency band covering the frequencies $f_1$ and $f_2$ of the fundamental components and the frequency band covering the difference frequency "$f_1-f_2$" (refer to FIG. 37A or 37B).

The transmitting system includes, as illustrated, the clock generator 120 and the transmission delay circuit 121 responsible for transmission focusing. In the output stage of the transmission delay circuit 121, a series circuit composed of a first pulser circuit 122a and first transmission resonant circuit 123a and a series circuit composed of a second pulser circuit 122b and second transmission resonant circuit 123b are connected in parallel with each other. Each of the pulsers constituting the first pulser circuit 122a generates a driving pulse whose center frequency corresponds to the frequency of the first fundamental component $f_1$. Each of the pulsers constituting the second pulser circuit 122b generates a driving pulse whose center frequency corresponds to the frequency of the second fundamental component $f_2$. The first transmission resonant circuit 123a becomes resonant on a set frequency band centered on the frequency of the first fundamental component $f_1$, and is connected to the transducers of transducer group A. The second transmission resonant circuit 123b becomes resonant on a set frequency band centered on the frequency of the second fundamental component $f_2$, and is connected to the transducers of transducer group B. The transmission resonant circuits 123a and 123b have the same capability as the aforesaid ones. Even if each pulser is not driven by a perfect sine wave, but driven by a driving pulse containing harmonics, the harmonics are eliminated. Consequently, a driving pulse composed of the first and second fundamentals $f_1$ and $f_2$ is supplied to each of the transducers of transducer groups A and B.

The terminals of the first and second transmission resonant circuits 123a and 123b on the side of the pulser circuits are connected to the reception delay & adding circuit 131 via the preamplifier circuit 130 composed of the same number of preamplifiers as the number of channels. The output terminal of the circuit 131 is connected to the receiver 133 via the fundamental component BPF 132a for extracting a first fundamental component $f_1$ and a difference-frequency component BPF 132b for extracting a difference-frequency component "$f_1-f_2$" which are connected in parallel with each other. In the output stage of the receiver 133, the DSC 135 and monitor 136 are connected in that order.

Echoes being received by the prove 110 and each containing fundamental components $f_1$ and $f_2$ and a difference-frequency component $f_1-f_2$ are sent to the preamplifier circuit 130 via the transmission resonant circuits 123a and 123b that are non-resonant. The echoes amplified for the respective channels by the preamplifier circuit 130 are subjected to reception focusing by means of the reception delay & adding circuit 131. The fundamental component BPF 132a extracts an echo $S_{f1}$ of the fundamental component $f_1$ from the echo provided by the circuit 131, and the difference-frequency component BPF 132b extracts an echo $S_{f1-f2}$ of the difference-frequency component $f_1-f_2$ therefrom. The extracted echoes are sent to the receiver 133, and then subjected to envelope detection and logarithmic compression. This results in B-mode image data derived from the echo $S_{f1}$ of the fundamental component $f_1$ and B-mode image data derived from the echo $S_{f1-f2}$ of the difference-frequency component $f_1-f_2$. The image data items are sent to the monitor 136 via the DSC 135, and displayed as division images or a superposition image.

This embodiment has the same advantage as the fifth to eighth embodiments. In addition, since a B-mode image derived from a difference-frequency component is visualized, although a second harmonic is liable to occur during transmission, a difference-frequency component will not occur. This brings about a special advantage that detection can be achieved at a higher signal-to-noise ratio than that using a second harmonic.

In the twelfth embodiment, the number of frequency components used to simultaneously drive an ultrasound beam is two. Alternatively, the number of frequency components may be three or more. The fundamental component for constructing a fundamental component image may be the second fundamental component $f_2$ that has not been described. An image being paired with a fundamental component image and expressing scattering caused by a contrast medium may be constructed using a summation-frequency component. In this embodiment, similarly to in the fifth embodiment, various variations can be made on the transmitting or receiving system.

As for the circuitry for transmitting ultrasound beams having a plurality of frequencies simultaneously, a transmitter capable of transmitting an ultrasound signal of a time wave produced by adding together a plurality of frequency components linearly, a synthesizer, and others may be included.

(Thirteenth Embodiment)

The thirteenth embodiment will be described in conjunction with FIG. 38. A diagnostic ultrasound system of this embodiment aims, similarly to the one of the twelfth embodiment, to detect from a living body summation-frequency or difference-frequency components of transmitted beams so as to visualize the perfusion of a contrast medium in a living body.

The probe 110 employed in the diagnostic ultrasound system is a duplex probe composed of a phased-array probe 110a and a single probe 110b. The phased-array probe 110a is responsible for transmission and reception of a fundamental component $f_1$ out of two fundamental components $f_1$ and $f_2$ and for reception of a difference-frequency component $f_1-f_2$ whose frequency is a difference between the frequencies of the fundamental components. The phased-array probe 110a has a sufficient transmission/reception sensitivity so as to respond to a frequency band ranging from the frequency of the component $f_1-f_2$ to the frequency of the component $f_1$ (See FIG. 37A or 37B). By contrast, the single probe 110b is dedicated to transmission of the fundamental component $f_2$ and has a sufficient transmission sensitivity so as to respond to the frequency of the fundamental component $f_2$.

The transmitting system includes, similar to that in the twelfth embodiment, first and second pulser circuits 122a and 122b. The first pulser circuit 122a for outputting a driving pulse containing the first fundamental component $f_1$ is connected to the phased-array probe 110a on a channel-to-channel basis. The second pulser circuit 122b for outputting a driving pulse containing the second fundamental component $f_2$ is connected to the single probe 110b. The phased-array probe 110a is connected to the preamplifier circuit 130 constituting the receiving/processing system. In the subsequent stages, signals are processed in the same manner as those in the twelfth embodiment. Two kinds of ultrasound beams irradiated by the phased-array probe 110a and single probe 110b respectively have the beam orientations and positions thereof determined so that the beams can intersect at a desired position in a diagnostic region. In addition, an image indicating the intersectional position is displayed on the monitor 136.

The reception delay & adding circuit 131 delays and adds up echoes so that the echoes will be those emanating from the intersectional position, or diagnostic region, through reception focusing. Thus, a B-mode image deriving from the echo of the first fundamental $f_1$ and a B-mode image deriving from the echo of the difference-frequency component $f_1-f_2$ can be produced in the same manner as they are in the twelfth embodiment. In this embodiment, the second fundamental component $f_2$ out of the two fundamental components $f_1$ and $f_2$ is transmitted by the single probe 110b. This brings about a unique advantage that a conventional phased-array probe can be employed.

The single probe may be structured so that a beam direction can be deflected mechanically. Moreover, the diagnostic ultrasound system may be configured so that transmission resonant circuits are interposed respectively between the first pulser circuit and single probe and between the second pulser circuit and phased-array probe.

(Fourteenth Embodiment)

The fourteenth embodiment of the present invention will be described with reference to FIG. 39.

The fourteenth embodiment is concerned with calculation and display of a motion velocity of a echo reflection source for emitting a receptible non-fundamental component (a harmonic, subharmonic, ultra-harmonic or their summation—or difference-frequency components).

Figure 39:
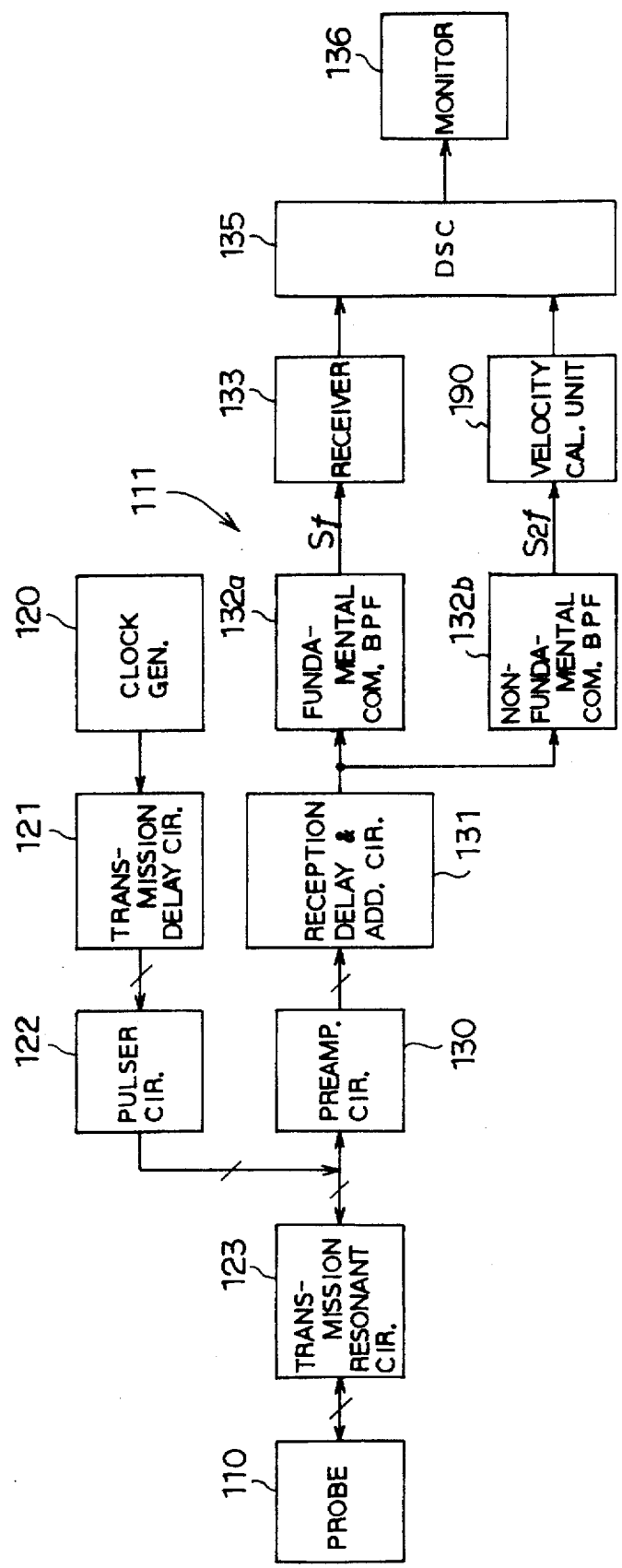
FIG. 39 is a block diagram showing a diagnostic ultrasound system of the fourteenth embodiment of the present invention.

A diagnostic ultrasound system shown in FIG. 39 has a receiving/processing system including a velocity calculation unit 190 in addition to the same configuration as the one of the fifth embodiment shown in FIG. 15. Specifically,the velocity calculation unit 190 is connected to the DSC 135 in the output stage of the non-fundamental component BPF 132b for extracting a second harmonic. In the output stage of the fundamental component BPF 132a, the receiver 133 is connected to the DSC 135. The velocity calculation unit 190 calculates two-dimensionally-mapped motion velocity data using such a technique as known Doppler imaging or cross-correlation.

An echo containing a fundamental component and non-fundamental component and being subjected to reception focusing by means of the reception delay & adding circuit 131 is sent as an echo $S_f$ containing the fundamental component alone from the fundamental component BPF 132a to the receiver 133. The receiver 133 supplies B-mode (fundamental component) image data as morphologic information concerning a tissue to the DSC 135. On the other hand, the non-fundamental component BPF 132b extracts an echo $S_{2f}$ consisting of a second harmonic for each echo and transmits it to the velocity calculation unit 190. The velocity calculation unit 190 includes a filter for extracting a Doppler signal whose frequency corresponds to a frequency band associated with a velocity range of an object region that has been revealed experimentally. Owing to the velocity calculation unit 190, motion velocity data representing a two-dimensional distribution that includes motion velocities of an echo reflection source for generating a second harmonic, for example, an ultrasound contrast medium (that is, a venous blood flow) for contrast echography is calculated using the echo $S_{2f}$. The motion velocity data is sent to the monitor 136 together with the B-mode image data via the DSC 135. As a result, for example, avelocity distribution image is displayed in the background of B-mode images. This is advantageous in that blood flow velocities in a tissue (for example, in the cardiac muscle) can be evaluated.

Alternatively, the motion velocity of an echo source defined as a region of interest in a B-mode image depicting a scan plane may be calculated at the same time, and a time-sequential change in velocity may be displayed.

(Fifteenth Embodiment)

Figure 40:
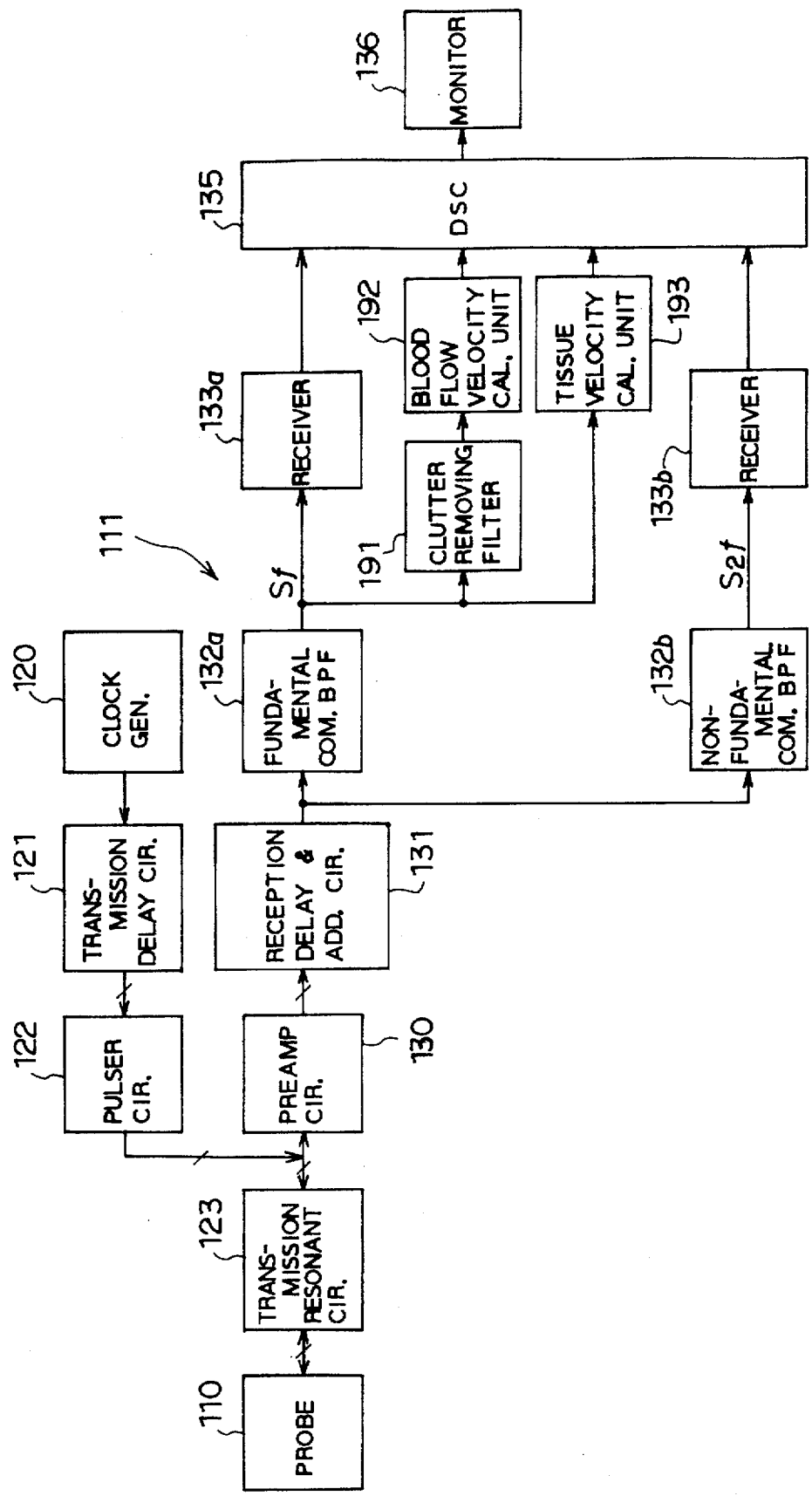
FIG. 40 is a block diagram showing a diagnostic ultrasound system of the fifteenth embodiment of the present invention.
Figure 41:
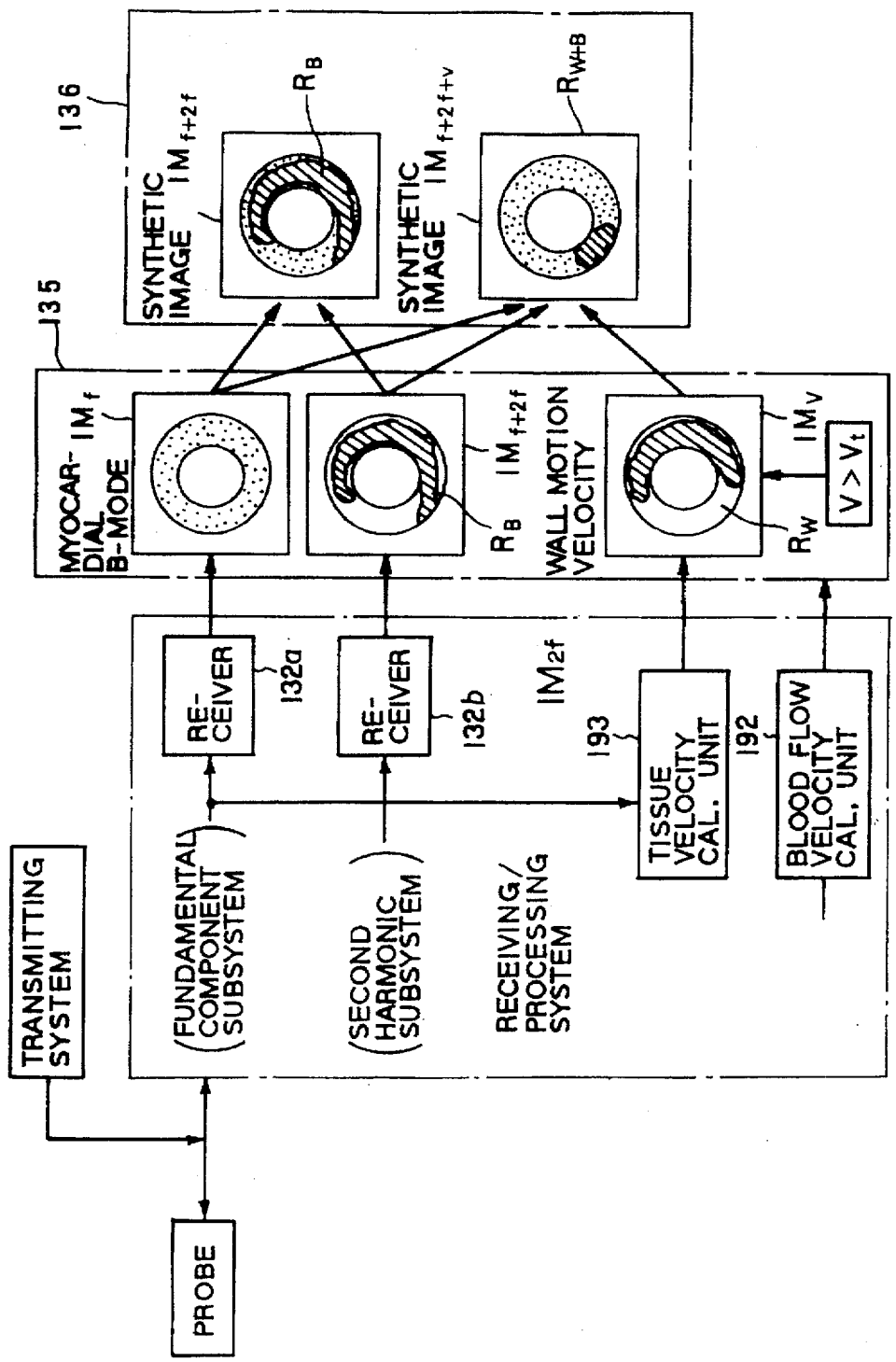
FIG. 41 shows examples of combinations of images in the fifteenth embodiment.

The fifteenth embodiment of the present invention will be described with reference to FIG. 40. In a diagnostic ultrasound system of this embodiment, when contrast echography using an ultrasound contrast medium is adopted, morphologic information concerning a tissue such as the cardiac muscle which is dependent on the echo level of a fundamental component, tissular blood flow information dependent on the echo level of a non-fundamental component, and a motion velocity of a tissue (for example, the cardiac muscle) dependent on the echo level of a fundamental component can be calculated, and the three items; that is, morphologic information, tissular blood flow information, and a tissular motion velocity can be displayed simultaneously.

To be more specific, the diagnostic ultrasound system has the same configuration as the one shown in FIG. 15 (fifth embodiment) and includes, as illustrated, a clutter removing filter 191, a blood flow velocity calculation unit 192, and a tissue velocity calculation unit 193. A series circuit composed of one receiver 133a, clutter removing filter 191 for removing an unwanted clutter, and blood flow velocity calculation unit 192 for calculating the motion velocity of a blood flow, and the tissue velocity calculation unit 193 for calculating the motion velocity of a tissue such as the cardiac muscle are connected in parallel with each other between the output terminal of the fundamental component BPF 132a and DSC 135.

The non-fundamental component BPF 132b is connected to the DSC 135 via the remaining receiver 133b.

In the tissue velocity calculation unit 193, a phase detector is used to phase-detect an echo that has been subjected to reception focusing with respect to a Doppler shift frequency. Doppler signals emanating from a blood flow or a cardiac valve are then separated from phase-detected echoes by means of low-pass filters in a filter unit. Using the filtered echoes, a frequency analyzer calculates two-dimensional distribution data concerning Doppler shifts that occur in a tissue according to such a technique as auto-correlation or fast Fourier transform (FFT). The blood flow velocity calculation unit 192 can therefore calculate maximum and average values of motion velocities of a tissue using the two-dimensional distribution data concerning Doppler shifts. An analysis technique employed in the frequency analyzer may be cross-correlation.

The fundamental component BPF 132a extracts a fundamental component $S_f$ from an echo having been subjected to reception focusing by means of the reception delay & adding circuit 131 and containing a fundamental component and non-fundamental components. The non-fundamental component BPF 132b extracts a second harmonic $S_{2f}$ therefrom. The echo of the fundamental component $S_f$ is converted into image data representing a B-mode image by the receiver 133a. At the same time, the echo of the fundamental component $S_f$ is converted into image data representing a blood flow velocity distribution image (for example, a color Doppler (CFM) image) by the clutter removing filter 191 and blood flow velocity calculation unit 192, and further converted into image data representing a tissue (for example, the cardiac muscle) motion velocity distribution image by the tissue velocity calculation unit 193. The echo of the second harmonic $S_{2f}$ is converted into image data representing a second harmonic B-mode image by the remaining receiver 133b. These four image data items are sent to the DSC 135, transformed into frame image data conformable to a display form commanded at that time (including selection and synthesis of the data items), and then displayed on the monitor 136.

An example of display attained when contrast echography based on intravenous injection of an ultrasound contrast medium is adapted to examination of the heart will be described in conjunction with FIG. 31. As shown in FIG. 31, an echo passing through the receiver 133a constituting a fundamental component subsystem of a receiving/processing system is converted into image data representing a B-mode image $IM_f$ of the heart. The image data provides morphologic information concerning the cardiac muscle and visual information expressing myocardial motions. An echo passing through a second harmonic subsystem of the receiving/processing system is converted into image data representing an intramyocardial blood perfusion image $IM_{2f}$. According to one display form, the DSC 135 superposes the image data $IM_{2f}$ on the image data $IM_f$. As a result, a synthetic image $IM_{f+2f}$ is displayed on the monitor 136, and a blood perfusing region $R_B$ in the cardiac muscle (hatched area in the image $IM_{f+2f}$) is visualized in real time.

An echo passing through the tissue velocity calculation unit 193 constituting the fundamental component subsystem is converted into image data representing a two-dimensional distribution image expressing myocardial motion velocities. The two-dimensional distribution of motion velocities (not shown) may be displayed as it is. Alternatively, the DSC 135 judges pixel by pixel whether a velocity V is larger than a given threshold Vt. Image data representing a two-dimensional distribution $IM_v$ of motion velocities satisfying the judgment condition, or exceeding the threshold Vt, may then be produced and displayed, whereby a myocardial region making an abnormal wall motion, $R_w$, (a white area in the image $IM_v$) is visualized. According to another display form, three images; a two-dimensional distribution image $IM_v$ expressing myocardial motion velocities that have been processed relative to the threshold, a myocardial B-mode image $IM_f$, and an intramyocardial blood perfusion image $IM_{2f}$ are mutually superposed by the DSC 135 (the data items representing the abnormal wall-motion region $R_w$, and blood perfusing region $R_B$ are ANDed). Consequently, a synthetic image $IM_{f+2f+v}$ is displayed on the monitor 136. A diagnostically-interesting region $R_{W+B}$, in which the motion of the myocardial wall stops (more particularly, the wall motion velocity is lower than a certain threshold) but blood is perfusing, can be visualized in real time.

As mentioned above, according to this embodiment, for example, the cardiac muscle can be assessed in real time in terms of morphology, motion, and blood perfusion, and, at the same time, can be diagnosed comprehensively. This enables evaluation of viability of the cardiac muscle. Thus, useful information that has been unavailable in the past can be provided.

(Sixteenth Embodiment)

The sixteenth embodiment of the present invention will be described in conjunction with FIGS. 42 to 44. A diagnostic ultrasound system of this embodiment acquires image data deriving from non-fundamental components induced by an ultrasound contrast medium at intervals of certain time. The acquired data is used to plot a time-density curve (TDC) and calculate magnitudes of properties (parameters) of the curve.

Figure 42:
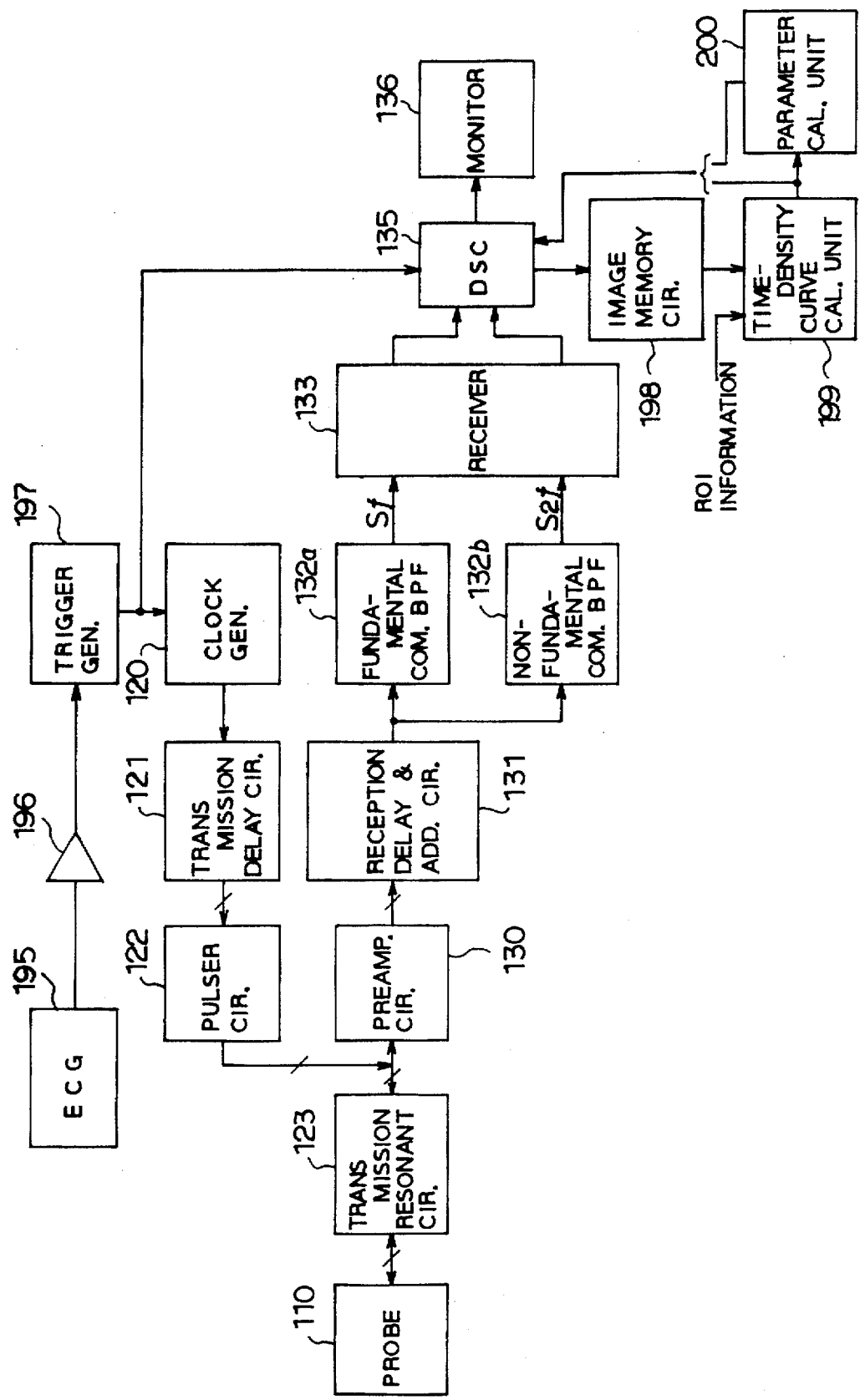
FIG. 42 is a block diagram showing a diagnostic ultrasound system of the sixteenth embodiment of the present invention.
Figure 43:
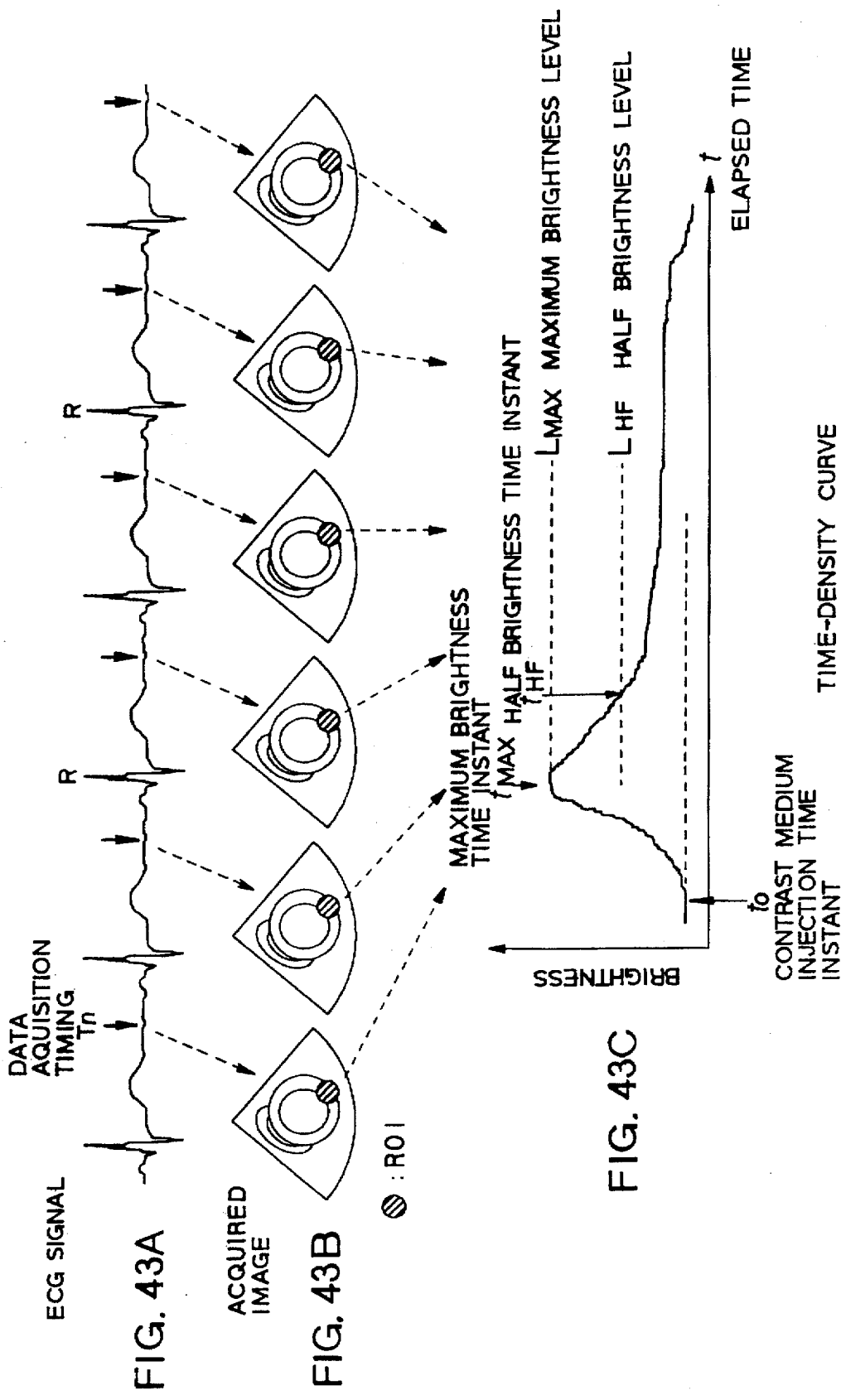
FIGS. 43A to 43C are explanatory diagrams concerning the relationship among an ECG signal, image acquisition timing, and a time-density curve.

The diagnostic ultrasound system of this embodiment shown in FIG. 42 has the above-described configuration shown in FIG. 15 (fifth embodiment) and includes an ECG 195, an ECG amplifier 196, and a trigger generator 197 which are needed to acquire image data at intervals of certain time. The ECG 95 supplies ECG information (ECG signal) acquired on respective cardiac phases of a patient to the trigger generator 197 via the ECG amplifier 196. The trigger generator 197 produces a trigger pulse at a leading edge of an R wave of an EOG signal, and sends the trigger pulse to each of a transmission/reception timing determiner in the clock generator 120 and the DSC 135. The transmission/reception timing determiner in the clock generator 120 performs counting for a certain period of time since the arrival of the trigger pulse, determines optimal data acquisition timing Tn in each cycle of the ECG signal, and causes the transmitting system and receiving/processing system to carry out sequences of transmission and reception according to the transmission and reception timing matching the data acquisition timing Tn. The data acquisition timing Tn is set to, for example, as shown in FIG. 43A, the end-diastole of the left ventricle (for example, a time instant after a certain period of time since an R wave). Every time the ECG-gated data acquisition timing Tn comes, image data is acquired.

The diagnostic ultrasound system includes an image memory circuit 198 connected to the DSC 135, a time-density curve calculating unit 199, and a parameter calculating unit 200 which are included in the receiving/processing system. The image memory circuit 198 stores image data derived from a second harmonic, which is a non-fundamental component, and sent to the DSC 135 every time the data acquisition timing Tn comes. The time-density curve calculation unit 199 has a CPU facility, reads image data specified with the position of a ROI (which is defined in advance or after image acquisition) set in part of the cardiac muscle image from the image memory circuit 198, and calculates data concerning a time-density curve (TDC).

Thus, image data representing, for example, a short-axis image of the left ventricle (see FIG. 43B) is acquired every time the ECG-gated data acquisition timing Tn comes in cardiac cycles (see FIG. 43A). Acquired image data is stored in the image memory circuit 198. After all image data is acquired, the time-density curve calculation unit 199 reads data specified with a ROI position from each image data, performs an operation such as averaging of ROI data, and thus calculates brightness change data relative to elapsed times t since a contrast medium injection time instant to (see FIG. 43C). This calculation may be carried out at regular intervals during image data acquisition, whereby the storage capacity of the image memory circuit 198 can be reduced.

The parameter calculation unit 200 is interposed between the time-density curve calculation unit 199 and DSC 135. The parameter calculation unit 200 has a CPU facility and executes the processing described in FIG. 44. Specifically, it is judged whether the time-density curve calculation unit 199 has completed calculation of data concerning a time-density curve (step 200a in FIG. 44). When the time-density curve calculation unit 199 has completed the calculation, the curve data is fitted (step 200b in FIG. 44). The curve fitting is such that calculated data concerning a time-density curve is fitted to an appropriate function (for example, a gamma function, gauss function, or exponential function). Owing to the curve fitting, the influence of a noise or measurement error can be minimized and a substantial brightness change can be extracted. The curve fitting may be assigned to the time-density curve calculation unit 199 or may be executed when it becomes necessary.

Figure 44:
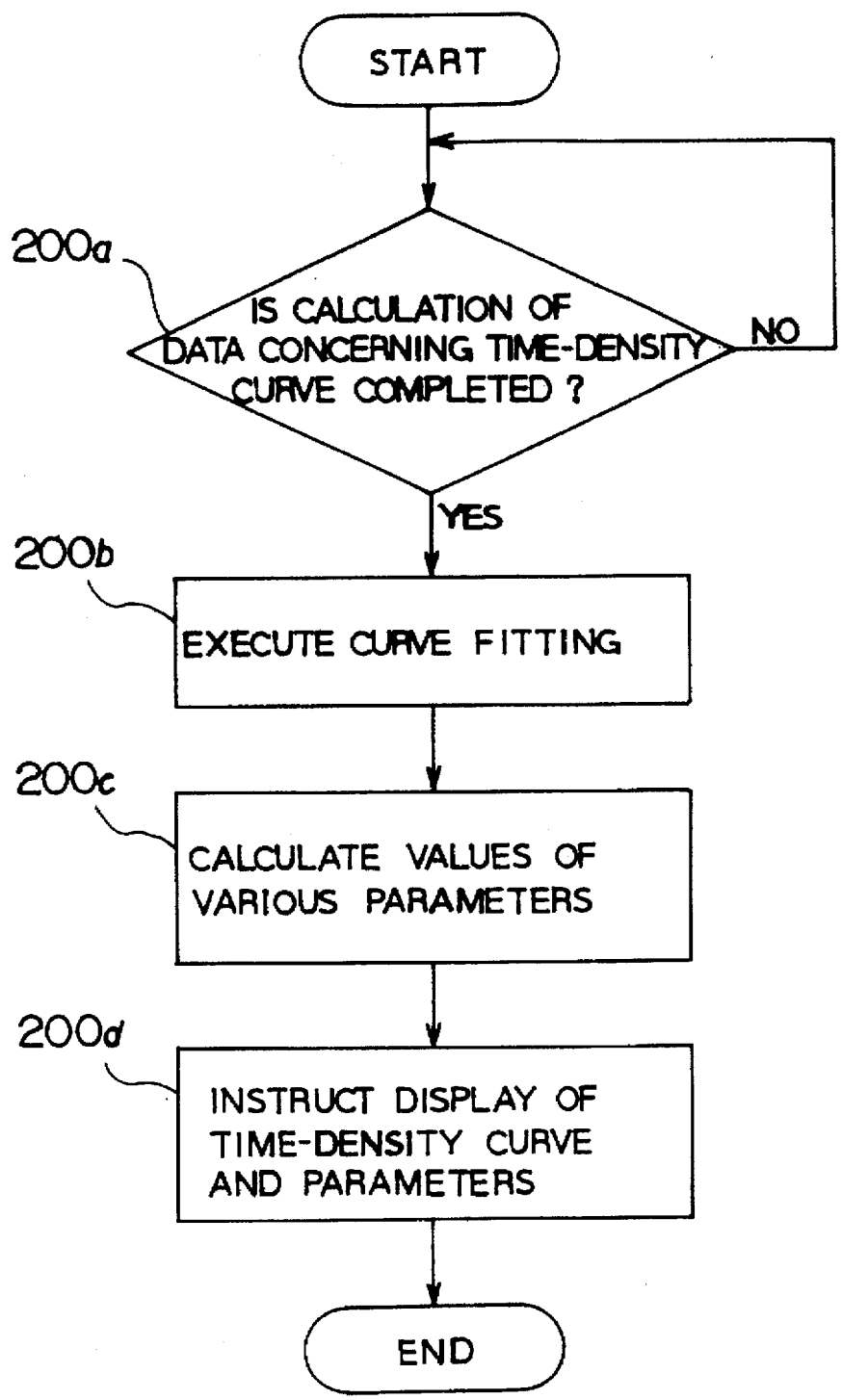
FIG. 44 is a flowchart briefly describing calculation of the values of parameters that are magnitudes of properties of a time-density curve.

The parameter calculation unit 200 uses the fitted data concerning a time-density curve to calculate the values of various parameters representing magnitudes of properties of a time-density curve, for example, a maximum brightness level $L_{MAX}$, a maximum brightness time instaant $t_{MAX}$, a half brightness level $L_{HF}$, a half brightness time instaant $t_{HF}$, a half brightness time (=maximum brightness time instaant $t_{MAX}$—half brightness time instant $t_{HF}$), a maximum brightness accomplishment time (injection time instant $t_0$—maximum brightness time instant $t_{MAX}$), and a contrast duration (duration of a brightness level exceeding a threshold) (step 200c in FIG. 44.

The thus calculated parameter data is sent together with the data concerning a time-density curve to the DSC 135 (step 200d in FIG. 44), and then displayed on the monitor 136 in combined display mode with, for example, a superposition image $IM_{f+2f}$ of a fundamental component image $IM_f$ and second harmonic image $IM_{2f}$.

Thus, this embodiment provides the same advantage as the fifth embodiment. In addition, when contrast echography using an ultrasound contrast medium is implemented, a brightness change in an image enhanced with a contrast medium that is a tissular blood perfusion image and magnitudes of properties of the brightness change can be automatically grasped in a state unaffected by a cardiac cycle. Consequently, diagnostically helpful information can be acquired.

A plurality of ROIs may be set in this embodiment. The image acquisition timing is not limited to ECG-gated timing but may be timing, that comes at regular intervals or every start of a frame. A memory means for storing acquired image data is not limited to an image memory circuit incorporated in the system, but may be a magneto-optical disk or workstation connected to the system.

In the sixteenth embodiment, there is a great possibility that the time-density curve loses its significance unless it is concerned with one region of a tissue. Data concerning a time-density curve is usually acquired from (1) an image of a motionless tissue (for example, an abdominal organ) or (2)

an ECG-gated image of the cardiac muscle. If a tissue concerned still moves even slightly, a means for finely adjusting the position of a ROI for each frame may be included. For this fine adjustment, a manual fine adjustment feature such as a mouse may be used to finely adjust the position of a ROI.

The processing employed in the sixteenth embodiment may be extended so that the time-density curve calculation unit and parameter calculation unit will execute the aforesaid calculations for all pixels of each acquired image or all of a plurality of sets of pixels thereof. In this case, the values of such a parameter as a maximum brightness level can be displayed two-dimensionally. As a result, a two-dimensional distribution of maximum brightness levels can be observed at sight. This will be diagnostically helpful.

According to the present invention, a transmitting system filter for passing a fundamental component alone may be used as a suppressing means for intentionally and actively suppressing non-fundamental components.

Figure 45A:
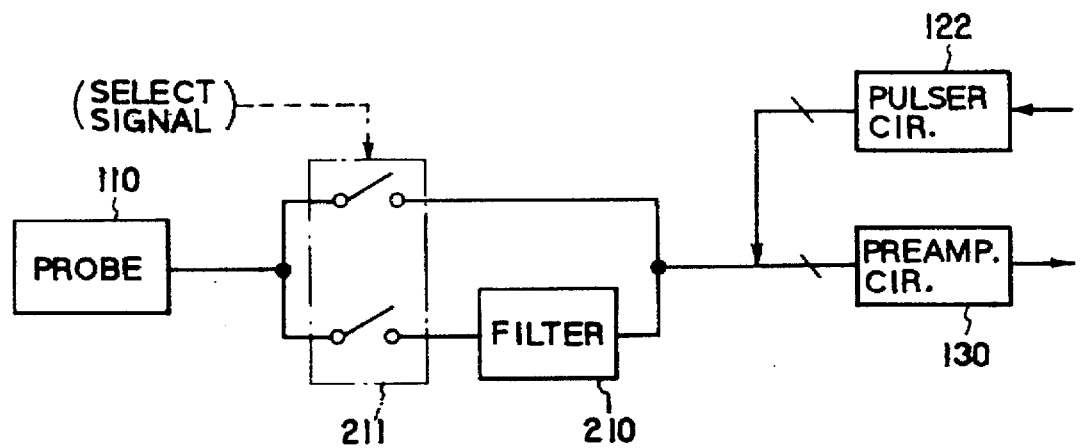
FIGS. 45A and 45B each show a variant having a suppressing means and the circuitry of the suppressing means.
Figure 45B:
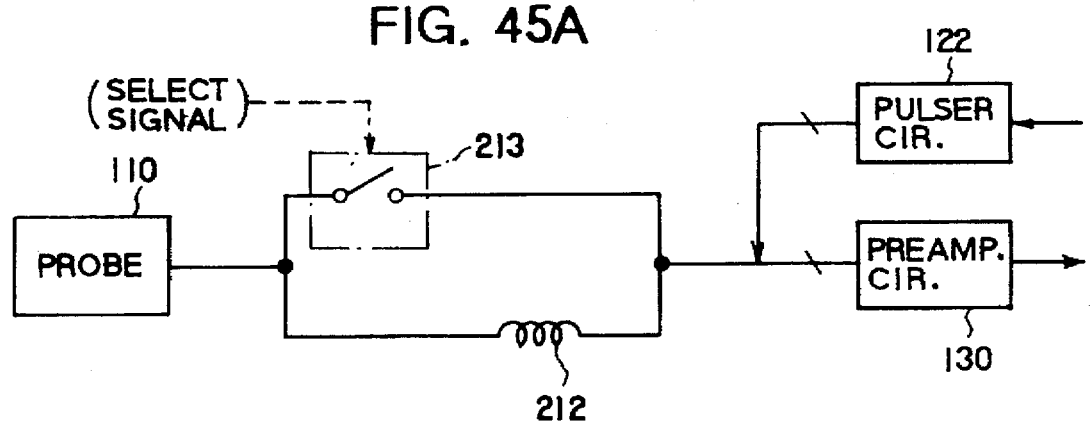

When a filter or a transmission resonant circuit for attaining a series resonance is used as the suppressing means in accordance with the present invention, the circuitry shown in FIGS. 45A and 45B may be adopted. In FIG. 45A, a filter 210 is interposed between the probe 110 and the pulser circuit 122 and preamplifier circuit 130. In addition, a selector switch 211 is provided for actuating the filter 210 alone during transmission, and disconnecting the filter 210 so as to form a reception bypass during reception. In FIG. 45B, a series resonance inductance 212 is interposed as a transmission resonant circuit between the probe 110 and the pulser circuit 122 and preamplifier circuit 130. A selector switch 213 for turning off the inductance 212 during transmission and turning it on during reception is connected in parallel with the inductance 212. These circuitries will provide the same operation and advantage as the one in the aforesaid embodiments.

Therefore, in a diagnostic ultrasound system in accordance with the present invention, even for examination of a region (for example the cardiac muscle, and parenchymatous organs) whose imaging is prone to the influence of echoes emanating from surrounding tissues, an appropriate image whose brightness is enhanced by a contrast medium can be produced by implementing contrast echography based on intravenous injection.

In particular, assessment of a blood-perfusing region in the cardiac muscle using a myocardial perfusion image can be achieved by conducting the contrast echography based on intravenous injection.

Furthermore, motion information concerning cardiac walls and blood-perfusion information concerning the cardiac muscle can be acquired and evaluated simultaneously. In stress echography used for diagnosis of angina pectoris, motion information concerning cardiac walls and blood-perfusion information concerning the cardiac muscle can be acquired and evaluated simultaneously in different stressed states. Thus, more comprehensive diagnosis can be achieved.

As stated above, embodiments of the present invention have been described, but it is understood that the present invention is not limited to the above embodiments and that the invention can employ other modified embodiments within the scope of the invention.

What is claimed is:

1. An ultrasound probe, comprising:

a transducer formed with a piezoelectric member for performing a conversion between an electric signal and an ultrasound signal bidirectionally; and at least three electrodes including a ground electrode attached to the piezoelectric member so as to have a passband characteristic of at least two kinds of frequency components whose center frequencies retain a multiple relation with each other and represent a multi-humped frequency characteristic.

2. The probe of claim 1, wherein the electrodes are three in number including the ground electrode used in common and two signal electrodes, and the passband characteristic is two kinds in kind number.

3. The probe of claim 2, wherein the piezoelectric member has a certain thickness in a certain direction and both sides in parallel with a thickness direction of the piezoelectric member, and the signal electrodes consist of a first signal electrode at least partially attached to either one of both the sides and a second signal electrode attached to the other side, the second signal electrode coupling with an intermediate electrode extending toward the either one side partitioning the piezoelectric member in the thickness direction, and the first and second signal electrodes being connected to an individual lead member at connecting positions on the first and second electrodes respectively, each of the connecting positions residing in parallel with each of both the sides.

4. The probe of claim 3, wherein the ultrasound probe has a probe head containing the transducer and each of the lead members interposed by a buffer amplifier of a high input impedance situated within the probe head.

5. The probe of claim 3, wherein said electrodes are formed such that the second signal electrode provides the two kinds of frequency components whose center frequencies retain the multiple relation with each other and represent a double-humped frequency characteristics.

6. The probe of claim 3, wherein said ground electrode is positioned on a side of the piezoelectric member from which the ultrasound signal is irradiated.

7. The probe of claim 2, wherein a plurality of the transducers are arranged in an array direction defining a scanning direction of the ultrasound signal and are functionally divided into two transducer groups, and lead members are connected to each set of the three electrodes associated with each transducer so that each transducer group has specified one of the two-kind passband characteristic.

8. The probe of claim 7, wherein each transducer of each group of the two transducer groups are alternately arranged in the array direction group by group.

9. The probe of claim 2, wherein:

a plurality of the transducers are arranged in an array direction defining a scanning direction of the ultrasound signal and are functionally divided into two transducer groups, the piezoelectric member has a certain thickness in a certain direction and both sides in parallel with a thickness direction of the piezoelectric member, and the signal electrodes consist of a first signal electrode at least partially attached to either one of both the sides and a second signal electrode attached to the other side, the second signal electrode coupling with an intermediate electrode extending toward the either one side partitioning the piezoelectric member in the thickness direction, wherein two lead members are respectively connected to the second and ground electrodes attached to each piezoelectric member of at least one of the two transducer groups, the first and the ground electrodes attached to each piezoelectric member of the at least one transducer group being short-circuited with each other through a short-circuit member.

10. The probe of claim 9, wherein said two lead wires are connected to the second and ground electrodes attached to each piezoelectric member of one of the two transducer groups, wherein another two lead members are respectively connected to the first and ground electrodes attached to each piezoelectric member of the remaining transducer group.

11. The probe of claim 10, wherein each of the lead members connected to the signal electrodes is connected to each of the signal electrodes at a connecting position residing on either one of the sides.

12. The probe of claim 9, wherein said ground electrode is positioned on a side of the piezoelectric member from which the ultrasound signal is irradiated.

13. A diagnostic ultrasound system comprising:

an ultrasound probe comprising, a plurality of transducers each formed with a piezoelectric member for performing a conversion between an electric signal and an ultrasound signal bidirectionally, and at least three electrodes including a ground electrode attached to each of the transducers so as to have a passband characteristic of at least two kinds of frequency components whose center frequencies retain a multiple relation with each other and represent a multi-humped frequency characteristic; and means for transmitting the ultrasound signal to a subject and receiving the ultrasound signal echoed from the subject through the ultrasound probe on the basis of a transmission/reception operation related to the at least two kinds of the frequency components.

14. The system of claim 13, wherein the electrodes are three in number including the ground electrode used in common and two signal electrodes, and the passband characteristic is two kinds in kind number.

15. The system of claim 14, wherein the two-kind passbands are passbands passing both a fundamental frequency component of the electric signal and a non-fundamental frequency component of the electric signal, respectively, the electric signal being acquired under performing an ultrasound contrast echography with an ultrasound contrast medium resulting in generating the non-fundamental frequency component.

16. The system of claim 15, wherein the non-fundamental frequency component is either one of a harmonic component and a subharmonic component of the fundamental frequency component.

17. The system of claim 16, wherein the transmitting/receiving means comprises means for permitting the probe to transmit the fundamental frequency component of the ultrasound signal to the subject through the ground electrode and specified one of the two signal electrodes, means for permitting the probe to receive the harmonic component of the ultrasound signal echoed from the subject through the ground electrode and the other of the two signal electrodes, and means for displaying a tomographic image of the subject based on the electric signal corresponding to the echoed ultrasound signal.

18. The system of claim 16, wherein the transmitting/receiving means comprises means for permitting the probe to transmit the fundamental frequency component of the ultrasound signal to the subject through the ground electrode and specified one of the two signal electrodes, means for permitting the probe to receive the subharmonic component of the ultrasound signal echoed from the subject the ground electrode and the other of the two signal electrodes, and means for displaying a tomographic image of the subject based on the electric signal corresponding to the echoed ultrasound signal.

19. The system of claim 16, wherein the plurality of transducers are functionally divided into two transducer groups, lead members are connected to each set of the three electrodes associated with each transducer so that each transducer group has specified one of the two-kind passband characteristics, and the transmitting/receiving means comprises means for permitting the probe to transmit the fundamental frequency component of the ultrasound signal to the subject through the transducers of specified one of the two transducer groups, means for permitting the probe to receive the non-fundamental frequency component of the ultrasound signal echoed from the subject through the transducers of the other one of the two transducer groups, and means for displaying a tomographic image of the subject based on the electric signal corresponding to the echoed ultrasound signal.

20. The system of claim 19, wherein each transducer of each group of the two transducer groups are alternately arranged in the array direction group by group, the array direction defining a scanning direction of the ultrasound signal.

21. The system of claim 14, wherein the transmitting/receiving means comprises a first transmitting/receiving means for performing a Doppler-mode scan using the ultrasound signal, the Doppler-mode scan producing velocity information of a moving object within the subject and being performed through one pair of the three electrodes of each of the transducers in charge of a lower-frequency-side passband characteristic of the two-kind passband characteristics, and a second transmitting/receiving means for performing a further scan and the Doppler-mode scan using the ultrasound signal, the further scan being performed through the other pair of the three electrodes of each of the transducers in charge of a higher-frequency-side passband characteristic of the two-kind passband characteristics.

22. A diagnostic ultrasound system, comprising:

a probe for converting an electrical driving signal into a corresponding transmission ultrasound wave and converting an echoed ultrasound wave into a corresponding electrical echo signal;

means for transmitting the transmission ultrasonic wave to a subject to be diagnosed by providing the probe the electrical driving signal substantially consisting of a fundamental component corresponding to a given driving frequency, a non-fundamental component of the driving signal being intentionally lowered in power relative to the fundamental component;

means for receiving the electrical echo signal from the probe and processing the electrical echo signal into a display image data; and means for displaying the display image data.

23. The system of claim 21, wherein the fundamental component consists of one fundamental frequency and the non-fundamental component includes at least one of a harmonic, subharmonic, and ultra-harmonic to the fundamental component.

24. The system of claim 23, wherein the non-fundamental component is a second harmonic to the fundamental component.

25. The system of claim 22, wherein the transmitting means comprises a suppressing means for intentionally suppressing the non-fundamental component.

26. The system of claim 25, wherein the suppressing means is one of a transmission filter for passing the fundamental component of the driving signal alone, a transmission notch filter for cutting off the non-fundamental component of the driving signal, and a transmission resonant circuit for passing the fundamental component alone by producing a resonant state only in transmission of the driving signal.

27. The system of claim 26, wherein the probe is a phased-array type probe in which a plurality of transducers is arranged in array.

28. The system of claim 27, wherein all the transducers of the probe have a transmission/reception sensitivity to both the fundamental and non-fundamental components, the suppressing means is connected to at least one transducer of all the transducers channel by channel, the at least one transducer being in charge of transmission, and the receiving/processing means has a preamplifier circuit receiving the echo signal, a reception delay and adding circuit connecting to the preamplifier circuit, a first filter connecting to the reception delay and adding circuit and passing the fundamental component alone, and a second filter connecting to the reception delay and adding circuit and passing the non-fundamental component alone.

29. The system of claim 27, wherein the suppressing means is interposed between a pulser circuit constituting a part of the transmitting means and the probe, a switching circuit is provided for forming a reception path bypassing one of the transmission filter, transmission notch filter, and transmission resonant circuit during at least reception of the echo signal, and the receiving/processing means includes a preamplifier circuit of which input is connected to a path connecting the suppressing means to the pulser circuit.

30. The system of claim 26, wherein the probe is a phased-array type probe in which a plurality of transducers is arranged in array, the plurality of transducers being divided into two transducer groups assigned to transmission of the transmission ultrasound wave and reception of the echoed ultrasound wave, respectively.

31. The system of claim 30, wherein all the transducers of the probe have a transmission/reception sensitivity to both the fundamental and non-fundamental components, the suppressing means is connected to the transducers of either one group of the two transducer groups, and the receiving/processing means has a first preamplifier circuit receiving the echo signal from the transducers belonging to the one transducer group, a first reception delay and adding circuit connecting to the first preamplifier circuit, a first filter connecting to the first reception delay and adding circuit as well as passing the fundamental component alone, a second preamplifier circuit receiving the echo signal from the transducers belonging to the other transducer group, a second reception delay and adding circuit connecting to the second preamplifier circuit, and a second filter connecting to the second reception delay and adding circuit as well as passing the non-fundamental component alone.

32. The system of claim 30, wherein all the transducers of the probe have a transmission/reception sensitivity to both the fundamental and non-fundamental components, the suppressing means is connected to the transducers of either one group of the two transducer groups, and the receiving/processing means has a preamplifier circuit connecting to the transducers belonging to the other transducer group, a reception delay and adding circuit connecting to the preamplifier circuit, a first filter connecting to the reception delay and adding circuit as well as passing the fundamental component alone, and a second filter connecting to the reception delay and adding circuit as well as passing the non-fundamental component alone.

33. The system of claim 30, wherein all the transducers of the probe have a transmission/reception sensitivity to both the fundamental and non-fundamental components, the suppressing means is connected to the transducers of either one group of the two transducer groups, and the receiving/processing means has a preamplifier circuit receiving the echo signal channel by channel from the transducers belonging to both the one transducer and other transducer groups, a first filter connecting to the reception delay and adding circuit as well as passing the fundamental component alone, and a second filter connecting to the reception delay and adding circuit as well as passing the non-fundamental component alone.

34. The system of any one of claim 28, 31, 32, or 33, wherein the receiving/processing means comprises a receiver for producing the fundamental and non-fundamental components passed through the first and second filters into an individual frame of B-mode image data, and a converter for producing the display image data superimposing the B-mode image data associated with the fundamental component on the B-mode image data associated with the non-fundamental component.

35. The system of claim 30, wherein the transducers of the one transducer group have an operation sensitivity to the fundamental component alone and connected to the transmitting means.

36. The system of claim 35, wherein the transducers of the other transducer group have an operation sensitivity to both the fundamental and non-fundamental components, and the receiving/processing means comprises a preamplifier circuit connecting to the transducers of the other transducer group, a reception delay and adding circuit connecting to the preamplifier circuit, a first filter connecting to the reception delay and adding circuit as well as passing the fundamental component alone, and a second filter connecting to the reception delay and adding circuit as well as passing the non-fundamental component alone.

37. The system of claim 30, wherein the transducers of the other transducer group have an operation sensitivity to the non-fundamental component alone, and the receiving/processing means has a first preamplifier circuit connecting to the transducers of the one transducer group, a first reception delay and adding circuit connecting to the first preamplifier circuit, a second preamplifier circuit connecting to the transducers of the other transducer group, and a second reception delay and adding circuit connecting to the second preamplifier circuit.

38. The system of either one of claim 31 or 37, wherein the receiving/processing means comprises means for setting a gain to the first and second preamplifier circuits, respectively.

39. The system of claim 26, wherein the transmitting means comprises a pulser circuit for providing the probe the driving signal and being used in common with the suppressing means, the pulser circuit comprising a circuitry for generating the driving signal in a duty ratio of 50%.

40. The system of claim 26, wherein the transmitting means comprises a pulser circuit for providing the probe the driving signal and being used in common with the suppressing means, the pulser circuit comprising a circuitry for generating the driving signal in a class-A operation of the circuitry.

41. The system of claim 22, wherein the fundamental component consists of a plurality of different fundamental frequencies, and the non-fundamental component consists of at least one of a summation of the fundamental frequencies, a difference among the fundamental frequencies, a summation of non-fundamental frequencies as to the fundamental frequencies, and a difference among non-fundamental frequencies as to the fundamental frequencies.

42. The system of claim 41, wherein the plurality of different frequencies are two in frequency number, and the non-fundamental component is either one of the summation of the non-fundamental frequencies and the difference between the fundamental frequencies.

43. The system of claim 42, wherein the transmitting means comprises a suppressing means for intentionally suppressing the non-fundamental component.

44. The system of claim 43, wherein the suppressing means is one of a transmission filter for passing the two fundamental components of the driving signal alone, a transmission notch filter for cutting off the non-fundamental component of the driving signal, and a transmission resonant circuit for passing the two fundamental components alone by producing a resonant state only in transmission of the driving signal.

45. The system of claim 44, wherein the probe is a phased-array type probe in which a plurality of transducers are arranged in array, the plurality of transducers having an operative sensitivity to both the fundamental and non-fundamental components and being divided into two transducer groups assigned to transmission of the transmission ultrasound wave and reception of the echoed ultrasound wave, respectively.

46. The system of claim 45, wherein the suppressing means is provided correspondingly to each group of the two transducer groups.

47. The system of claim 45, wherein the receiving/processing means has a preamplifier circuit receiving echo signal from each of the transducers of the one and other transducer groups, a reception delay and adding circuit connecting to the preamplifier circuit, and first and second filters both connecting to the reception delay and adding circuit as well as passing the fundamental alone and the non-fundamental components alone, respectively.

48. The system of claim 42, wherein the transmitting means comprises two pulser circuits each generating the driving signal having each of the two fundamental frequencies, and the probe consists of two probes each connected to each of the two pulser circuits.

49. The system of either one of claim 23 or 48, wherein the receiving/processing means comprises means for extracting the non-fundamental component from the echo signal, and means for calculating two-dimensionally mapped data associated with motion velocities of an echo reflection source in the subject generating the non-fundamental component based on the extracted non-fundamental component, and the displaying means comprises means for displaying the two-dimensionally mapped data of motion velocities.

50. The system of claim 49, wherein the velocity calculating means is a means that calculates the data of the motion velocities on the basis of a Doppler technique.

51. The system of claim 50, wherein the velocity calculating means has a filter passing the only Doppler-shifted echo signal within a frequency range corresponding to a velocity range known for a diagnostic portion of the subject.

52. The system of claim 49, wherein the velocity calculating means is a means that calculates the data of the motion velocities using a cross-correlation technique.

53. The system of either one of claim 23 or 48, wherein the receiving/processing means comprises means for extracting the fundamental and non-fundamental components from the echo signal respectively, first means for calculating an image data set associated with morphologic information of a tissue based on the extracted fundamental component, second means for calculating an image data set associated with motion information of the tissue based on the extracted fundamental component, third means for calculating an image data set associated with blood distribution information in the tissue based on the extracted non-fundamental component, fourth means for calculating an image data set associated with blood velocity information in the tissue based on the extracted fundamental component, fifth means for calculating an image data set associated with blood velocity information in the tissue based on the extracted non-fundamental component, and means for providing the displaying means at least one set of the five image sets.

54. The system of claim 53, wherein the image data providing means comprises a means for superimposing with each other at least the two image data sets selected from the three image data sets in accordance with a desired display mode.

55. The system of claim 54, wherein the image data providing means comprises a means for not only discriminating the motion information of the tissue with a given threshold but also supplying the discriminated motion information to the superimposing means.

56. The system of claim 22, wherein an ultrasound contrast echography is carried out to acquire an ultrasound contrast image in a state that an ultrasound contrast medium has been given to the subject in a manner of intravenous injection, the system further comprising:

means for operating at least the transmitting and receiving/processing means when the contrast echography is carried out;

means for informing an injection time instant of the ultrasound contrast medium; and means for combining elapsed time data measured after the intravenous injection with the display image data associated with at least the non-fundamental component.

57. The system of claim 22, wherein an ultrasound contrast echography is carried out to acquire an ultrasound contrast image in a state that an ultrasound contrast medium has been given to the subject in a manner of intravenous injection, the system further comprising:

means for distinguishing a tissue region from a region other than the tissue region on the basis of the display image data; and further means for selectively displaying the tissue region.

58. The system of claim 57, wherein the distinguishing means has means for creating data of a reference image representing a cross section of the tissue on the basis of the display image data acquired prior to the intravenous injection of the contrast medium, means for creating data of a masking image of the region other than the tissue region using the data of the reference image, and means for masking the display image data with the data of the masking image, the display image data being acquired after the intravenous injection of the contrast medium.

59. The system of claim 57, wherein the distinguishing means has means for determining the region other than the tissue region using either one of a ratio and a difference between levels of the fundamental and non-fundamental components, and means for masking the display image data correspondingly to the determined region other than the tissue region.

60. The system of claim 22, wherein the receiving/processing means comprises means for extracting the non-fundamental component from the echo signal, means for producing image data based on the non-fundamental component, means for storing the produced image data for a plurality of frames over a certain time period, means for calculating time-series data associated with a brightness-change curve at a same portion in a tissue of the subject on the basis of the stored image data for the plurality of frames, and means for calculating data of properties of the brightness-change curve based on the calculated time-series data, and the displaying means includes a means for displaying the data of the properties together with the brightness-change curve.

61. The system of claim 60, further comprising means for determining a time instant for storing the image data into the storing means every certain time associated with cardiac phases on the basis of echocardiogram information derived from the subject.

62. The system of claim 61, wherein the time-series data calculating means includes a means for performing a curve fitting calculation to the time-series data of the brightness-change with a known function.

63. The system of claim 62, wherein the property calculating means is a means that calculates the properties including at least a physical index relating to a maximum brightness level in the fitted brightness-change curve.

64. The system of claim 22, wherein means for setting ECG (echocardiogram) gating to the transmitting and receiving/processing means so as to acquire the echo signal on the ECG gating is provided.

65. The system of claim 22, wherein means for setting ECG (echocardiogram) gating to the transmitting and receiving/processing means so as to acquire the echo signal on the ECG gating is provided, and the receiving/processing means includes a means that produces the display image data by obtaining brightness change data among tomographic data set over a plurality of frames of the echo signal acquired on the ECG gating.

66. The system of claim 22, comprising means for monitoring a biomedical signal of the subject varying with an elapsed time;

means for determining an acquiring time instant based on the biomedical signal; and means for controlling the transmitting and receiving/processing means into an operation state of obtaining the display image data at the acquiring time instant.

67. The system of claim 22, comprising means for monitoring a biomedical signal of the subject varying with an elapsed time;

means for determining an acquiring time instant based on the biomedical signal; and means for controlling the transmitting and receiving/processing means into an operation state of obtaining the display image data at the acquiring time instant, wherein the receiving/processing means comprises means for storing tomographic image data derived from the echo signal acquired at every acquiring time instant, and means for producing image data concerning a brightness change curve using the stored time-series tomographic image data.

68. The system of claim 62, wherein the producing means is a means that uses an echo level of either one of the fundamental and non-fundamental components in order to produce the image data concerning the brightness change curve, the fundamental and non-fundamental components being derived from a region of interest specified on an image of the tomographic image data.

69. The system of claim 22, wherein the receiving/processing means comprises means for storing a set of tomographic image data associated with the non-fundamental component under an ultrasound contrast echography which is carried out separately before and after loading of medication to the subject, and means for producing the display image data by obtaining data in brightness change among the stored sets of the tomographic image data.

70. The system of claim 22, wherein at least one of the transmitting means and the receiving/processing means comprises means for adjusting an operative parameter associated with at least one of transmission/reception of the echo signal and production of the display image data independence on a scanning position of the transmission ultrasound wave carried out in a cross section of the subject.

71. The system of claim 70, wherein the adjusting means is included in the transmitting means and is a means that adjusts a voltage value of the driving signal dependently on a scanning depth defined by the scanning position along the cross section.

72. The system of claim 70, wherein the adjusting means is included in the receiving/processing means and the adjusting means comprises means for previously memorizing correction data associated with ununiformity of an acquiring parameter depending on the scanning position, and means for correcting a signal level of the non-fundamental component on the basis of the correction data.

73. A diagnostic ultrasound system, comprising:

a probe for converting an electrical driving signal into a corresponding transmission ultrasound wave and converting an echoed ultrasound wave into a corresponding electrical echo signal;

means for transmitting the transmission ultrasonic wave to a subject to be diagnosed by providing the probe the electrical driving signal substantially consisting of a fundamental component corresponding to a given driving frequency, a non-fundamental component of the driving signal being intentionally lowered in power relative to the fundamental component;

means for receiving the electrical echo signal from the probe and processing the electrical echo signal into a display image data reflecting both the fundamental and non-fundamental components; and means for displaying the display image data.

74. A diagnostic ultrasound system by which an ultrasound contrast echography is carried out to acquire an ultrasound contrast image in a state that an ultrasound contrast medium has been given to a subject to be diagnosed in a manner of intravenous injection, the system comprising:

a probe for converting an electrical driving signal into a corresponding transmission ultrasound wave and converting an echoed ultrasound wave into a corresponding electrical echo signal;

means for transmitting the transmission ultrasonic wave to the subject by providing the probe the electrical driving signal substantially consisting of a fundamental component corresponding to a given driving frequency, a non-fundamental component of the driving signal being intentionally lowered in power relative to the fundamental component;

means for receiving the electrical echo signal from the probe and processing the electrical echo signal into a display image data reflecting at least the non-fundamental components; and means for displaying the display image data.

75. The system of claim 74, wherein the fundamental component consists of one fundamental frequency and the non-fundamental component includes at least one of a harmonic, subharmonic, and ultra-harmonic to the fundamental component.

76. The system of claim 75, wherein the non-fundamental component is a second harmonic to the fundamental component.

77. The system of claim 74, wherein the transmitting means comprises a suppressing means for intentionally suppressing the non-fundamental component.

78. A method of acquiring a diagnostic ultrasound image comprising the steps of:

preparing a probe for converting an electrical driving signal into a corresponding transmission ultrasound wave and converting an echoed ultrasound wave into a corresponding electrical echo signal;

transmitting the transmission ultrasonic wave to a subject to be diagnosed by providing the probe the electrical driving signal substantially consisting of a fundamental component corresponding to a given driving frequency, a non-fundamental component of the driving signal being intentionally lowered in power relative to the fundamental component; and receiving the electrical echo signal from the probe and processing the electrical echo signal into a display image data; and displaying the display image data.

* * * * *